(12) United States Patent
Kang et al.

(10) Patent No.: US 12,442,584 B2
(45) Date of Patent: Oct. 14, 2025

(54) REFRIGERATOR

(71) Applicant: LG Electronics Inc., Seoul (KR)

(72) Inventors: Chanuk Kang, Seoul (KR); Sanghun Cho, Seoul (KR); Changjae Lee, Seoul (KR); Yonghyun Cho, Seoul (KR); Dongrim Woo, Seoul (KR)

(73) Assignee: LG Electronics Inc., Seoul (KR)

( * ) Notice: Subject to any disclaimer, the term of this patent is extended or adjusted under 35 U.S.C. 154(b) by 512 days.

(21) Appl. No.: 17/782,418

(22) PCT Filed: Oct. 28, 2020

(86) PCT No.: PCT/KR2020/014798
§ 371 (c)(1),
(2) Date: Jun. 3, 2022

(87) PCT Pub. No.: WO2021/112409
PCT Pub. Date: Jun. 10, 2021

(65) Prior Publication Data
US 2023/0332822 A1    Oct. 19, 2023

Related U.S. Application Data

(60) Provisional application No. 62/953,988, filed on Dec. 27, 2019, provisional application No. 62/944,338, filed on Dec. 5, 2019.

(51) Int. Cl.
*F25D 23/02* (2006.01)
*G06T 5/50* (2006.01)

(52) U.S. Cl.
CPC .............. *F25D 23/028* (2013.01); *G06T 5/50* (2013.01); *F25D 2323/023* (2013.01);
(Continued)

(58) Field of Classification Search
CPC ............. F25D 23/028; F25D 2323/023; F25D 2400/36; F25D 2700/02; G06T 5/50; G06T 2207/20221; H04N 23/57; H04N 23/60
See application file for complete search history.

(56) References Cited

U.S. PATENT DOCUMENTS

| 9,046,294 B2 | 6/2015 | Lee et al. |
| 10,883,305 B2 * | 1/2021 | Jeong ................... E06B 3/6722 |
| 2010/0244698 A1 * | 9/2010 | Nakamura ............... B60Q 1/38 |
| | | 315/77 |
| 2014/0293060 A1 * | 10/2014 | Ryu ........................ F25D 29/00 |
| | | 348/159 |

(Continued)

FOREIGN PATENT DOCUMENTS

| CN | 108120205 | 6/2018 |
| EP | 3287723 | 2/2018 |

(Continued)

OTHER PUBLICATIONS

Extended European Search Report in European Appln. No. 20893096.6, mailed on Feb. 19, 2024, 15 pages.

(Continued)

*Primary Examiner* — Zhipeng Wang
(74) *Attorney, Agent, or Firm* — Fish & Richardson P.C.

(57) ABSTRACT

A refrigerator includes a cabinet having a first storage space, a main door configured to open and close the first storage space, a second storage space defined in the main door, an opening defined in the main door, a sub door configured to open and close the opening and disposed in front of the main door, and a camera assembly provided at the sub door to photograph the second storage space in a state in which the sub door is opened.

20 Claims, 47 Drawing Sheets

(52) U.S. Cl.
CPC ...... *F25D 2400/36* (2013.01); *F25D 2700/02* (2013.01); *G06T 2207/20221* (2013.01)

(56) References Cited

U.S. PATENT DOCUMENTS

| | | | |
|---|---|---|---|
| 2014/0320647 A1* | 10/2014 | Seo | F25D 29/00 |
| | | | 348/143 |
| 2016/0123659 A1* | 5/2016 | Kim | F25D 11/00 |
| 2016/0138860 A1* | 5/2016 | Kang | F25D 29/00 |
| | | | 62/130 |
| 2018/0310726 A1 | 11/2018 | Oh et al. | |
| 2018/0372394 A1* | 12/2018 | Kim | F25D 11/00 |
| 2019/0249485 A1* | 8/2019 | Jeong | F25D 23/028 |
| 2021/0396454 A1 | 12/2021 | Cho et al. | |

FOREIGN PATENT DOCUMENTS

| | | |
|---|---|---|
| EP | 3418658 | 12/2018 |
| JP | 2016006379 | 1/2016 |
| JP | 2016023892 | 2/2016 |
| JP | 2016061556 | 4/2016 |
| JP | 2016-205637 | 12/2016 |
| KR | 10-2010-0023351 | 3/2010 |
| KR | 20110068422 | 6/2011 |
| KR | 20160045545 | 4/2016 |
| KR | 20190097638 | 8/2019 |
| WO | WO 2014/208585 | 12/2014 |

OTHER PUBLICATIONS

Office Action in Australian Appln. No. 2020393453, mailed on Mar. 5, 2024, 4 pages.

Office Action in U.S. Appl. No. 17/780,666, mailed on Jul. 25, 2024, 12 pages.

Office Action in Australian Appln. No. 2020396667, mailed on Jan. 24, 2024, 4 pages.

Office Action in European Appln. No. 20897341.2, mailed on Dec. 21, 2023, 13 pages.

* cited by examiner

FIG. 42

REFRIGERATOR

CROSS-REFERENCE TO RELATED APPLICATIONS

This application is a National Stage application under 35 U.S.C. § 371 of International Application No. PCT/KR2020/014798, filed on Oct. 28, 2020, which claims the benefit of U.S. Provisional Application No. 62/944,338, filed on Dec. 5, 2019, and U.S. Provisional Application No. 62/953,988, filed on Dec. 27, 2019. The disclosures of the prior applications are incorporated by reference in their entirety.

TECHNICAL FIELD

Embodiments relate to a refrigerator.

BACKGROUND ART

In general, a refrigerator is a home appliance for storing foods in an internal storage space, which is shield by a door, at a low temperature by low temperature air. For this, the refrigerator is configured to accommodate the stored food in an optimum state by cooling the internal storage space using cold air generated through heat exchange with a refrigerant circulating in a refrigeration cycle.

In recent years, refrigerators have become increasingly multi-functional with changes of dietary lives and gentrification of products, and refrigerators having various structures and convenience devices for convenience of users and for efficient use of internal spaces have been released.

The storage space of the refrigerator may be opened/closed by the door. The refrigerators may be classified into various types according to an arranged configuration of the storage space and a structure of the door that opens and closes the storage space.

A separate accommodation space accessible from the outside may be provided in the door of the refrigerator. The accommodation space may be accessed by opening a partial auxiliary door or a home bar door without opening the entire refrigerator door through the above-described accommodation space.

Thus, frequently used foods may be stored in the separate accommodation space provided in the refrigerator door. Since the entire refrigerator door is not opened for accommodating food, there is an advantage of minimizing leakage of cold air inside the refrigerator.

However, even in such a structure, there is a problem in that the food is not checked unless the refrigerator door is opened. That is, the door should be opened to identify whether desired food is received in a space in the refrigerator or in a separate storage space provided in the door. If there is no desired food when opening the auxiliary door or the home bar, there is inconvenience to open the main door again. Here, there is a problem that unnecessary leakage of cold air occurs.

In order to solve this problem, a portion of a front surface of the refrigerator door may be made of a transparent material, but in this case, an insulation problem in the refrigerator may occur. In addition, when the inside of the refrigerator is seen even when the refrigerator is not in use, there is a problem in that the foods are exposed to the outside as it is, which is very bad in appearance.

As a prior art document, there is Korean Patent Publication No. 10-2016-0045545.

DISCLOSURE OF THE INVENTION

Technical Problem

Embodiments provide a refrigerator in which foods stored in a door are directly checked while a door is closed.

Alternatively or additionally, embodiments provide a refrigerator in which foods stored in a storage space provided in a main door is photographed in a process of closing a sub door to display a photographed image on a display.

Alternatively or additionally, embodiments provide a refrigerator in which exposure of a camera to the outside is minimized when a lighting portion provided in a door or cabinet is turned on to allow a storage space of the door to be viewed from the outside through a panel assembly.

Alternatively or additionally, embodiments provide a refrigerator in which images of foods within the refrigerator, which are photographed by a camera, are capable of being checked in a state in which a main door and a sub door are closed.

Alternatively or additionally, embodiments provide a refrigerator, in which a recipe related to stored foods is capable of being checked on a display, or foods taken out of the refrigerator is capable of being ordered on the display.

Technical Solution

A refrigerator according to one aspect may include a cabinet having a first storage space; and a main door configured to open and close the first storage space.

The refrigerator may further include: a second storage space defined in the main door; and an opening defined in the main door.

The refrigerator may further include a sub door configured to open and close the opening and disposed in front of the main door. The sub door may rotate with respect to the main door about a hinge.

The main door may include a door frame having the opening and a frame cover coupled to the door frame and having the second storage space. The opening may be opened and closed by the sub door. The frame cover may be disposed in the first storage space in the state in which the main door is closed. The second storage space may be partitioned from the first storage space by the frame cover. When the main door is opened, the frame cover may be withdrawn from the first storage space.

The refrigerator may further include a camera assembly provided at the sub door. The camera assembly may include a first camera assembly and a second camera assembly. Each of the first camera assembly and the second camera assembly may photograph the second storage space in a state in which the main door is closed, and the sub door is opened, and the camera assembly may further include a first camera assembly and a second camera assembly, which are vertically disposed to be spaced apart from each other.

Since the second storage space is partitioned from the first storage apace by the frame cover in the state in which the main door is closed, each of the camera assemblies may photograph the second storage space, and the photographing of foods within the first storage space may be minimized.

The sub door may further include a display on which a resultant image including an image photographed by each of the first camera assembly and the second camera assembly. The sub door may include a panel assembly. The panel assembly may be configured so that the second storage space is viewed from the outside when the lighting portion provided at the cabinet or the main door is turned on in a state in which the main door and the sub door are closed. The panel assembly may include the display.

The resultant image may include at least a portion of the image photographed by each of the first camera assembly and the second camera assembly in an angular section disposed in the middle when a maximum opening angle of the sub door is divided into three angular sections.

The resultant image may include at least a portion of the image photographed by each of the first camera assembly and the second camera assembly in a process of closing the sub door.

The resultant image may be an image obtained by combining a first image photographed by the first camera assembly and a second image photographed by the second camera assembly.

The resultant image may include a first image portion extracted from the first image photographed by the first camera assembly and a second image portion extracted from the first image photographed by the first camera assembly.

The refrigerator may further include a memory configured to store images obtained by photographing the second storage space at a predetermined time interval in each of the camera assemblies in a process of opening the sub door.

The first image may be any one image selected from a plurality of first images stored in the memory. The second image may be any one image selected from a plurality of second images stored in the memory.

The main door may include a first mark and a second mark, which are spaced apart from each other in the vertical direction. The first image photographed by the first camera assembly may include the first mark, and the second image photographed by the second camera assembly may include the second mark.

A first reference image on which the first mark is disposed at a specific position and a second reference image on which the second mark is disposed at a specific position may be stored in the memory.

The selected first image may be an image, on which the first mark is disposed at the same position as the first mark of the first reference image, among the plurality of photographed first images. The selected second image may be an image, on which the second mark is disposed at the same position as the second mark of the second reference image, among the plurality of photographed second images.

The main door may include a mark, and any one of the first camera assembly and the second camera assembly may photograph the mark. The first image photographed by the first camera assembly may include the mark, and the second image photographed by the second camera assembly may not include the mark. A reference image on which the mark is disposed at a specific position may be stored in the memory. The selected first image may be an image, on which the first mark is disposed at the same position as the first mark of the first reference image, among the plurality of photographed first images. The selected second image may be an image that is photographed in the same order as the selected first image.

The refrigerator may further include a door position sensing portion configured to sense a rotating direction and position of the sub door. When it is sensed that the sub door is closed at a predetermined angle by the door position sensing portion, the second storage space may be photographed by each of the camera assemblies.

Each of the camera assemblies may include a camera module and a window disposed in front of a lens of the camera module. In a state in which the sub door is closed, the window may be inclined at a reference angle with respect to a front surface of the main door.

The resultant image may include at least a portion of the image photographed by each of the first camera assembly and the second camera assembly at a time point at which an angle between a virtual line connecting the window of each of the camera assemblies to the hinge of the sub door and the front surface of the main door is the reference angle.

Each of the camera assemblies may include a camera module and a window disposed in front of a lens of the camera module.

When an axis extending in a horizontal direction parallel to a front surface of the main door is referred to as an X-axis, an axis perpendicular to the X-axis in the horizontal direction is referred to as a Y-axis, and an axis perpendicular to the X-axis and the Y-axis and extending in a vertical direction is referred to as a Z-axis, in a state in which the sub door is closed, the window may be inclined with respect to the X-axis and the Y-axis and is parallel to the Z-axis.

The sub door may include a door liner, and the door liner may include a first dike and a second dike, which are spaced apart from each other in a horizontal direction. Each of the dikes may be provided in a shape in which a portion of the door liner protrudes. Each of the dikes may protrude in a direction away from a front surface of the sub door. The first dike may be disposed father from the hinge than the second dike. The first and second camera assemblies may be installed on the first dike.

The first dike may include an installation opening in which each of the camera assemblies is installed.

The sub door may include a mounting frame installed on the first dike at a position corresponding to the installation opening.

The camera assembly may include a camera module seated on the mounting frame by passing through the installation opening and a cover member configured to cover the installation opening.

The camera assembly may include an imaging device comprising a lens and a window disposed in front of the lens. The cover member may include an opening in which the window of the camera module is disposed in the state of covering the installation opening.

The first dike may include a first surface configured to face the second dike and a second surface bent from the first surface. The window may be disposed to be inclined with respect to the first surface and the second surface.

The first dike may include a seating groove on which the cover member is seated. The installation opening may be defined in the seating groove.

The camera module may be seated on the mounding frame, and in the state in which the cover member covers the installation opening, a coupling member may be coupled to the mounting frame by passing through the mounding frame and the camera module.

The sub door may include an opening. The opening may be disposed between the first dike and the second dike.

The sub door may further include a panel assembly configured to cover the opening. The sub door may further include a door lighting portion that is turned on in the state in which the sub door is closed.

Each of the camera assemblies may be disposed between the panel assembly and the door lighting portion.

After the door lighting portion is turned on in the state in which the sub door is closed, when the sub door is opened, the door lighting portion may be turned off.

A refrigerator according to another aspect includes: a cabinet having a first storage space; and a door configured to open and close the first storage space, wherein the door may include: a main door having an opening and a second storage space that communicates with the opening and is partitioned from the first storage space; a sub door configured to open and close the opening and rotatable with respect to the main door about a hinge; and a camera assembly provided at the sub door to photograph the second storage space in a state in which the sub door is opened.

The camera assembly may include a camera module and a window disposed in front of a lens of the camera module.

When an axis extending in a horizontal direction parallel to a front surface of the main door is referred to as an X-axis, an axis perpendicular to the X-axis in the horizontal direction is referred to as a Y-axis, and an axis perpendicular to the X-axis and the Y-axis and extending in a vertical direction is referred to as a Z-axis, in a state in which the sub door is closed, the window may be inclined with respect to the X-axis, the Y-axis, and the Z-axis.

In the state in which the sub door is closed, an angle between the window and the Z-axis may be less than that between the window and the X-axis.

In the state in which the sub door is closed, an angle between the window and the Z-axis may be less than that between the window and the Y-axis.

A mark may be provided on the main door. In a state in which the sub door opens the opening, the camera assembly may photograph an image including the mark. A controller may be configured to select an image to be displayed by comparing the images including the mark with the reference image.

An imaging device according to another aspect includes: a fixed body having a storage space; a movable body relatively movable with respect to the fixed body; a mark displayed on a surface of the fixed body facing the movable body; a camera installed on a surface of the movable body facing the fixed body; a controller configured to control an operation of the camera; and a display device configured to provide an image photographed by the camera to a user.

The fixed body may be a cabinet. The fixed body may be a cabinet and a main door. The movable body may be a sub door.

The camera may photograph a plurality of images including the mark and the storage space while the moving body relatively moves from the fixed body. The imaging device may further include a controller configured to determine an image to be displayed to the user by comparing a size of the mark on the image with a set size among the plurality of photographed images. The imaging device may be a refrigerator.

Advantageous Effects

According to the proposed invention, there may be the advantage in that the foods stored in the refrigerator are directly checked in the state in which the door is closed.

According to this embodiment, the foods stored in the storage space provided in the main door may be photographed while the sub door is closed so that the image photographed after the sub door is closed may be checked directly on the display.

According to this embodiment, when the lighting portion provided in the door or cabinet is turned on to allow the storage space of the door to be seen from the outside through the panel assembly, the exposure of the camera to the outside may be minimized.

According to this embodiment, the food image within the refrigerator, which is photographed by the camera, may be checked in the state in which the main door and the sub door are closed.

According to this embodiment, the recipe related to the stored foods may be checked on the display, or the foods taken out of the refrigerator may be ordered on the display.

BRIEF DESCRIPTION OF THE DRAWINGS

FIGS. 41 and 42 are views illustrating another example of the series of screens displayed on the first display.

MODE FOR CARRYING OUT THE INVENTION

Figure 1:
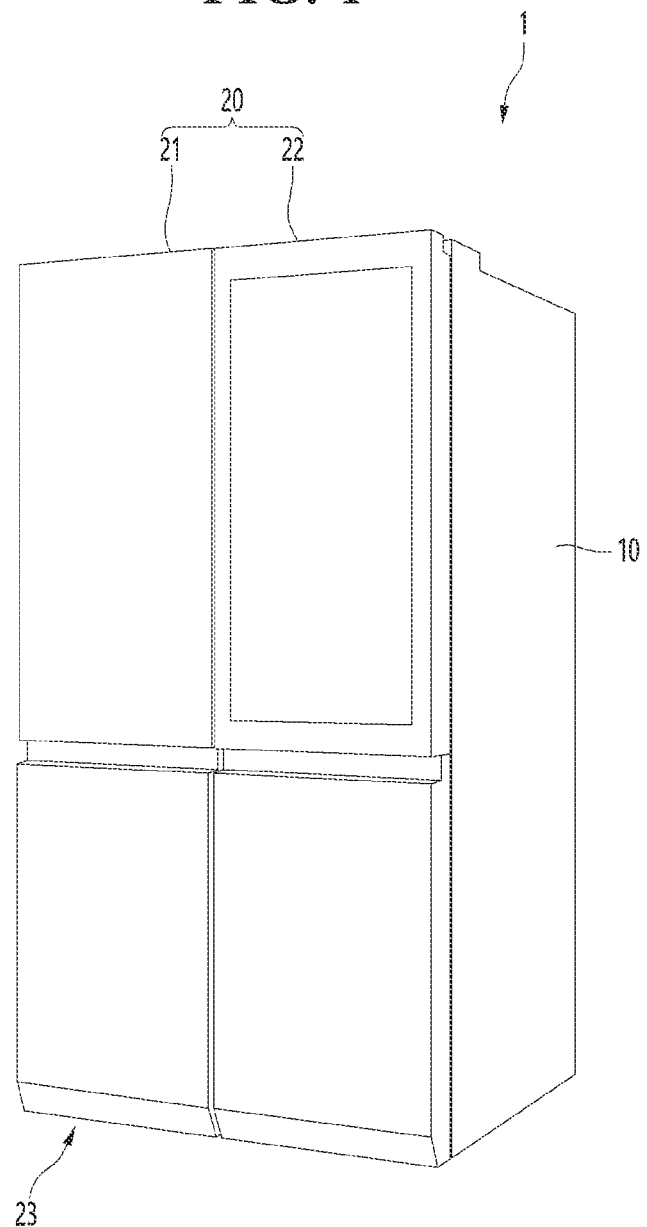
FIG. 1 is a perspective view of a refrigerator according to an embodiment.

Hereinafter, some embodiments of the present invention will be described in detail with reference to the accompanying drawings. It should be noted that when components in the drawings are designated by reference numerals, the same components have the same reference numerals as far as possible even though the components are illustrated in different drawings. Further, in description of embodiments of the present disclosure, when it is determined that detailed descriptions of well-known configurations or functions disturb understanding of the embodiments of the present disclosure, the detailed descriptions will be omitted.

Also, in the description of the embodiments of the present disclosure, the terms such as first, second, A, B, (a) and (b) may be used. The terms are merely used to distinguish the corresponding component from other components, and do not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

Figure 2:
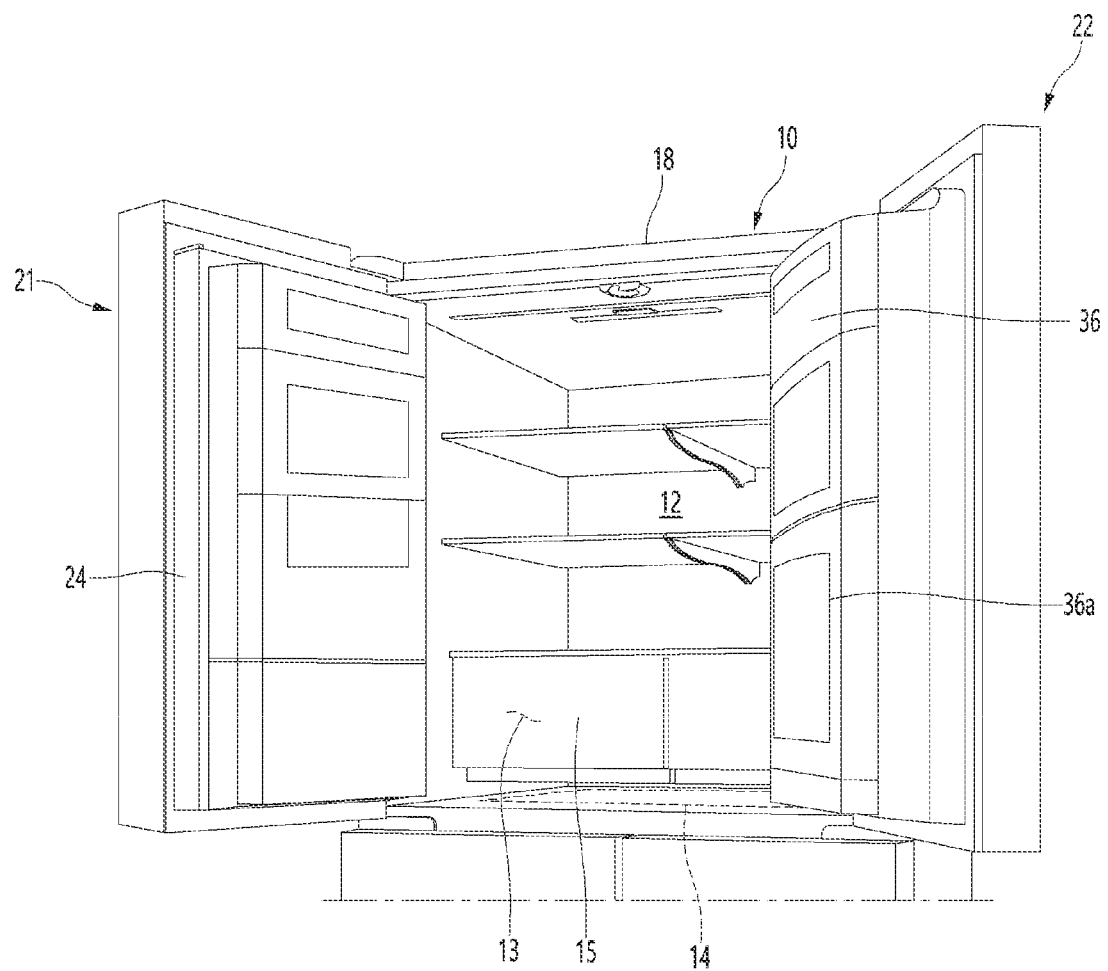
FIG. 2 is a view illustrating a state in which a refrigerating compartment door is opened according to an embodiment.
Figure 3:
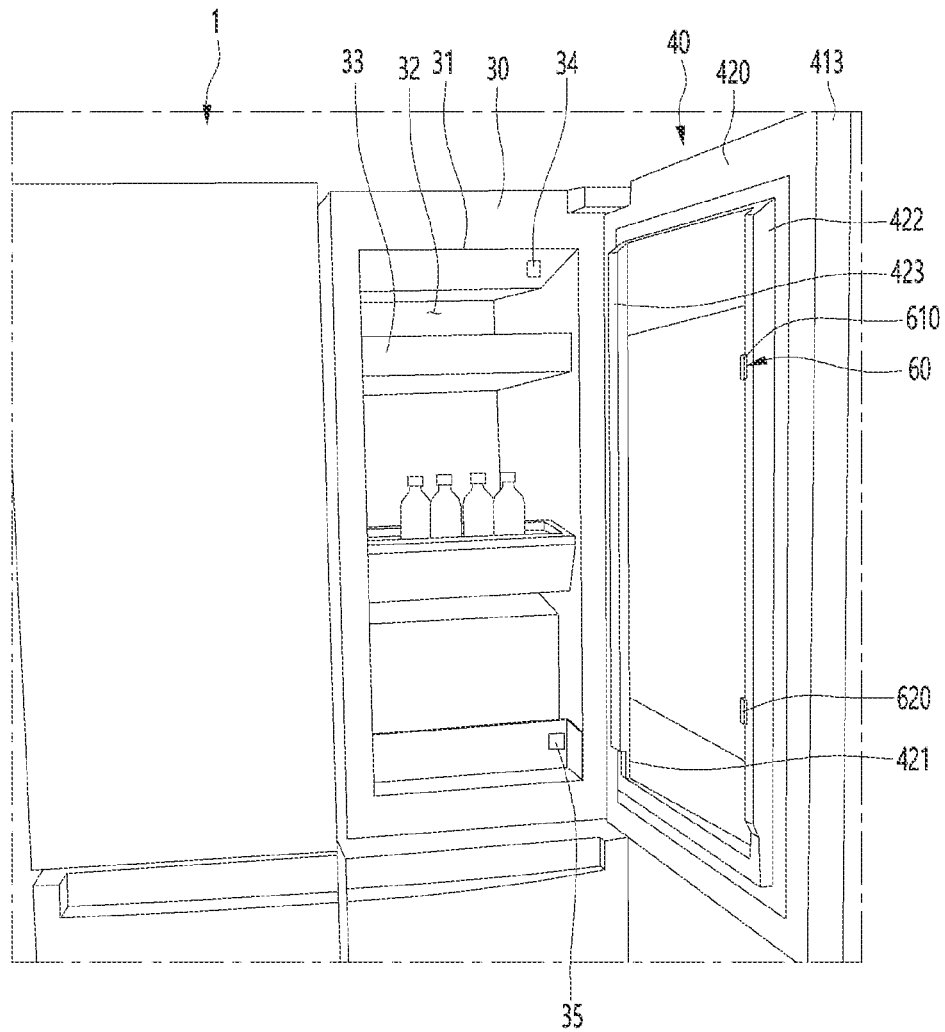
FIG. 3 is a view illustrating a state in which a sub door is opened according to an embodiment.
Figure 4A:
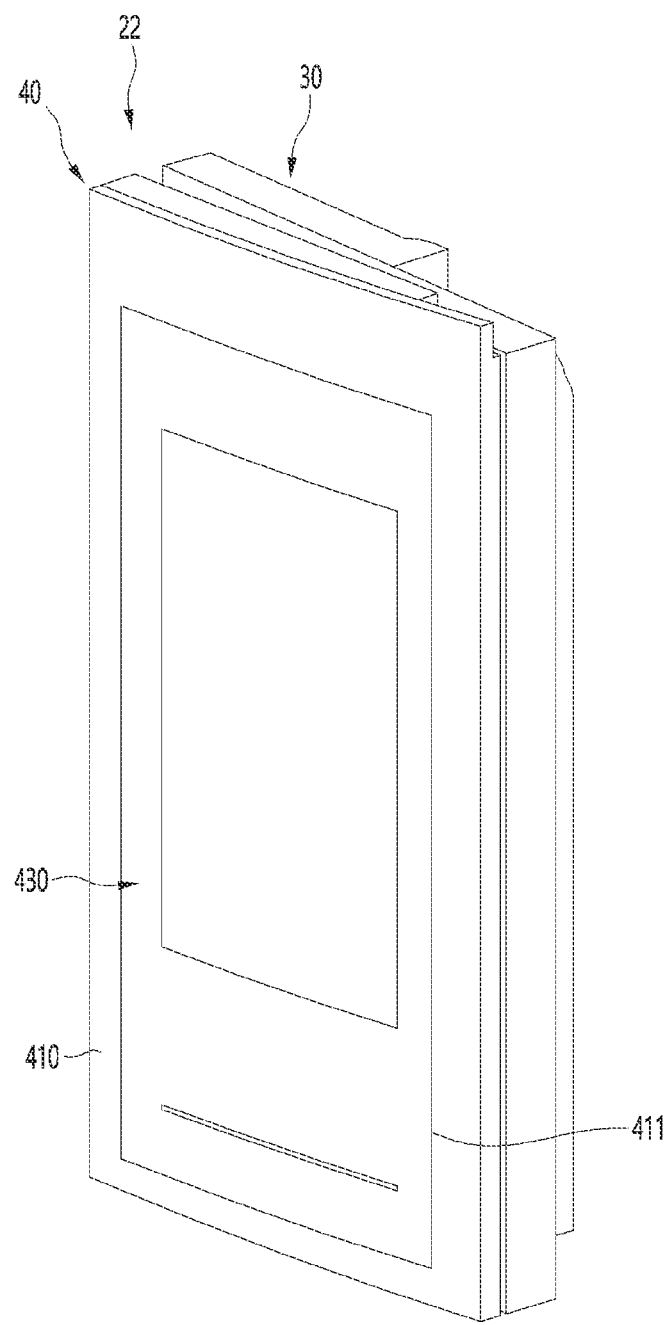
FIG. 4a is a perspective view of a refrigerating compartment door according to an embodiment.
Figure 4B:
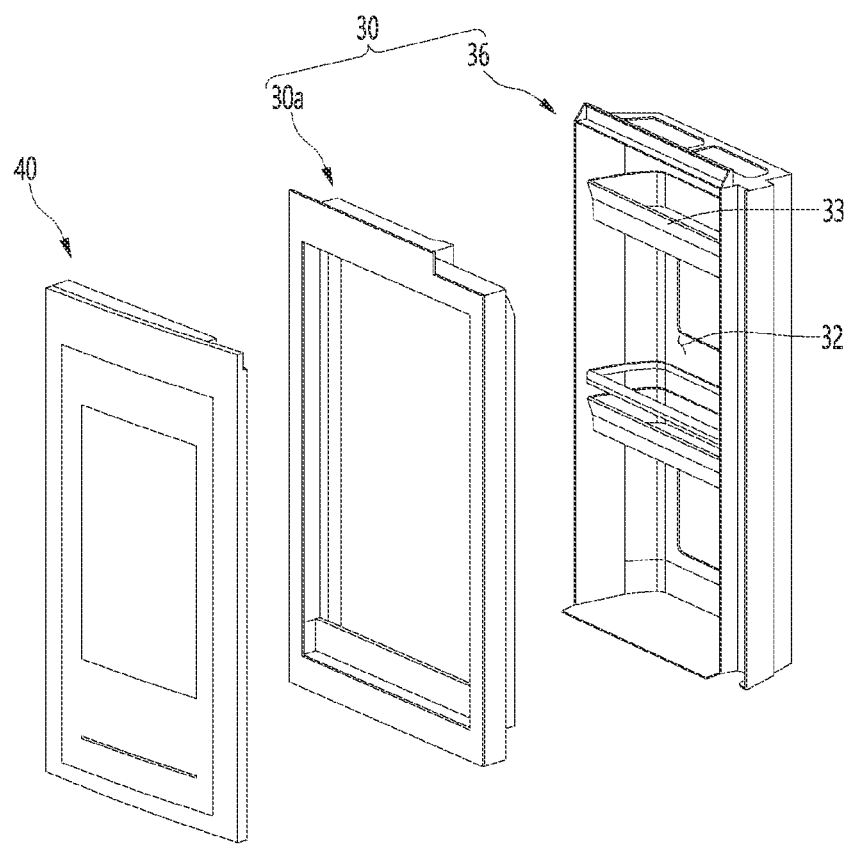
FIG. 4b is an explode perspective view of FIG. 4.
Figure 5:
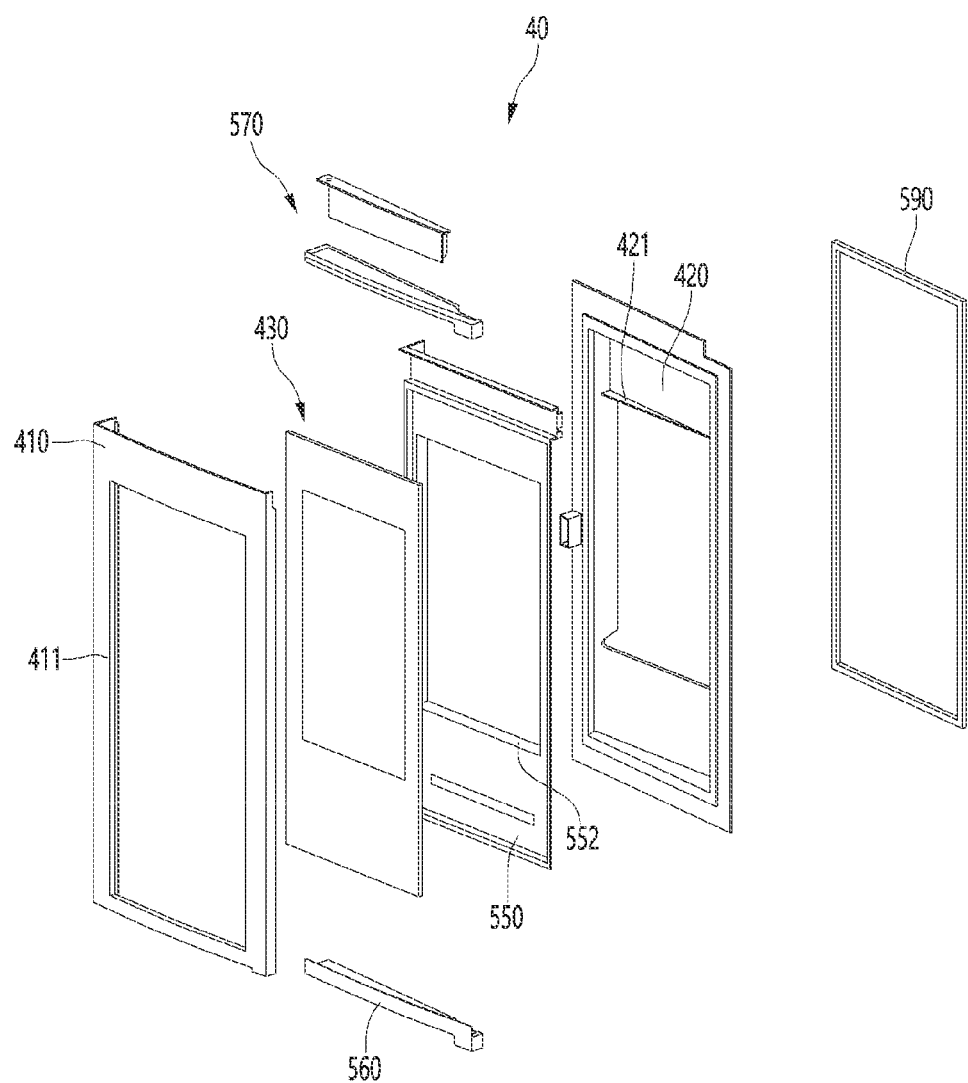
FIG. 5 is an exploded perspective view of a sub door according to an embodiment.

FIG. 1 is a perspective view of a refrigerator according to an embodiment, and FIG. 2 is a view illustrating a state in which a refrigerating compartment door is opened according to an embodiment. FIG. 3 is a view illustrating a state in which a sub door is opened according to an embodiment, and FIG. 4a is a perspective view of a refrigerating compartment door according to an embodiment. FIG. 4b is an explode perspective view of FIG. 4, and FIG. 5 is an exploded perspective view of a sub door according to an embodiment.

Referring to FIGS. 1 to 5, a refrigerator 1 according to an embodiment may include a cabinet 10 defining a storage space and doors 20 and 30 opening and closing the storage space.

The storage space may include, for example, a first storage space. The first storage space may include, for example, a refrigerating compartment 12. The refrigerating compartment 12 may be opened and closed by the refrigerating compartment door 20.

When the storage space additionally includes a freezing compartment, the freezing compartment may be opened and closed by a freezing compartment door 23. FIG. 1 illustrates an example in which the refrigerator 1 includes the refrigerating compartment 12 and the freezing compartment.

The refrigerating compartment 12 may be disposed above or below the freezing compartment or disposed at a left or right side of the freezing compartment.

The refrigerating compartment door 20 may include a first refrigerating compartment door 21 and a second refrigerating compartment door 22, which are disposed at left and right sides, respectively. Each of the first and second refrigerating compartment doors 21 and 22 may be rotatably connected to the cabinet 10 by a hinge.

The freezing compartment door 23 may include a single door or a plurality of independently operating doors. When the freezing compartment door 23 includes the plurality of doors, at least one of the plurality of doors may be slidably connected to the cabinet 10 or may be rotatably connected to the cabinet 10 by the hinge.

At least one or more of the first and second refrigerating compartment doors 21 and 22 may include a main door 30 and a sub door 40. FIG. 3 illustrates an example in which the second refrigerator door 22 includes the main door 30 and the sub door 40.

The main door 30 may open and close the first storage space, and the sub door 40 may rotate with respect to the main door 30. The sub door 40 may be rotatably connected to the main door 30 or the cabinet 10.

A size of a front surface of the sub door 40 may be the same as that of a front surface of the main door 30. In this case, the sub door 40 may be disposed to overlap the main door 30 in a state in which the sub door 40 is disposed in front of the main door 30.

Alternatively, the size of the front surface of the sub door 40 may be less than that of the front surface of the main door 30. In this case, a space in which the sub door 40 is disposed may be provided in the front surface of the main door 30, and the sub door 40 may be accommodated in the space. Then, the front surface of the sub door 40 may form a continuous surface with the front surface of the main door 30.

The inside of the refrigerating compartment 12 may be divided into a plurality of spaces by one or more shelves. The refrigerating compartment 12 may include one or more divided storage spaces 13 and 14.

The storage spaces 13 and 14 may include a vegetable space. The vegetable space may be an internal space of a substantially slidable drawer 15.

The storage spaces 13 and 14 may include multi accommodation spaces.

In order to easily check the inside of the storage spaces 13 and 14, a user has to open the refrigerator compartment door 20 and then the drawer 15, which may be cumbersome for the user.

Thus, the refrigerator 1 may further include a storage space camera 18 for photographing the storage spaces 13 and 14 in a state in which the drawer 15 is opened.

The storage spaces 13 and 14 may be disposed at a lower portion in the refrigerating compartment 12. In this case, the storage space camera 18 may be disposed to be close to a front end of an upper wall of the storage space 12. Thus, in the state in which the drawer 15 is opened, the storage space camera 18 may look at the storage spaces 13 and 14, and thus, the storage spaces 13 and 14 may be photographed by the storage space camera 18.

For example, a discharge portion for discharging cold air toward the refrigerating compartment door 20 may be provided on an upper wall of the storage space 12, and the storage space camera 18 may be disposed at a rear side of the discharge portion. The refrigerator 1 may further include a storage space lighting portion (see reference numeral 72 of FIG. 12). The storage space lighting portion may be disposed at a rear side of the storage space camera 18. That is, the storage space camera 18 may be disposed between the discharge portion and the storage space lighting portion.

Although not shown, the refrigerator 1 may further include a sensing portion for sensing movement of the drawer 15. When movement of the drawer 15 to a specific position is sensed by the sensing portion, the storage space camera 18 photographs the storage spaces 13 and 14. For example, when a position at which the drawer 15 is completely withdrawn is sensed by the sensing portion, the storage space camera 18 may photograph the storage spaces 13 and 14. A photographing surface or lens of the storage space camera 18 may be inclined toward a front side of the cabinet 10 so that the storage space camera 18 photographs the inside of the drawer 15 at the position at which the drawer 15 is completely withdrawn.

Referring to FIG. 3, the main door 30 may include a door frame 30*a* including an opening 31 and a frame cover 36 coupled to the door frame 30*a* to define a second storage space that is independent of the first storage space. That is, a region defined by the frame cover 36 may be referred to as the second storage space 32. Since the frame cover 36 is coupled to the door frame 30*a*, the second storage space 32 may rotate and move together when the main door 30 is opened. In the state in which the main door 30 is closed, the second storage space may be disposed within the first storage space or may be disposed in front of the first storage space. In order to supply cold air of the refrigerating compartment 12 to the second storage space, the frame cover 36 may include one or more cold air holes 36*a*. The frame cover 36 may restrict a flow of external air into the first storage space in the state in which the main door 30 is closed, and the sub door 40 is opened.

One or more baskets 33 may be coupled to the door frame 30*a*, and the frame cover 36 may cover the baskets 33. In this embodiment, a space defined by the bracket 33 is also a portion of the second storage space 32.

The opening 31 may be covered by the sub door 40. For example, the sub door 40 may open and close the opening 31. In the state in which the sub door 40 is opened, a user may access the door storage space 32 through the opening 31.

The sub door 40 may include an outer plate 410 and a door liner 420.

The outer plate 410 may form a front surface of the sub door 40. The outer plate 410 may be made of a metal material. The outer plate 410 may include a first opening 411.

The door liner 420 may include a second opening 421. The second opening 421 may be disposed to face the first opening 411.

The sub door 40 may further include a panel assembly 430. The panel assembly 430 may be disposed to cover the first opening 411 and the second opening 421. The second storage space 32 may be seen from the outside by the panel assembly 430.

The door liner 420 may include a pair of door dikes 422 and 423. Each of the pair of door dikes 422 and 423 may be a portion of the door liner 420, which protrudes toward the cabinet 10 and may be disposed in the opening 31 of the main door 30 in a state in which the sub door 40 is closed. The door dikes 422 and 423 may serve to block leakage of the cold air from the refrigerating compartment 12.

The pair of door dikes 422 and 423 may include a first dike 422 and a second dike 423, which are disposed to be spaced apart from each other in the horizontal direction. Each of the dikes 422 and 423 may be disposed to be elongated in the vertical direction. Each of the dikes 422 and 423 may be provided to protrude from the door liner 420. For example, each of the dikes 422 and 423 may protrude in a direction away from a front surface of the sub door. The second opening 421 of the door liner 420 may be disposed between the first dike 422 and the second dike 423.

In the rotation process of the sub door 40, a rotation radius of the first dike 422 with respect to a hinge is greater than that of the second dike 423.

The first dike 422 may be disposed closer to a door adjacent in the horizontal direction than the second dike 423. In this embodiment, the first dike 422 may be disposed closer to a first refrigerating compartment door 21 than the second dike 423.

The sub door 40 may further include an outer bracket 550 disposed to surround the panel assembly 430.

The outer bracket 550 may connect the outer plate 410 to the panel assembly 430.

The outer bracket 550 may include a bracket opening 552 through which a portion of the panel assembly 430 passes.

The first opening 411 of the outer plate 410, the bracket opening 552, and the second opening 421 of the door liner 420 may be aligned with each other.

The sub door 40 may further include an upper cap 570 connecting an upper portion of the outer plate 410 to an upper portion of the door liner 420 and a lower cap 560 connecting a lower portion of the outer plate 410 to a lower portion of the door liner 420.

In addition, the sub door 40 may further include a gasket 590 coupled to the door liner 420. The gasket 590 may be in contact with the main door 30 in the state in which the sub door 40 is closed to prevent the cold air from leaking between the main door 30 and the sub door 40.

A door camera 60 may be provided on at least one or more of the door liner 420 and the panel assembly 430.

FIG. 3 illustrates an example in which the door camera 60 is disposed on the door liner 420.

The door camera 60 may photograph the second storage space 32. A vertical length of the second storage space 32 may be greater than a left and right length thereof. Thus, the door camera 60 may include a plurality of camera assemblies 610 and 620 so that the door camera 60 photographs the entire area of the second storage space 32. The plurality of camera assemblies 610 and 620 may be vertically spaced apart from each other and disposed on the door liner 420.

Since the second storage space 32 is partitioned from the first storage apace by the frame cover 36 in the state in which the main door 30 is closed, each of the camera assemblies 610 and 620 may photograph the second storage space 32, and the photographing of foods within the first storage space may be minimized.

It is also possible that the frame cover 36 is omitted in this embodiment. In this case, a space defined by the basket 33 provided in the main door 30 or a space between the plurality of baskets 33 may be the second storage space. Even in this case, each of the camera assemblies 610 and 620 may photograph the second storage space 32.

The plurality of camera assemblies 60 may include a first camera assembly 610 and a second camera assembly 620, which are arranged in a vertical direction. The second camera assembly 620 may be disposed below the first camera assembly 610.

The plurality of camera assemblies 610 and 620 may be provided at the first dike 422. The first camera assembly 610 may be disposed higher than a bisecting line, and the second camera assembly 610 may be disposed lower than the bisecting line, based on the bisecting line that bisects a height of the first dike 422. As in this embodiment, if the plurality of camera assemblies 610 and 620 are installed on the first dike 422, when a storage space lighting portion or a door lighting portion is turned on to enable the second storage space 32 to be seen to the outside through the panel assembly 430, the plurality of camera assemblies 610 and 620 may be prevented from being seen, or a surface area of the portion exposed to the outside may be minimized.

One or more marks 34 and 35 may be provided on the main door 30. For example, the main door 30 may include a first mark 34 and a second mark 35 disposed lower than the first mark 34.

The first and second marks 34 and 35 may be disposed within the opening 31 or disposed outside the opening 31. When the first and second marks 34 and 35 are disposed outside the opening 31, the first mark 34 may be disposed adjacent to an upper end of the opening 31, and the second mark 35 may be disposed at a position adjacent to a lower end of the opening 31.

In the state in which the sub door 40 is opened, an image photographed by the first camera assembly 610 may include the first mark 34, and an image photographed by the second camera assembly 620 may include the second mark 35.

Figure 6:
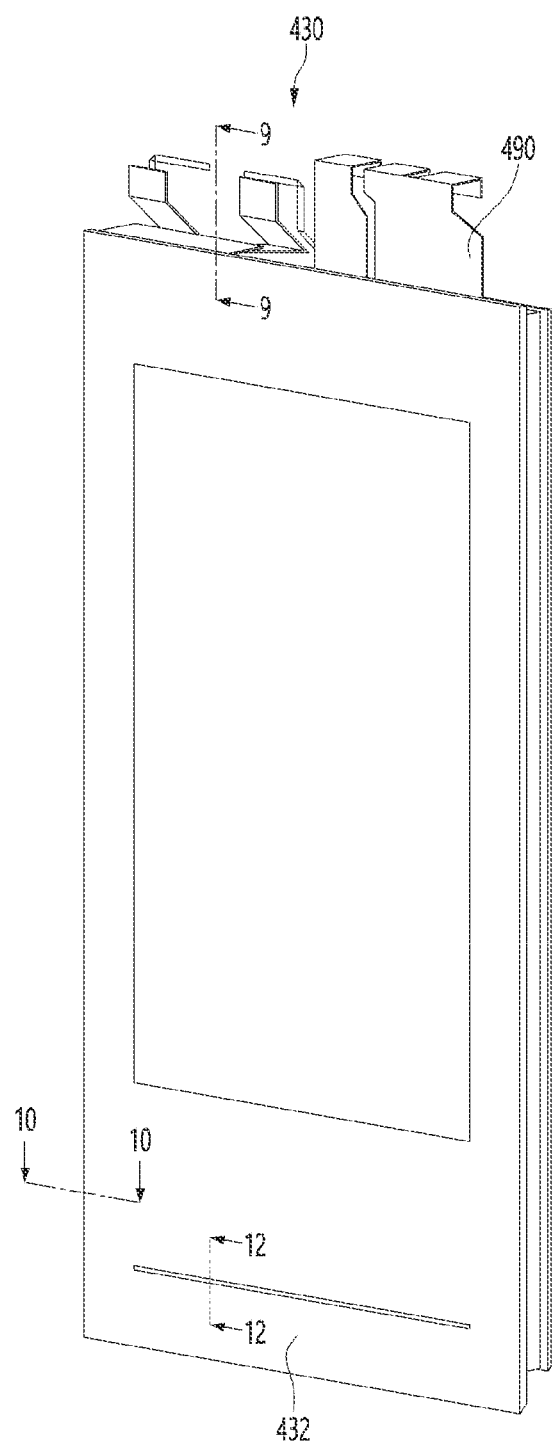
FIG. 6 is a perspective view of a panel assembly according to an embodiment.
Figure 7:
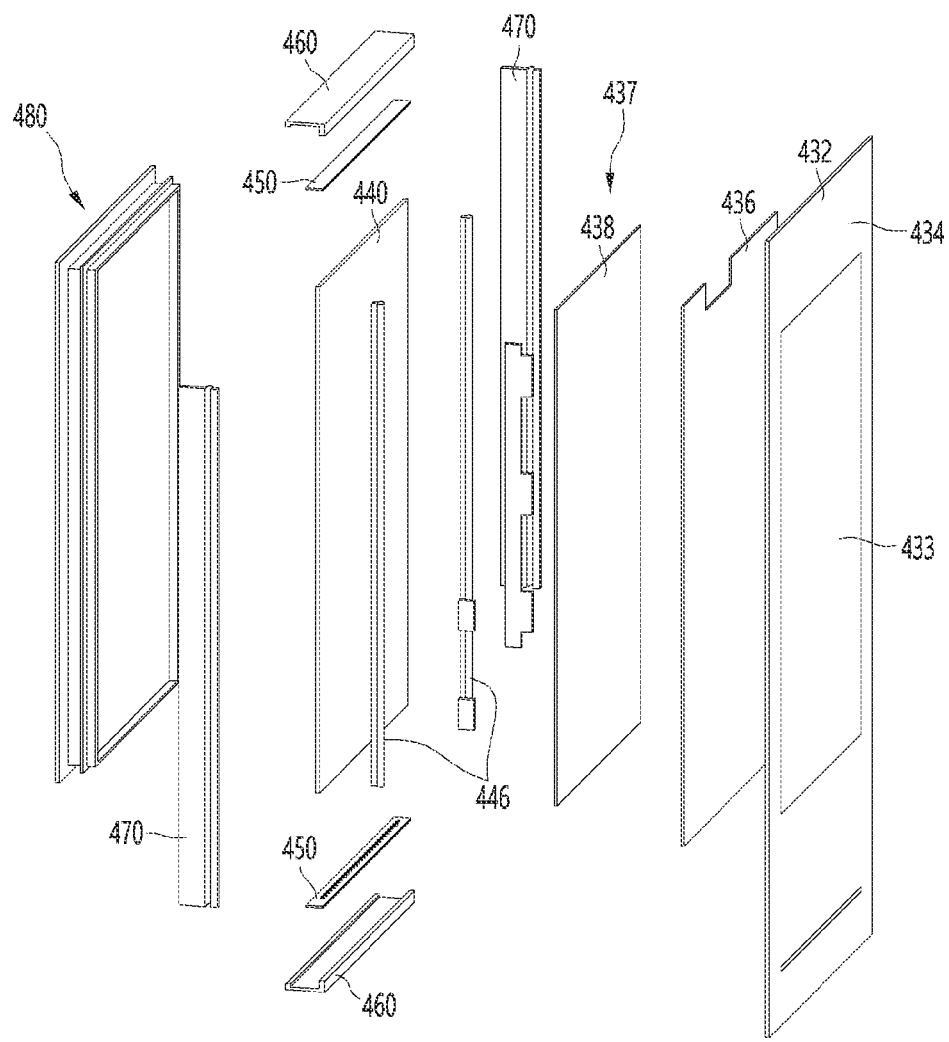
FIG. 7 is an exploded perspective view of the panel assembly of FIG. 6.
Figure 8:
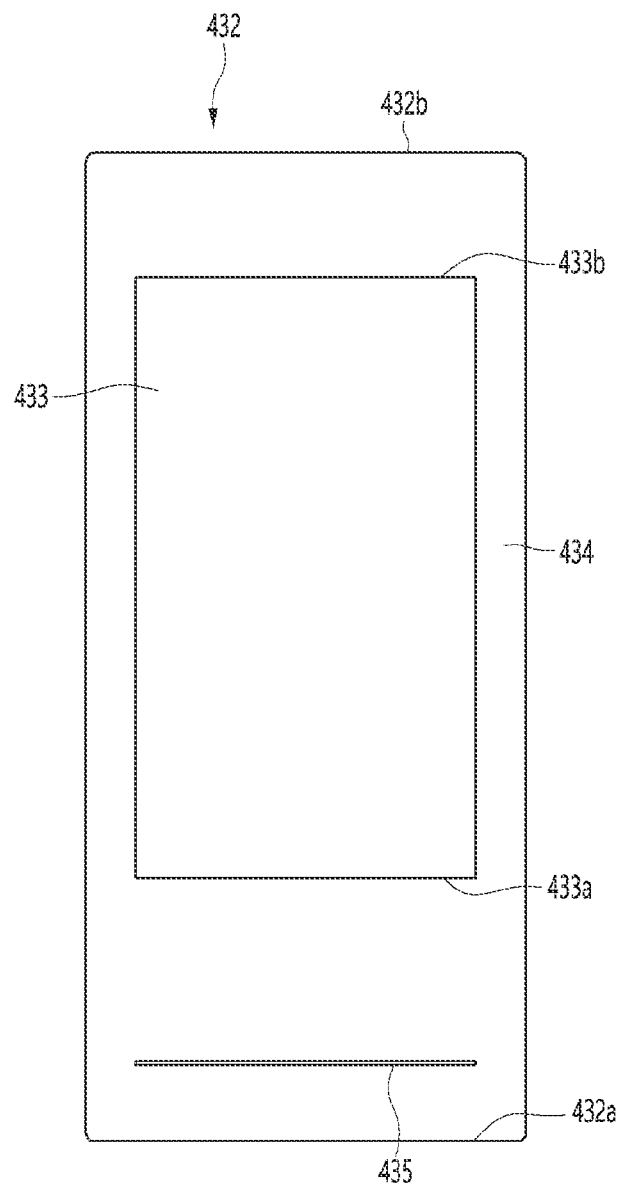
FIG. 8 is a front view of a front panel according to an embodiment.
Figure 9:
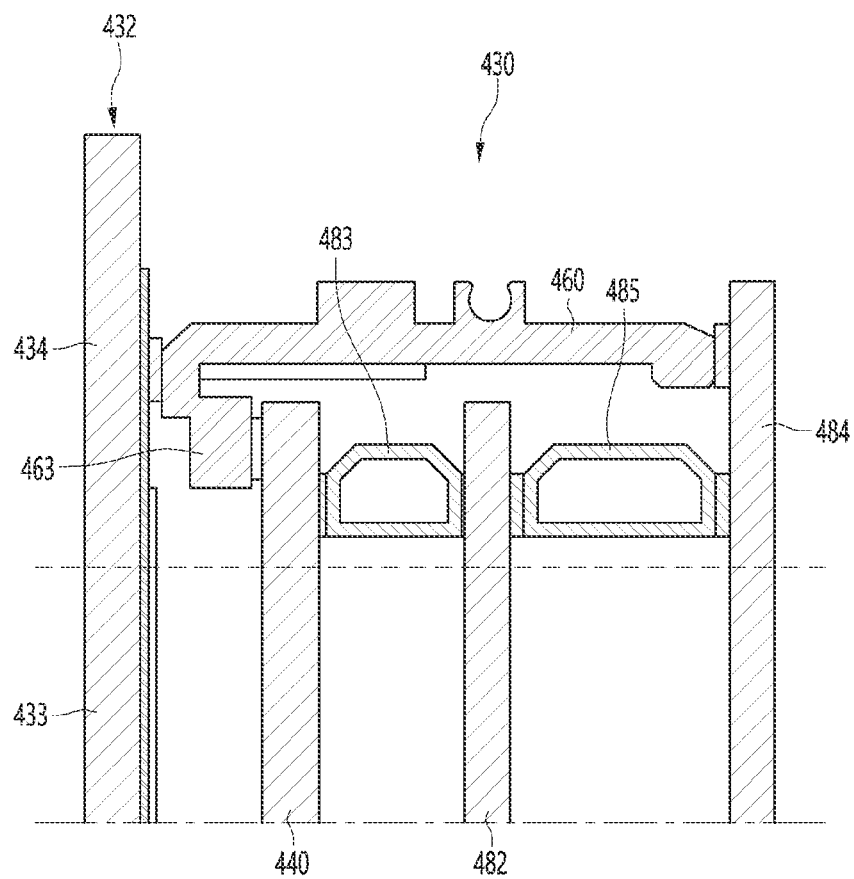
FIG. 9 is a cross-sectional view taken along line 9-9 of FIG. 6.
Figure 10:
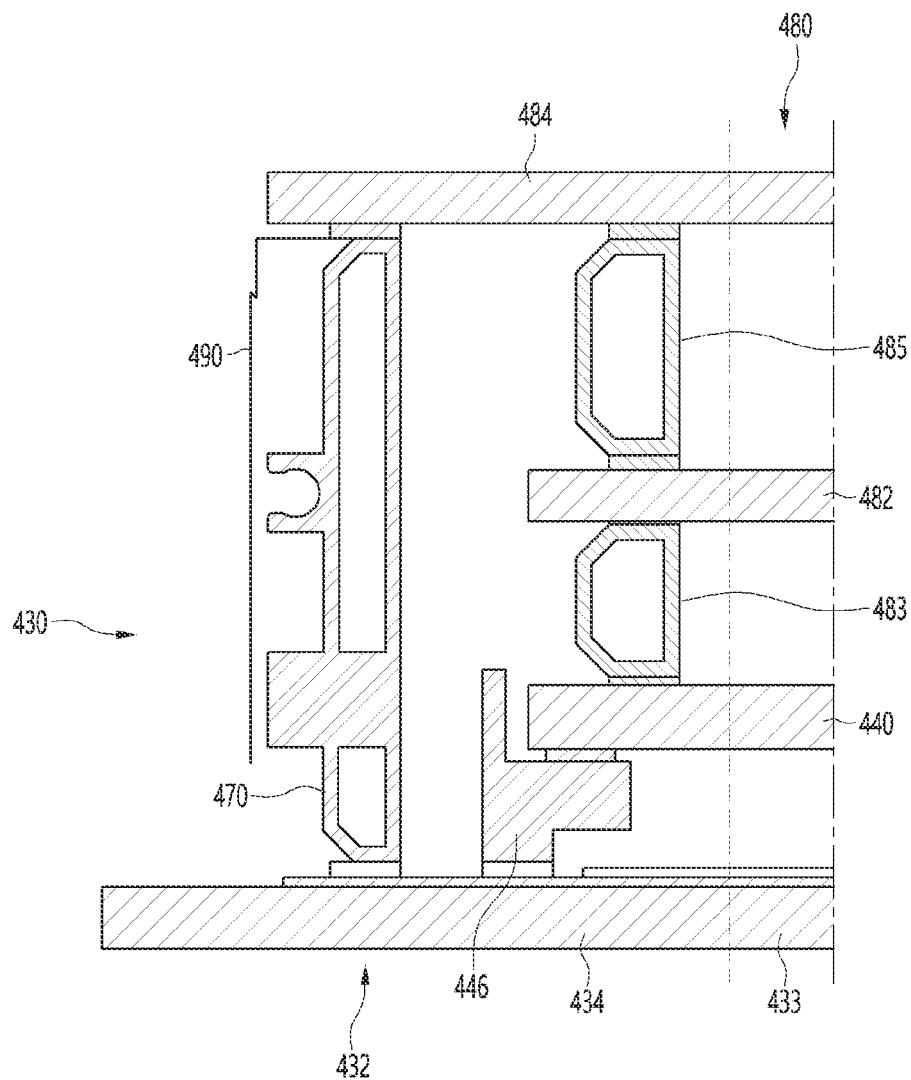
FIG. 10 is a cross-sectional view taken along line 10-10 of FIG. 6.

FIG. 6 is a perspective view of a panel assembly according to an embodiment, and FIG. 7 is an exploded perspective view of the panel assembly of FIG. 6. FIG. 8 is a front view of a front panel according to an embodiment, FIG. 9 is a cross-sectional view taken along line 9-9 of FIG. 6, and FIG. 10 is a cross-sectional view taken along line 10-10 of FIG. 6.

Referring to FIGS. 6 to 10, the panel assembly 430 according to this embodiment may include a front panel 432.

The front panel 432 may form an outer appearance of the front surface of the sub door 40. The front panel 432 may be made of a glass material or a transparent plastic material.

A printed layer may be provided on a portion of a rear surface of the front panel 432. The printed layer may restrict light transmission of the door lighting portion or a storage space lighting portion to be described later.

Since the printed layer is provided, the front panel 432 may include a first portion 433 through which light is transmitted and a second portion 434 through which light transmission is restricted. The second portion 434 has light transmittance less than that of the first portion 433. The transmission of light in the second portion 434 may be completely blocked, or transmittance of the second portion 434 may decrease by the printed layer. In this specification, the second portion 434 may be referred to as a bezel portion.

A distance between a lower end 433a of the first portion 433 and a lower end 432a of the front panel 432 is greater than that between an upper end 433b of the first portion 433 and an upper end 432b of the front panel 432.

The front panel 432 may further include a third portion 435. The third portion 435 is an area through which light passes.

The third portion 435 is disposed lower than the first portion 433. That is, the third portion 435 may be disposed between the first portion 433 and the lower end 432a of the front panel 432. A distance between the third portion 435 and the lower end 433a of the first portion 433 is greater than that between the third portion 435 and the lower end 432a of the front panel 432.

A vertical length of the first portion 433 may be greater than a left and right length of the first portion 433. A vertical length of the third portion 435 may be less than a left and right length of the third portion 435. The third portion 435 may extend in the form of a straight band.

The left and right length of the first portion 433 may be substantially the same as the left and right length of the third portion 435.

The panel assembly 430 may further include a first display 437.

The first display 437 may further include a touch panel 436 for a touch input and an LCD panel 438 on which a screen is output. The touch panel 436 may be disposed at a rear side of the front panel 432, and the LCD panel 438 may be disposed at a rear side of the touch panel 436. The touch panel 436 and the LCD panel 438 may be disposed to face the first portion 433.

The panel assembly 430 may further include a light guide plate 440. The light guide plate 440 may be disposed at a rear side of the LCD panel 438. The light guide plate 440 may be disposed to face at least the first portion 433.

The panel assembly 430 may further include a spacer 446 disposed between the light guide plate 440 and the front panel 432. For example, the light guide plate 440 may be spaced apart from the front panel 432 by the spacer 446. The light guide plate 440 may be supported by the spacer 446. For example, the light guide plate 440 may be supported in a state in which the plurality of spacers 446 are spaced apart from each other in a left and right direction.

The spacer 446 may be disposed to face the second portion 434 of the front panel 432 to prevent the spacer 446 from being exposed to the outside.

An entire area of the spacer 446 may be disposed to face the second portion 434 of the front panel 432.

The panel assembly 430 may further include a display light 450 for irradiating light to the light guide plate 440. For example, the display light 450 may be disposed above and below the light guide plate 440. The display light 450 may include, for example, a substrate and a plurality of light emitting portions (LEDs) arranged on the substrate.

The panel assembly 430 may include a supporter 460 for supporting the display light 450. For example, one supporter of the pair of supporters 460 may support the display light 450 at an upper side of the light guide plate 440, and the other supporter may support the display light 450 at a lower side of the light guide plate 440.

A portion 463 of the supporter 462 may be disposed between the front panel 432 and the light guide plate 440. A portion 463 of the supporter 462 may serve as a spacer for separating the front panel 432 from the light guide plate 440. The supporter 460 may be made of, for example, a metal material. Although not limited, the supporter 460 may be made of an aluminum material.

The supporter 460 may be disposed to correspond to the second portion 434 of the front panel 432 to prevent the supporter 460 from being exposed to the outside.

The panel assembly 430 may further include an insulating glass assembly 480. The insulating glass assembly 480 may include one or more insulating panels.

FIG. 9 illustrates an example in which the insulating glass assembly 480 includes a plurality of insulating panels.

The insulating glass assembly 480 may be disposed at a rear side of the light guide plate 440. The insulating glass assembly 480 includes a first insulating panel 482 disposed at the rear of the light guide plate 440 and a second insulating panel 484 disposed at the rear side of the first insulating panel 482.

A first spacer 483 may be disposed between the light guide plate 440 and the first heat insulating panel 482. A second spacer 485 may be disposed between the first insulating panel 482 and the second insulating panel 484.

For example, the light guide plate 440 and the first insulating panel 482 may be spaced apart from each other by the first spacer 483. The first insulating panel 482 and the second insulating panel 484 may be spaced apart from each other by the second spacer 485.

In the panel assembly 430, the second heat insulating panel 484 may be disposed at the rearmost side, and thus, the second heat insulating panel 484 may be referred to as a rear panel.

The first spacer 483 and the second spacer 485 may be disposed to correspond to the second portion 434 of the front panel 432 so that the first spacer 483 and the second spacer 485 are prevented from being exposed to the outside. For example, the first spacer 483 and the second spacer 485 may be disposed to face the second portion 434 of the front panel 432. A portion of the first heat insulating panel 482 may also be disposed to face the second portion 434 of the front panel 432. A portion of the second heat insulating panel 484 may also be disposed to face the second portion 434 of the front panel 432.

A left and right length and a vertical length of the second insulating panel 484 may be greater than those of the first insulating panel 482.

The panel assembly 430 may further include an outer frame 470. The outer frame 470 may be disposed between the front panel 432 and the second heat insulating panel 484. For example, a pair of outer frames 470 may be disposed to be spaced apart from each other in the left and right direction.

The outer frame 470 may be disposed to be spaced apart from the supporter 446 in a horizontal direction. Also, the outer frame 470 may be disposed to be spaced apart from the light guide plate 440 and the first heat insulating panel 482.

The panel assembly 430 may further include a cable 490 connected to the LCD panel 438 or the display light 450. The cable 490 may pass between the outer frame 470 and the second insulating panel 484.

Figure 11:
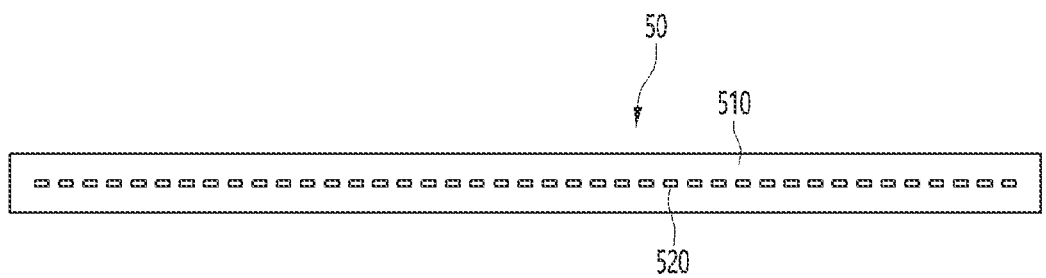
FIG. 11 is a view of a second display according to an embodiment.
Figure 12:
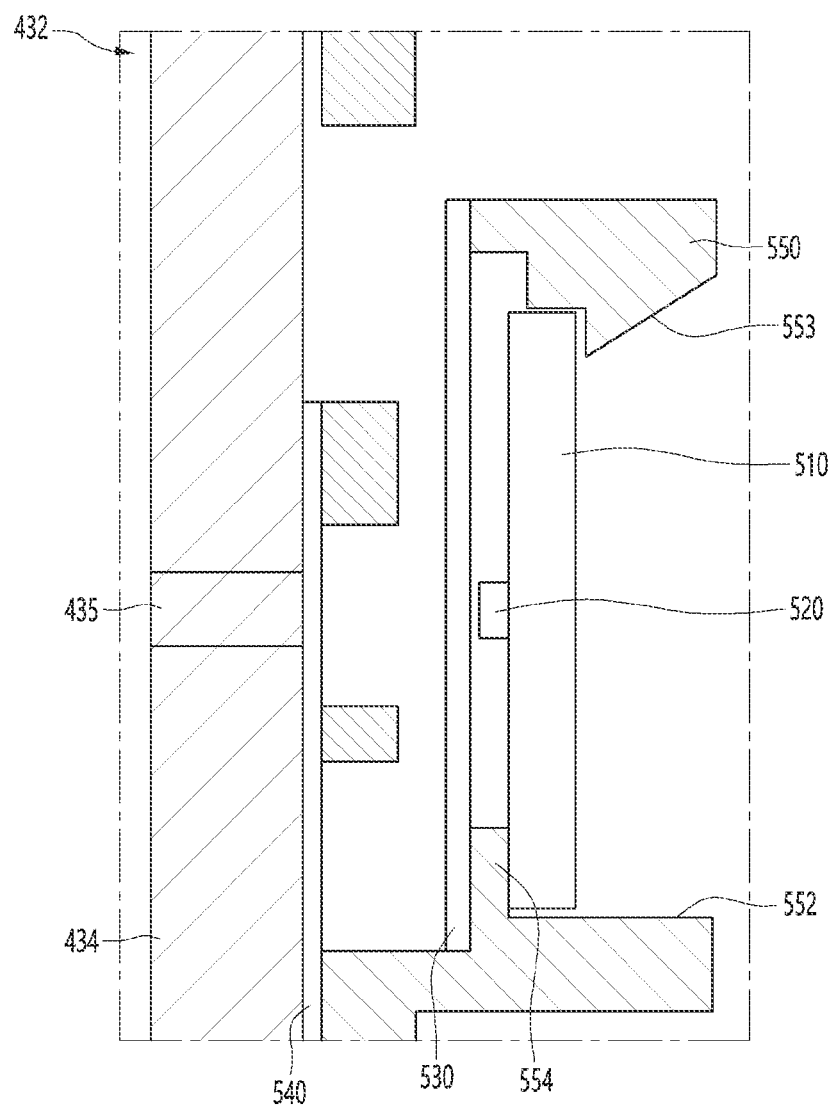
FIG. 12 is a cross-sectional view taken along line 12-12 of FIG. 6.

FIG. 11 is a view of a second display according to an embodiment, and FIG. 12 is a cross-sectional view taken along line 12-12 of FIG. 6.

Referring to FIGS. 11 and 12, the panel assembly 430 may further include a second display 50. The second display 50 may include, for example, a substrate 510 and a plurality of light emitting portions 520 installed on the substrate 510. Each of the light emitting portions 520 may be a white LED or an RGB LED.

Light irradiated from the plurality of light emitting portions 520 may pass through the third portion 435. The plurality of light emitting portions 520 may be arranged to be spaced apart in the horizontal direction, for example, may be arranged to face the third portion 435.

The sub door 40 may further include an outer bracket 550 disposed to surround the panel assembly 430. The outer bracket 550 may, for example, connect the outer plate 410 to the front panel 432.

A first surface of the outer bracket 550 may be connected to a rear surface of the front panel 432, and a second surface may be connected to a rear surface of the outer plate 410.

The second display 50 may be installed on the outer bracket 550. For example, the outer bracket 550 may be provided with an installation groove 552. When the substrate 510 is inserted into the installation groove 552 from the rear side of the outer bracket 550, the substrate 510 is hooked by the hook 553 after the substrate 510 passes through an elastically deformable hook 553. Thus, the position of the substrate 510 may be fixed by the hook 553.

A stopper 554 is provided on the outer bracket 550 to restrict movement of the substrate 510 when the substrate 510 is inserted into the installation groove 552.

A first diffusion sheet 530 may be provided between the second display 50 and the front panel 432. A second diffusion sheet 540 may be provided between the front panel 432 and the first diffusion sheet 530. For example, the second diffusion sheet 540 may be attached to the rear surface of the front panel 432.

Each of the plurality of light emitting portions 520 may be independently turned on/off. Some or all of the plurality of light emitting portions 520 may be changed in color.

Some or all of the plurality of light emitting portions 520 may be turned on, or the color of the turn-on light emitting portions may be changed. A length, color, brightness, etc. of light viewed outward from the third portion 435 may vary according to the number of light emitting portions 520 that are turned on.

Figure 13:
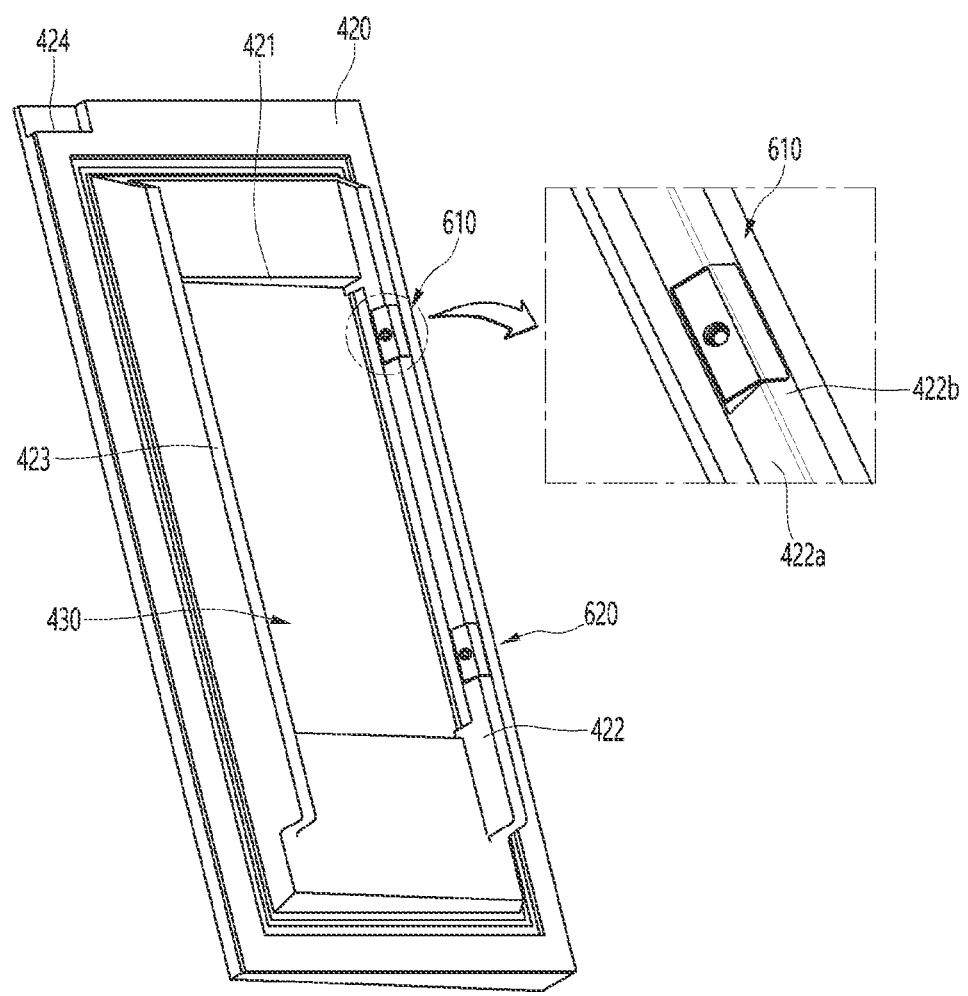
FIG. 13 is a view illustrating a state in which a plurality of cameras are installed at the sub door according to an embodiment.

FIG. 13 is a view illustrating a state in which a plurality of cameras are installed at the sub door according to an embodiment.

Referring to FIG. 13, a hinge coupling portion 424 to which a hinge is coupled may be provided above the second dike 423.

The first dike 422 may be spaced apart from the second dike 423 in the horizontal direction, and the second opening 421 may be disposed between the first dike 422 and the second dike 423.

A vertical length of each of the dikes 422 and 423 may be longer than that of the second opening 421.

The first camera assembly 610 may be disposed lower than an upper end of the second opening 421, and the second camera assembly 620 may be disposed higher than a lower end of the second opening 421.

A distance between the first camera assembly 610 and the second camera assembly 620 may be less than the vertical length of the second opening 421.

The first dike 422 may include a first surface 422a facing the second dike 423 and a second surface 422b extending in a direction crossing the first surface 422a from the first surface 422a. In addition, the first dike 422 may further include a third surface (see reference numeral 422c of FIG. 14) disposed on an opposite surface of the first surface 422a with respect to the second surface 422b.

In the state in which the sub door 40 is closed, the second surface 422b may face the refrigerating compartment 12.

A portion of each of the camera assemblies 610 and 620 may be disposed at a side of the first surface 422a, and the other portion may be disposed at a side of the second surface 422b.

In this case, a portion of each of the camera assemblies 610 and 620 may protrude from the first surface 422a, and the other portion may protrude from the second surface 422b. An outer sheet (to be described later) may be attached to the portion protruding from the first surface 422a of each of the camera assemblies 610 and 620.

Figure 14:
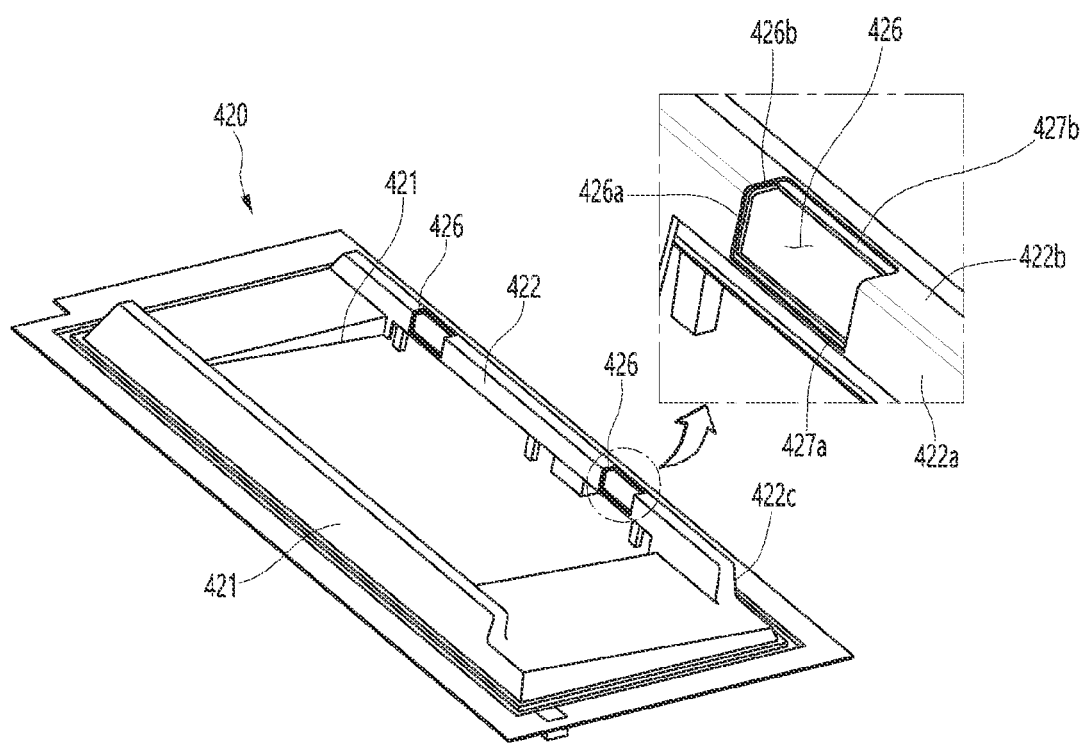
FIG. 14 is a rear perspective view of a door liner according to an embodiment.
Figure 15:
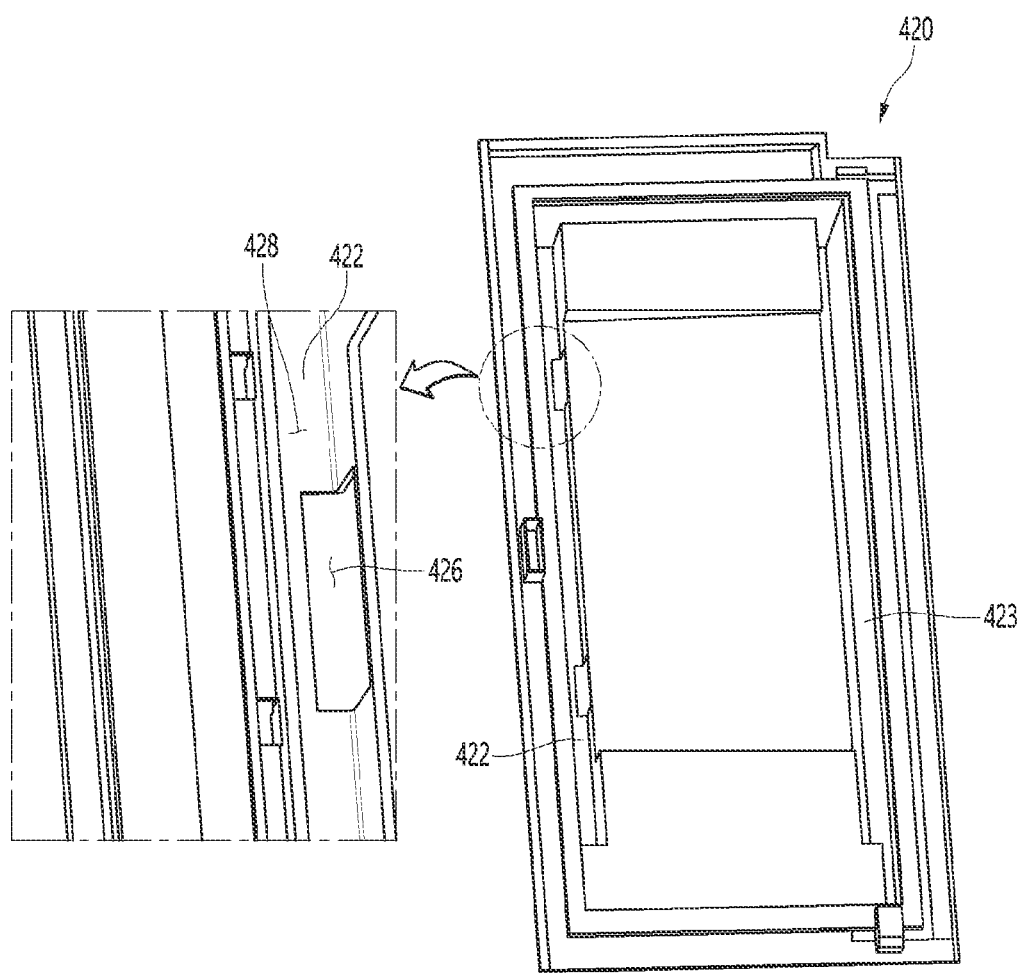
FIG. 15 is a front perspective view illustrating the door liner of FIG. 14.

FIG. 14 is a rear perspective view of the door liner according to an embodiment, and FIG. 15 is a front perspective view illustrating the door liner of FIG. 14.

Referring to FIGS. 14 and 15, in the door liner 420 according to this embodiment, the first dike 422 may be provided with an installation opening 426 for installing each of the camera assemblies 610 and 620.

In the first dike 422, the pair of installation openings 426 may be disposed to be vertically spaced apart from each other.

Each of the installation openings 426 may include a first portion 426a provided on the first surface 422a of the first dike 422 and a second portion 426b extending from the first portion 426a and provided on the second surface 422b.

A first seating groove 427a in which a portion of a cover member (see reference numeral 680 of FIG. 22) of each of the camera assemblies 610 and 620 to be described later may be defined in the first surface 422a of the first dike 422, and a second seating groove 427b in which the other portion of the cover member (see reference numeral 680 of FIG. 22) may be defined in the second surface 422b.

For example, the first portion 426a of the installation opening 426 may be provided in the first seating groove 427a, and the second portion 426b of the installation opening 426 may be provided in the second seating groove 427b.

An accommodation space 428 may be provided between the first surface 422a and the third surface 422c in the first dike 422. Each of the camera assemblies 610 and 620 may be accommodated in the accommodation space 428.

Figure 16:
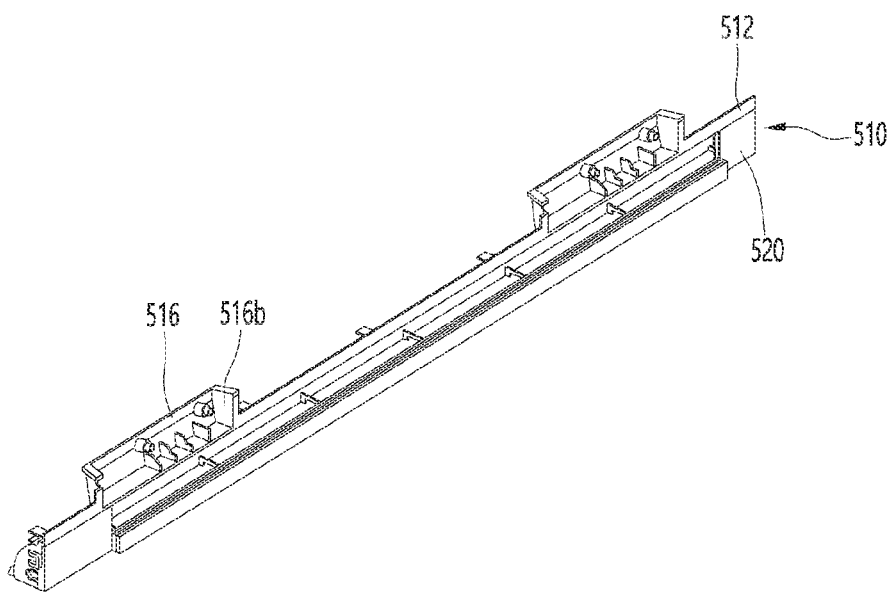
FIG. 16 is a perspective view of a frame assembly according to an embodiment.
Figure 17:
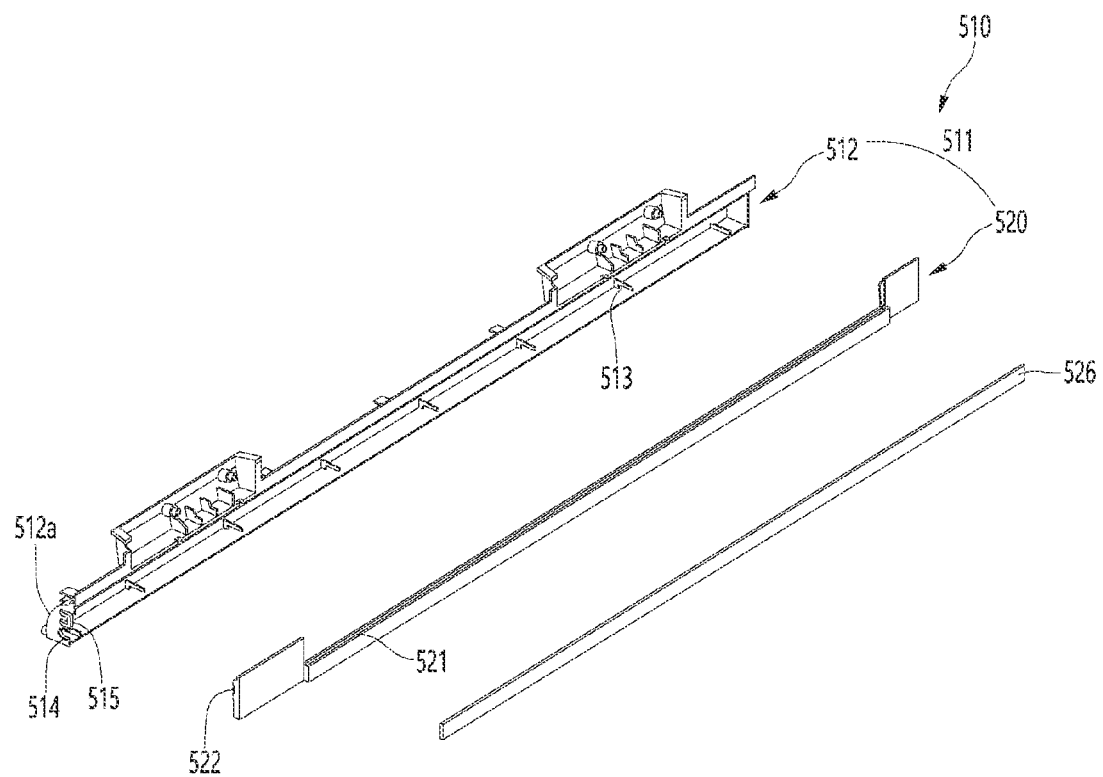
FIG. 17 is an exploded perspective view of the frame assembly.
Figure 18:
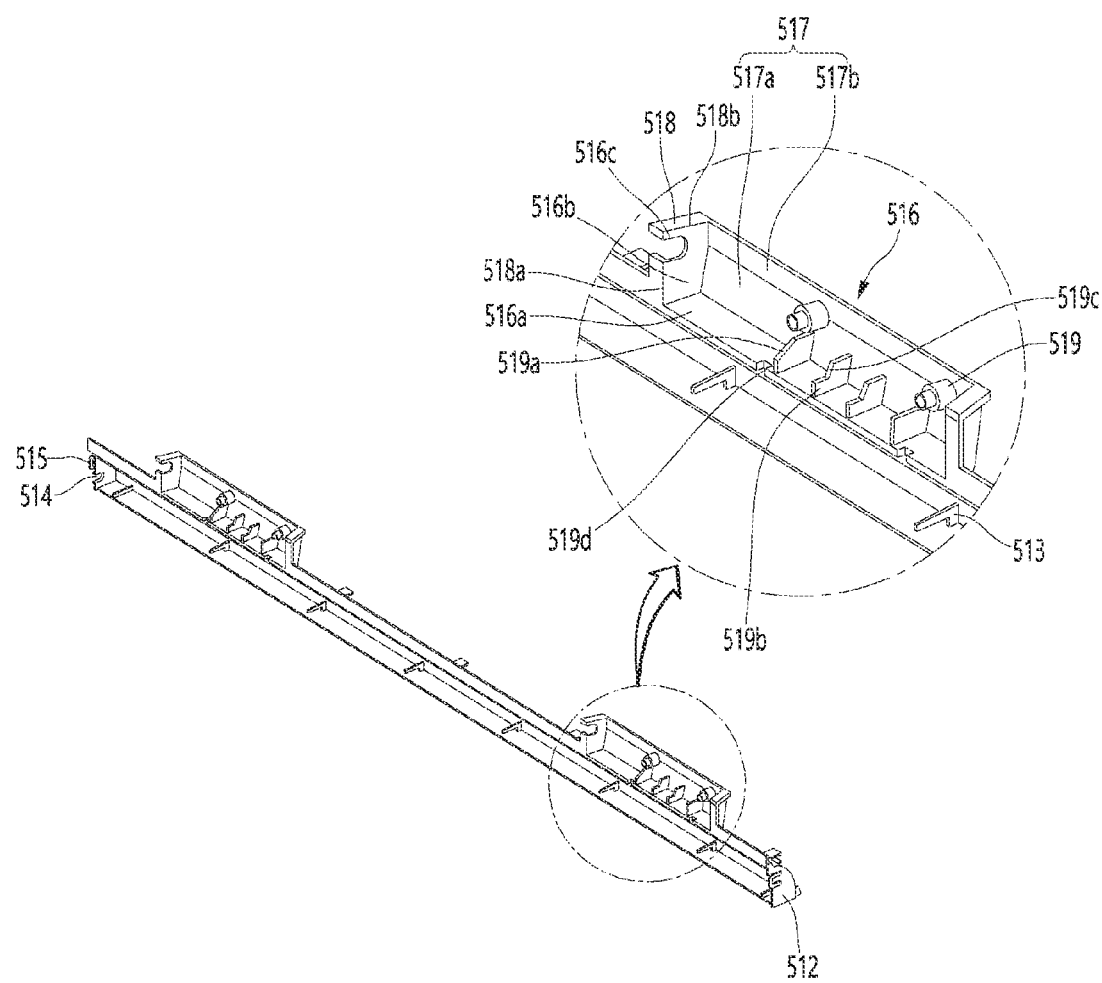
FIG. 18 is a perspective view of a first frame.
Figure 19:
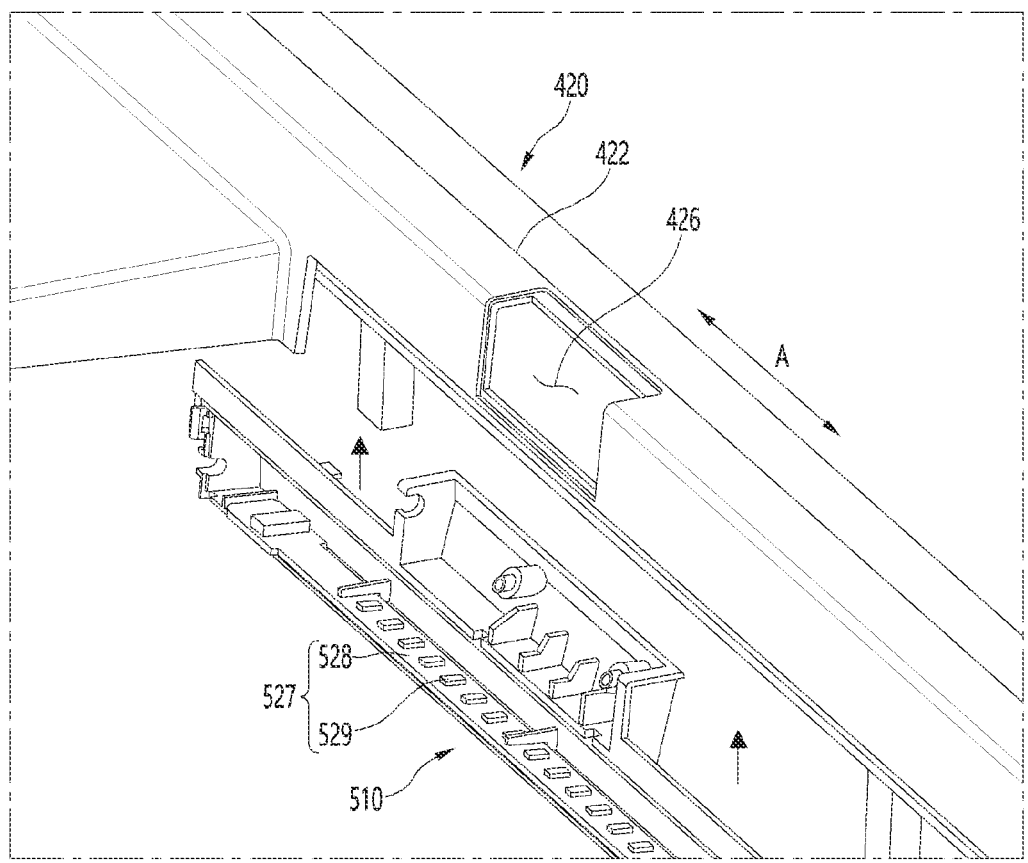
FIG. 19 is a view illustrating a state in which the frame assembly is coupled to the door liner.

FIG. 16 is a perspective view of a frame assembly according to an embodiment, FIG. 17 is an exploded perspective view of the frame assembly, FIG. 18 is a perspective view of a first frame, and FIG. 19 is a view illustrating a state in which the frame assembly is coupled to the door liner.

FIG. 19 illustrates a state in which a second frame and a transmission portion are removed from the frame assembly.

Referring to FIGS. 16 to 19, the sub door 40 may further include a frame assembly 510 installed on the first dike 422.

For example, the frame assembly 510 may be accommodated in the accommodation space 428.

The frame assembly 510 may include a mounting frame 516 on which the camera assemblies 610 and 620 are mounted.

The mounting frame 516 includes a base 516a, a pair of sidewalls 516b extending from both ends of the base 516a and a connection wall 517 connecting the pair of sidewalls 516b to each other.

The mounting frame 516 may include a first opening 518a corresponding to the first portion 426a of the installation opening 426 and a second opening 518b corresponding to the second portion 426b of the installation opening 426.

An electric wire slot 516c through which an electric wire passes may be provided in any one of the pair of sidewalls 516b.

The mounting frame 516 may further include a contact wall 518 extending in the horizontal direction from an edge of each of the pair of sidewalls 516b and the connection wall 517. The contact wall 518 may be attached to the second surface 422a of the first dike 422 by an attachment means (not shown). In addition, a sealing member may be attached to the contact wall 518, and the sealing member may be in contact with the first dike 422.

The connection wall 517 may include a first inclined wall 517a extending to be inclined from the base 516a and a second inclined wall 517b extending to be inclined with respect to the second inclined wall 517a.

A coupling boss 519 for coupling each of the camera assemblies 610 and 620 may be provided on the connection wall 517. The coupling boss 519 may extend to be inclined with respect to the base 516a.

The mounting frame 516 may include a first support rib 519a for supporting the camera module to be described later.

The first support rib 519a may include an inclined surface and support the camera module so that the camera module is disposed in an inclined state.

The mounting frame 516 may further include a second support rib 519b spaced apart from the first support rib 519a. The second support rib 519b may include a seating groove 519c in which a portion of the camera module is seated, and a portion of a surface defining the seating groove 519c may be an inclined surface.

The base 516a may include a coupling groove 519d to which a cover member 680 to be described later is coupled.

The frame assembly 510 may further include a lighting portion frame 511 for mounting the door lighting portion 527.

The lighting portion frame 511 may include a first frame 512 and a second frame 520 coupled to the first frame 512.

The first frame 512 may be integrated with the mounting frame 516 or may be coupled to the mounting frame 516. For example, a pair of mounting frames 516 may be connected to the first frame 512.

The first frame 512 may be provided with an installation rib 513 for installing the door lighting portion 527. The installation rib 513 may extend from the bottom of the first frame 512, for example, in a shape such as "7". The door lighting portion 527 may be inserted between the bottom of the first frame 512 and the installation rib 513.

The door lighting portion 527 may include, for example, a substrate 528 and a plurality of light emitting portions 529 installed on the substrate 528. The substrate 528 may be inserted between the bottom of the first frame 512 and the installation rib 513.

The substrate 528 may be provided to be elongated in a longitudinal direction (direction of an arrow A) of the first dike 422.

The first frame 512 may be provided with an electric wire opening 514 through which an electric wire (not shown) connected to the door lighting portion 527 passes.

The second frame 520 may be coupled to the first frame 512 to cover the door lighting portion 527.

The second frame 520 may be provided with a coupling protrusion 522, and the first frame 512 may be provided with a protrusion coupling portion 515 to which the coupling protrusion 522 is coupled.

A lighting opening 521 may be provided in the second frame 520, and the transmission portion 526 may be coupled to the lighting opening 521. Light irradiated from the light emitting portion 528 may pass through the transmission portion 526. The first frame 512 may include a reflective surface 512a that is inclined or rounded, and the light irradiated from the light emitting portion 528 may be reflected by the reflective surface 512a and then pass through the transmission portion 526.

The door lighting portion 527 may be disposed between each of the camera assemblies 610 and 620 and the panel assembly 430.

The frame assembly 510 may be accommodated in the accommodation space 428 in a state in which the frame assembly 510 is aligned with the accommodation space 428 of the first dike 422. The frame assembly 510 may be coupled to the first dike 422 by the coupling means. The coupling means may include a hook, a screw, an adhesive, a tape, and the like.

In this embodiment, it has been described that the door lighting portion 527 is provided at the first dike 422, but it is also possible that an additional door lighting portion is provided at the second dike 423.

The door lighting portion 527 may be turned on when a turn-on command is input in the state in which the sub door 40 is closed. When the door lighting portion 527 is turned on, the user may check foods stored in the door storage space 32 in the state in which the sub door 40 is closed.

As another example, the door lighting portion 527 may be provided on the main door 30. Even in this case, when the turn-on command is input in the state in which the sub door 40 is closed, the door lighting portion 527 may be turned on.

Figure 20:
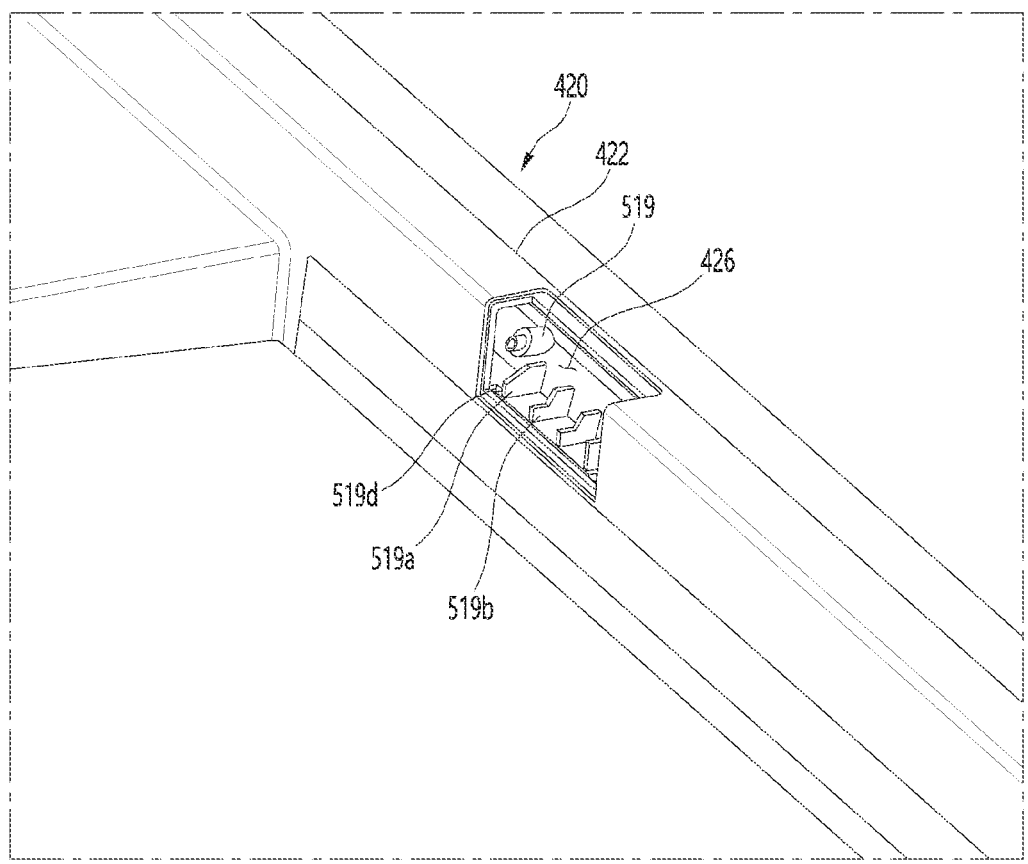
FIG. 20 is a view illustrating a state in which the frame assembly is coupled to a first dike.

FIG. 20 is a view illustrating a state in which the frame assembly is coupled to a first dike.

Referring to FIGS. 19 and 20, a length of the first dike 422 of the mounting frame 516 in the longitudinal direction may be greater than that of the installation opening 426. When the frame assembly 510 is mounted on the first dike 422, a portion of the mounting frame 516 may be exposed through the installation opening 426.

For example, when the frame assembly 510 is mounted on the first dike 422, the first opening 518a of the mounting frame 516 may be aligned with the first portion 426a of the installation opening 426, and the second opening 518b may be aligned with the second portion 426b. In addition, the coupling boss 519 of the mounting frame 516 and the support ribs 519a and 519b may be exposed through the installation opening 426. In addition, the coupling groove 519d of the mounting frame 516 may be exposed through the installation opening 426.

Figure 21:
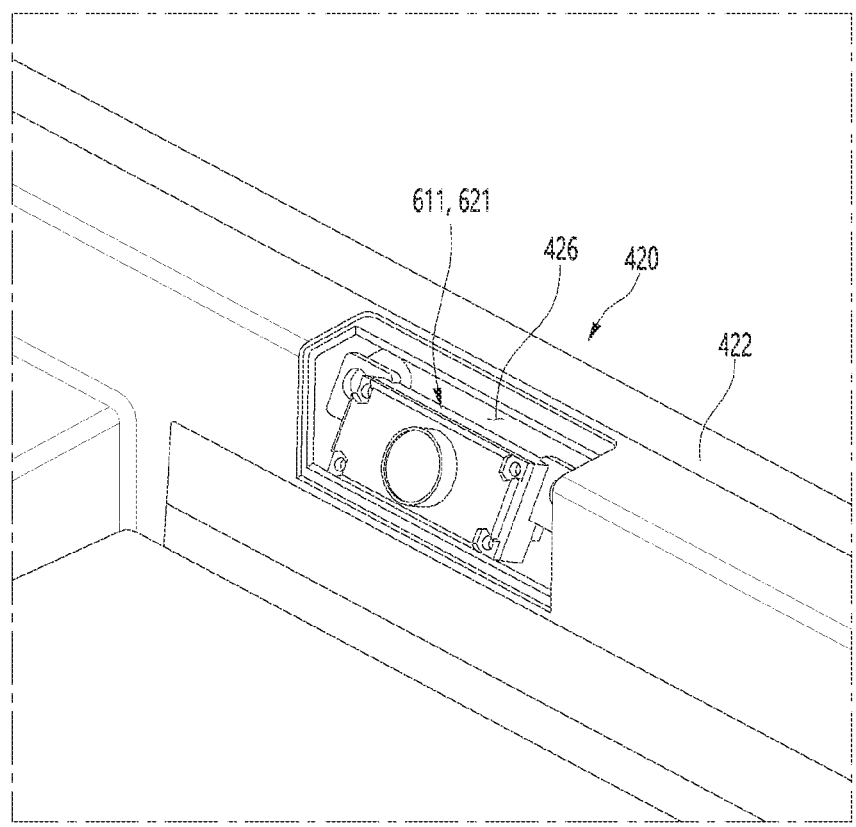
FIG. 21 is a view illustrating a state in which a camera module is seated on a mounting frame in FIG. 20.
Figure 22:
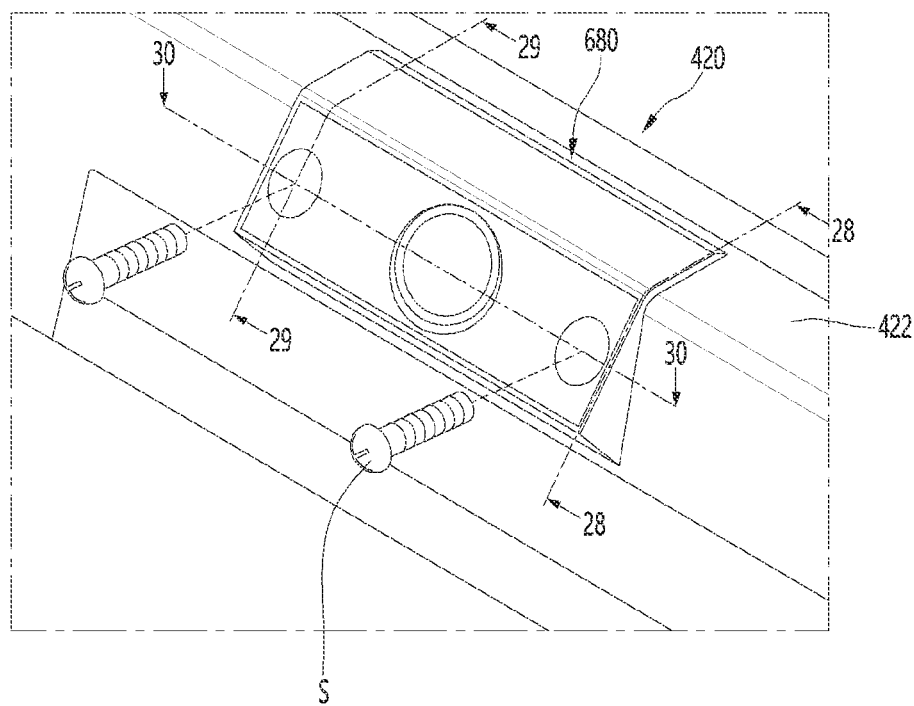
FIG. 22 is a view illustrating a state in which a cover member is coupled to the mounting frame.

FIG. 21 is a view illustrating a state in which the camera module is seated on the mounting frame in FIG. 20, and FIG. 22 is a view illustrating a state in which the cover member is coupled to the mounting frame.

Referring to FIGS. 21 and 22, each of the camera modules 611 and 621 may be seated on the mounting frame 516 through the installation opening 426. Thereafter, the cover member 680 may be seated in the seating grooves 427a and 427b of the first dike 422. As a result, the cover member 680 may cover the installation opening 426.

Then, the coupling member S may be coupled to the cover member 680. The coupling member S passing through the cover member 680 may be mounted to the coupling boss 519 of the mounting frame 516 after passing through the camera modules 611 and 621. That is, in this embodiment, the cover member 680 and the camera modules 611 and 621 may be fixed to the mounting frame 516 by performing one coupling operation.

Figure 23:
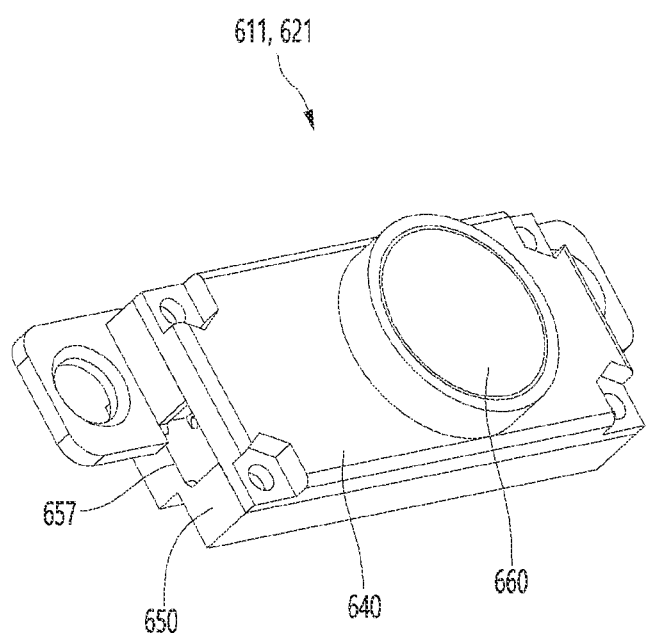
FIGS. 23 and 24 are perspective views of the camera modules according to an embodiment.
Figure 24:
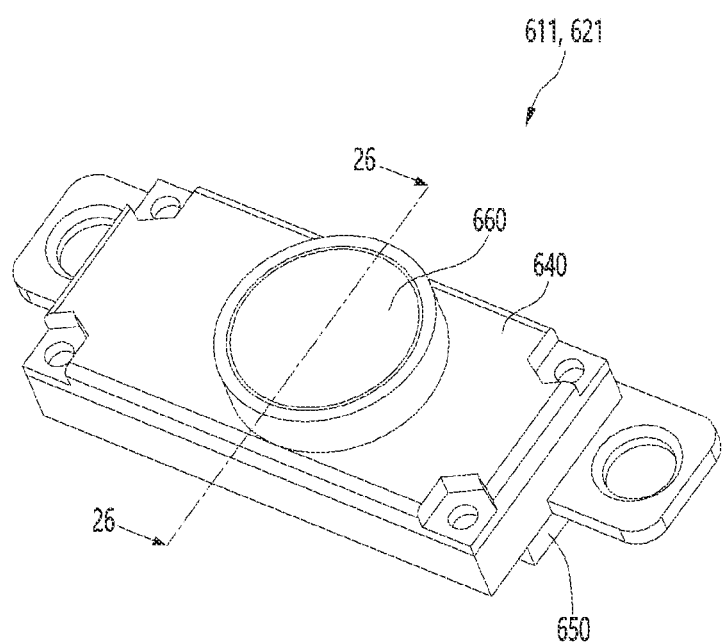
Figure 25:
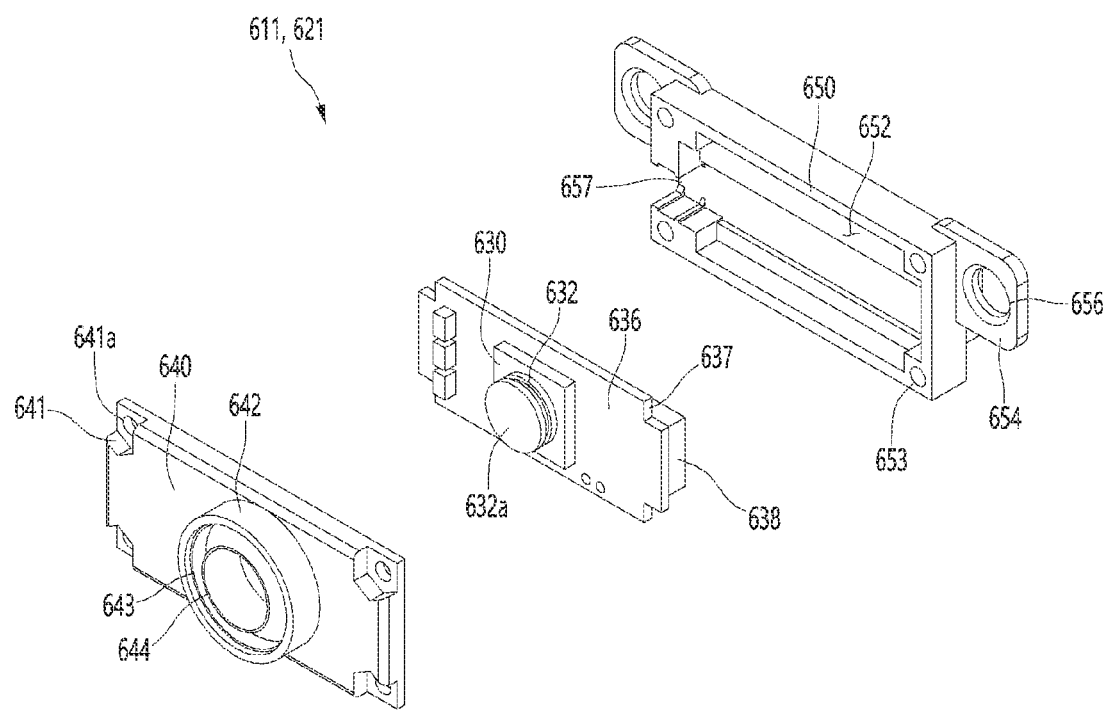
FIG. 25 is an exploded perspective view of the camera module according to an embodiment.
Figure 26:
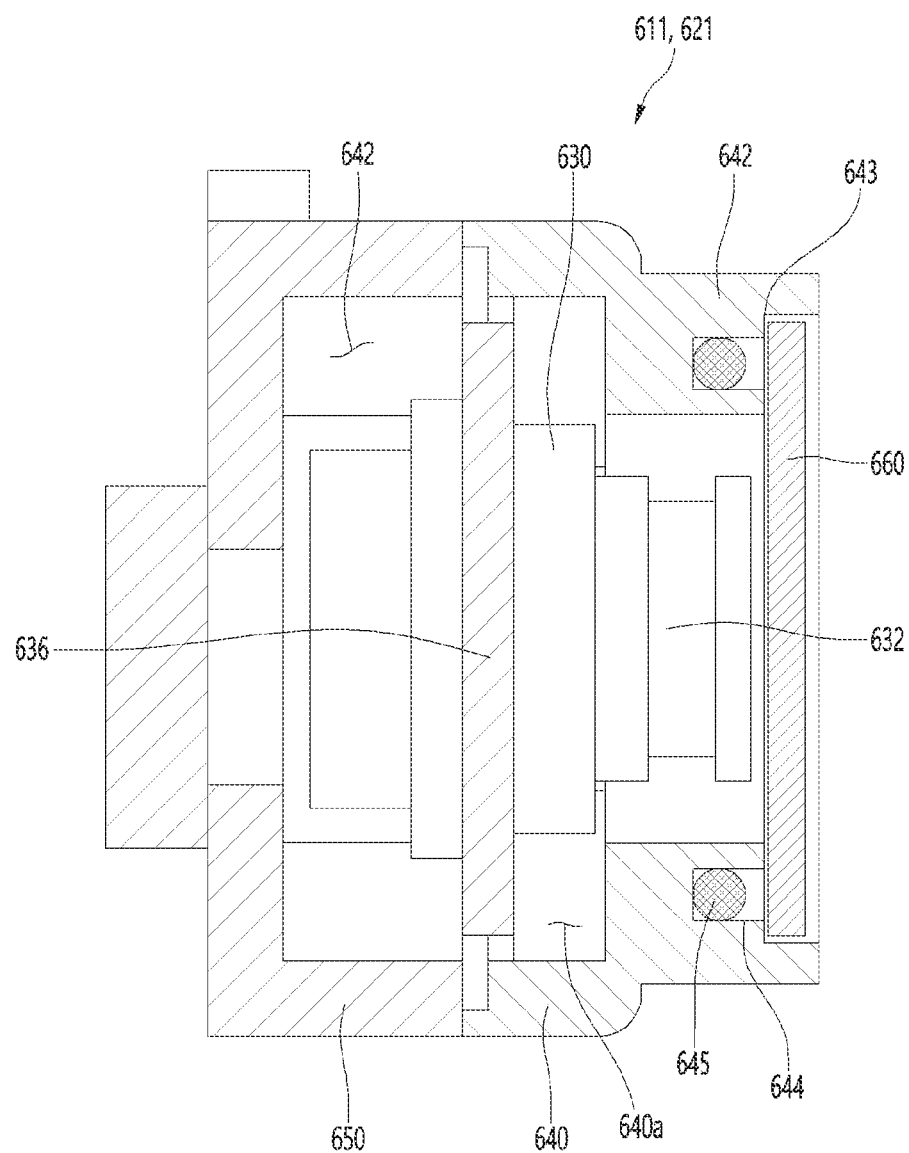
FIG. 26 is a cross-sectional view taken along line 26-26 of FIG. 24.

FIGS. 23 and 24 are perspective views of the camera modules according to an embodiment, FIG. 25 is an exploded perspective view of the camera module according to an embodiment, and FIG. 26 is a cross-sectional view taken along line 26-26 of FIG. 24.

Referring to FIGS. 23 to 26, the camera assemblies 610 and 620 may include camera modules 611 and 621, respectively.

The camera modules 611 and 621 may include an imaging element 630, a substrate 636 supporting the imaging element 630, and housings 640 and 650 accommodating the substrate 636. The imaging element 630 may include a lens 632. The lens 632 may include an imaging surface 632a.

The imaging element 630 may be installed, for example, at a central portion of a first surface of the substrate 636. A slot 637 may be defined at each of four corners of the substrate 636. A control element 638 may be installed on a second surface opposite to the first surface of the substrate 636.

The housings 640 and 650 may include a first housing 640 and a second housing 650 coupled to the first housing 640.

The first housing 640 may define a first space 640a. The imaging element 630 may be disposed in the first space 640a.

The first housing 640 may include a lens guide 642. The lens guide 642 may protrude from the first housing 640 and may have, for example, a cylindrical shape.

The lens 632 may be accommodated in the lens guide 642.

The lens guide 642 may be provided with a seating groove 643 in which the window 660 disposed to face the imaging surface 632a of the lens 632 is seated.

The seating groove 643 may be defined as one surface of the lens guide 642 is recessed toward the second housing 650.

In the state in which the window 660 is seated in the seating groove 643, the window 660 is spaced apart from the imaging surface 632a.

A heater accommodation groove 644 in which a heater 645 is accommodated may be provided in the seating groove 643. The heater accommodation groove 644 may be defined as one surface of the seating groove 643 is recessed toward the second housing 650. The heater accommodation groove 644 may be provided, for example, in a ring shape and may be disposed to surround the lens 632 while being spaced apart from the lens 632.

The heater 645 may provide heat to the lens 632 and the window 660 to prevent dew condensation from being generated.

A coupling groove 641 may be defined at each of four corners of the first housing 640. The coupling groove 641 may be defined as the front surface of the first housing 610 is recessed toward the second housing 650.

A coupling hole 641a through which the coupling member passes may be defined in the coupling groove 641. The coupling member coupled to the coupling hole 641a may pass through the slot 637 of the substrate 636.

The second housing 650 may include a second space 542 in which at least the control element 638 is disposed. The substrate 636 may be accommodated in at least one of the first space 640a or the second space 542.

The second housing 650 may have a coupling groove 653 to which the coupling member passing through the coupling hole 641a is coupled. The coupling groove 653 may also be disposed at each of four corners of the second housing 650.

The second housing 650 may further include a plurality of extension portions 654. The plurality of extension portions 654 may extend from both sides of the second housing 650.

A hole 656 through which the coupling boss 519 of the mounting frame 516 passes may be defined in each of the extension portions 654.

An electric wire hole 657 through which an electric wire (see reference symbol W of FIG. 31) connected to the substrate 636 passes may be defined in the second housing 650.

Figure 27:
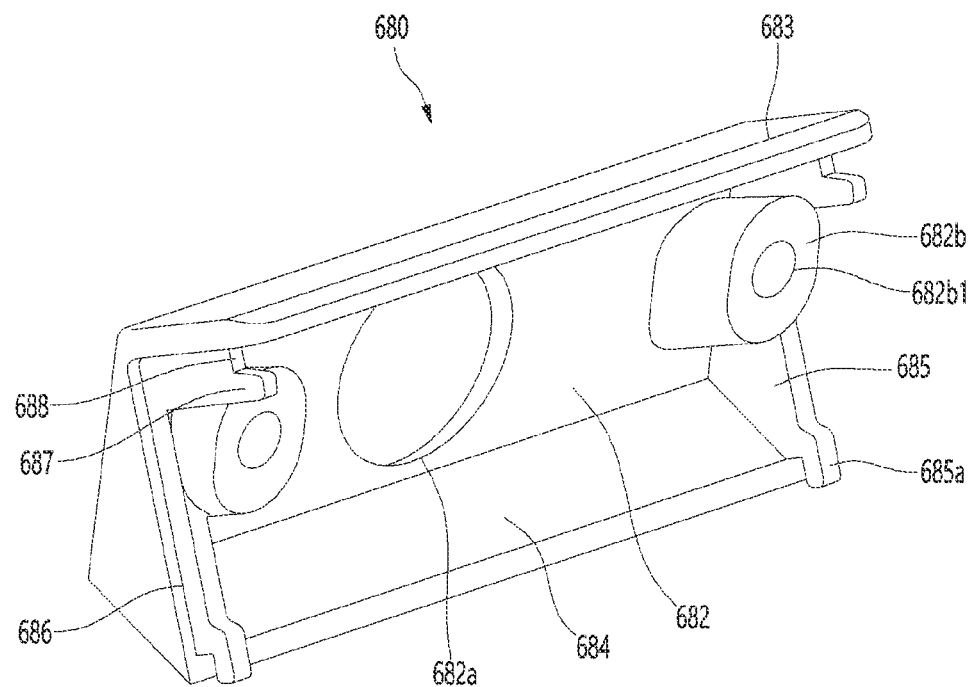
FIG. 27 is a perspective view of the cover member according to an embodiment.

FIG. 27 is a perspective view of the cover member according to an embodiment.

Referring to FIG. 27, each of the camera assemblies 610 and 620 may further include a cover member 680 that covers each of the camera modules 611 and 621 seated on the mounting frame 516.

The cover member 680 may include a first wall 682 having an opening 682a into which the lens guide 432 is inserted.

The window 660 may be disposed in the opening 682a. The front surface of the window 660 may be the same as or parallel to a front surface of the first wall 682. The window 660 may be disposed to be inclined with the first surface 422a and the second surface 422b of the first dike 422.

The cover member 680 may further include a coupling protrusion 682b extending from the first wall 682. A through-hole 682b1 through which the coupling member S passes may be defined in the coupling protrusion 682b.

An insertion groove (see reference numeral 682d of FIG. 29) into which the coupling member S is inserted may be defined at a position corresponding to the coupling protrusion 682b in the first wall 682.

The cover member 680 may further include a second wall 683 extending from one side of the first wall 682. The second wall 683 may be inclined with the first wall 682. The first wall 682 may cover the first portion 426b of the installation opening 426.

The cover member 680 may further include a third wall 684 extending from the other side of the first wall 682. The third wall 684 may be disposed at a side opposite to the second wall 682 with respect to the first wall 682. The third wall 684 may be inclined with respect to the first wall 682.

The cover member 680 may further include a pair of connection walls 685 extending from both ends of the first wall 682 to connect the second wall 683 to the third wall 684.

Each of the connection walls 655 may include a recess portion 686. As one surface of each of the connection walls 655 is recessed in a direction to approach each other, the recess portion 686 may be defined.

The connection wall 655 may include a coupling protrusion 685a. The coupling protrusion 685a may be disposed to be spaced a predetermined distance from the third wall 684. The coupling protrusion 685a may be inserted into the coupling groove 519d of the mounting frame 516.

The connection wall 655 may further include a hook portion 687. The hook portion 687 may be spaced a predetermined distance from the second wall 683. A hook groove 688 may be disposed between the second wall 683 and the hook portion 687. A portion of the second surface 422b of the first dike 422 may be disposed in the hook groove 688.

Figure 28:
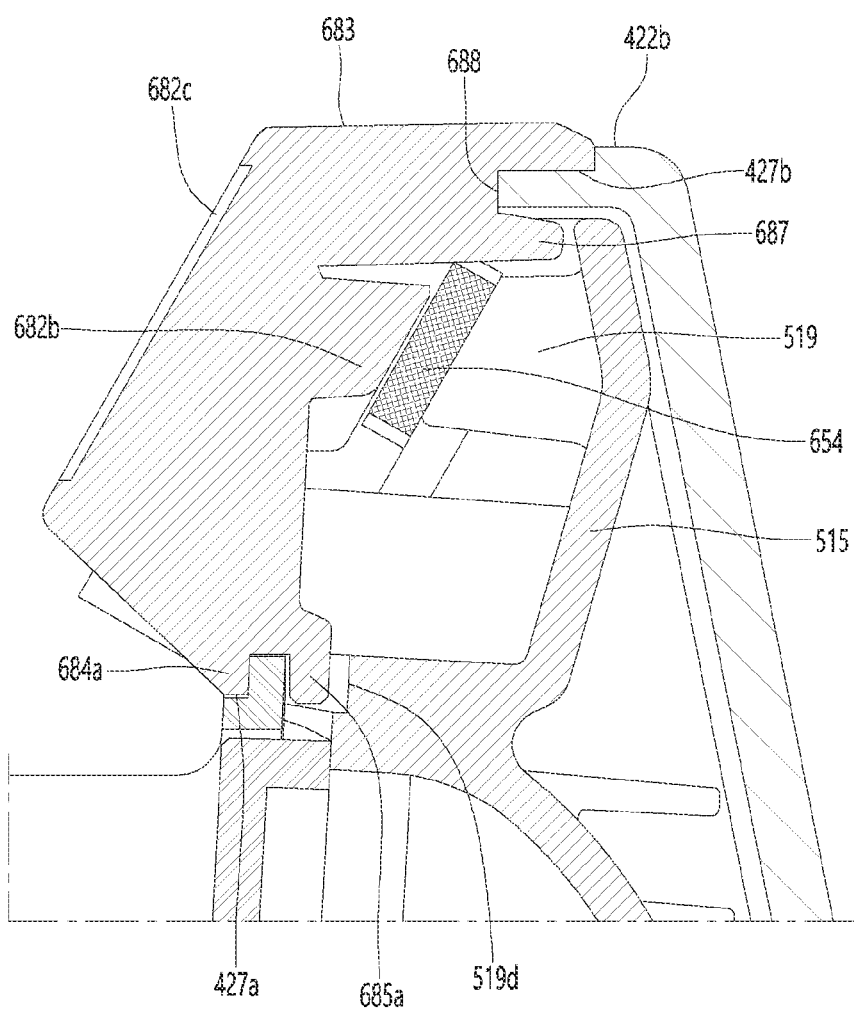
FIG. 28 is a cross-sectional view taken along line 28-28 of FIG. 22.
Figure 29:
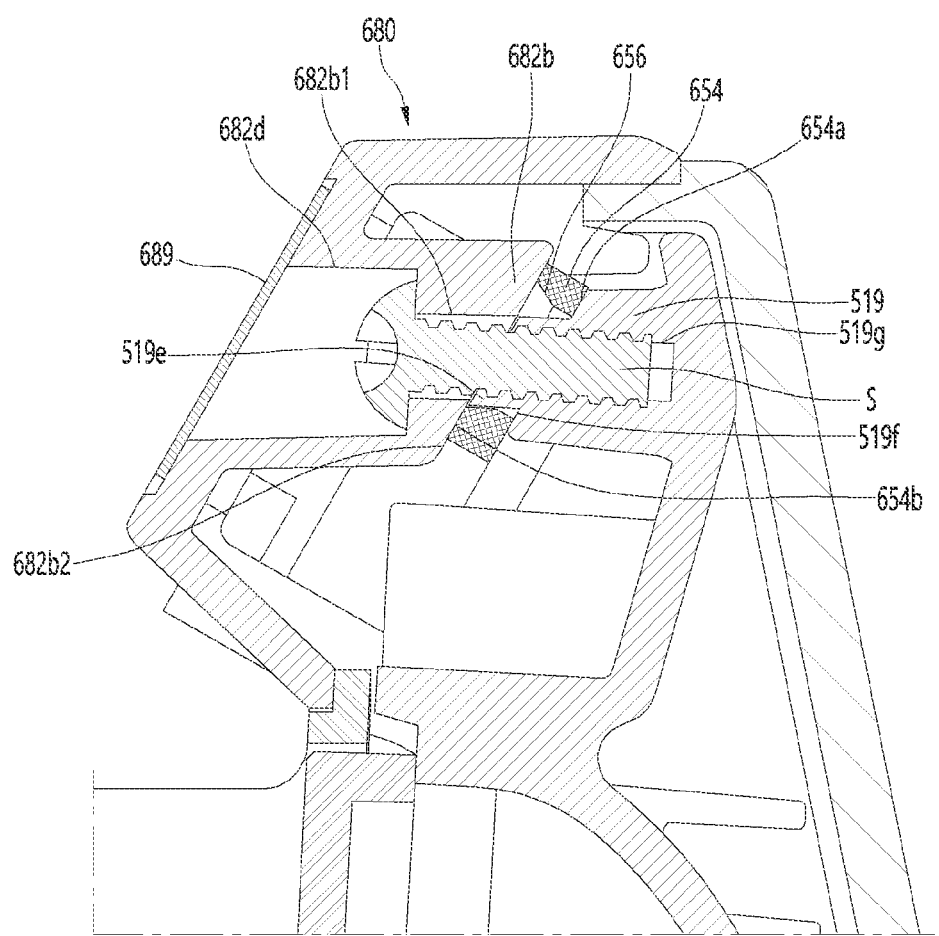
FIG. 29 is a cross-sectional view taken along line 29-29 of FIG. 22.
Figure 30:
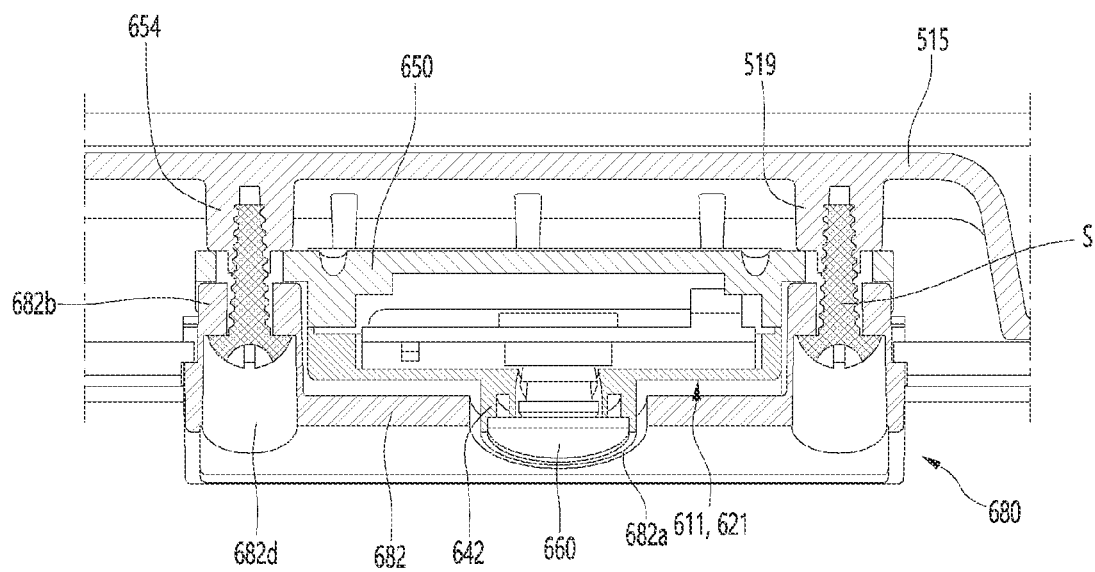
FIG. 30 is a cross-sectional view taken along line 30-30 of FIG. 22.

FIG. 28 is a cross-sectional view taken along line 28-28 of FIG. 22, FIG. 29 is a cross-sectional view taken along line 29-29 of FIG. 22, and FIG. 30 is a cross-sectional view taken along line 30-30 of FIG. 22.

Referring to FIGS. 28 to 30, when the camera modules 611 and 621 are seated on the support ribs 519a and 519b of the mounting frame 516, an end 519e of the coupling boss 519 may be inserted into the hole 656 provided in the extension portion 654 of each of each of the camera modules 611 and 621. The end 519e of the coupling boss 519 may be provided to have a diameter less than that of the other portion of the coupling boss 519 when being stepped. Thus, the coupling boss 519 may include an inclined surface 519f that is in contact with the extension portion 654 in the state in which the end 519e is inserted into the hole 656 provided in the extension portion 654 of each of the camera modules 611 and 621. The extension portion 654 may include a first contact surface 654a that is in contact with the inclined surface 519f.

The first contact surface 654a may be parallel to the first wall 682 of the cover member 680. The first contact surface 654a may be disposed to be inclined with respect to the second surface 422b of the first dike 422.

The extension portion 654 may include a second contact surface 654b parallel to the first contact surface 654a. The second contact surface 654b may be in contact with the coupling protrusion 682b of the cover member 680. The coupling protrusion 682b may include an inclined surface 682b2 that is in contact with the second contact surface 654b.

In order to couple the cover member 680 to the mounting frame 516, the coupling protrusion 685a may be inserted into the coupling groove 519d. In addition, a portion of the second surface 422b of the first dike 422 may be inserted into the hook groove 688 of the cover member 680.

Then, a portion of the second wall 683 may be seated in the second seating groove 427b, and a portion of the third wall 684 may be seated in the first seating groove 427a.

When the cover member 680 is seated in the first seating groove 427a and the second seating groove 427b of the first dike 422, the lens guide 642 may be inserted into the opening 682 of the first wall 682. In addition, the first contact surface 654a is in contact with the inclined surface 519f of the coupling boss 519.

When the inclined surface 682b2 of the coupling protrusion 682b is in contact with the first contact surface 654b, the coupling groove 519g of the coupling boss 519, the hole 656 of the extension portion 654, and the through-hole 682b1 of the coupling protrusion 682b may be aligned with each other. In this state, the coupling member S may pass through the through-hole 682b1 of the coupling protrusion 682b and the hole 656 of the extension portion 654 and then be coupled to the coupling groove 519g of the coupling boss 519.

A seating groove 682c for seating the outer sheet 689 may be defined in the first wall 682. The outer sheet 689 may cover the insertion groove 682d while being seated in the seating groove 682c. Also, the outer sheet 689 may cover the window 660. When the outer sheet 689 covers the window 660, at least a portion of the outer sheet 689 corresponding to the window 660 may be made of a transmissive material. Alternatively, the outer sheet 689 may include a hole defined at a position corresponding to the window 660.

Figure 31:
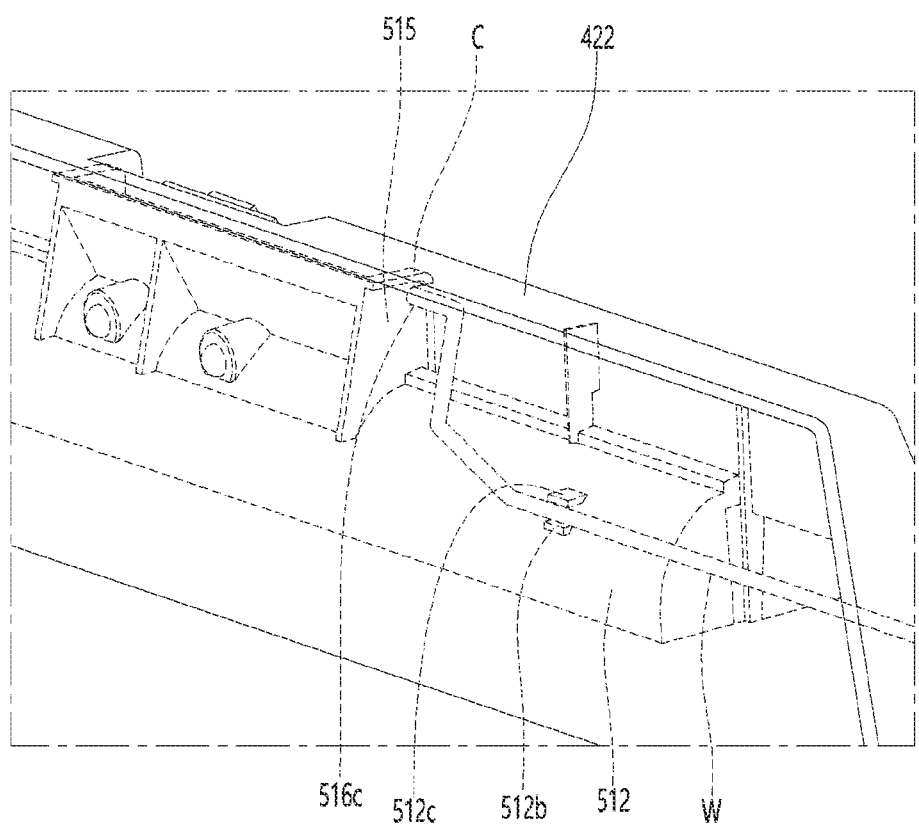
FIG. 31 is a view illustrating a state in which an electric wire connected to the camera module extends from the inside of the first dike in the state in which the camera assembly is installed.

FIG. 31 is a view illustrating a state in which an electric wire connected to the camera module extends from the inside of the first dike in the state in which the camera assembly is installed.

Referring to FIG. 31, the electric wire W connected to the camera modules 611 and 621 passes through the electric wire slot 516c of the mounting frame 516 to extend into the first dike 422. A pair of guide ribs 512b and 512c for guiding the extension of the electric wire W may be provided in the first frame 512. The pair of guide ribs 512b and 512c are spaced a predetermined distance from each other, and the electric wire W may be disposed between the pair of guide ribs 512b and 512c.

Figure 32:
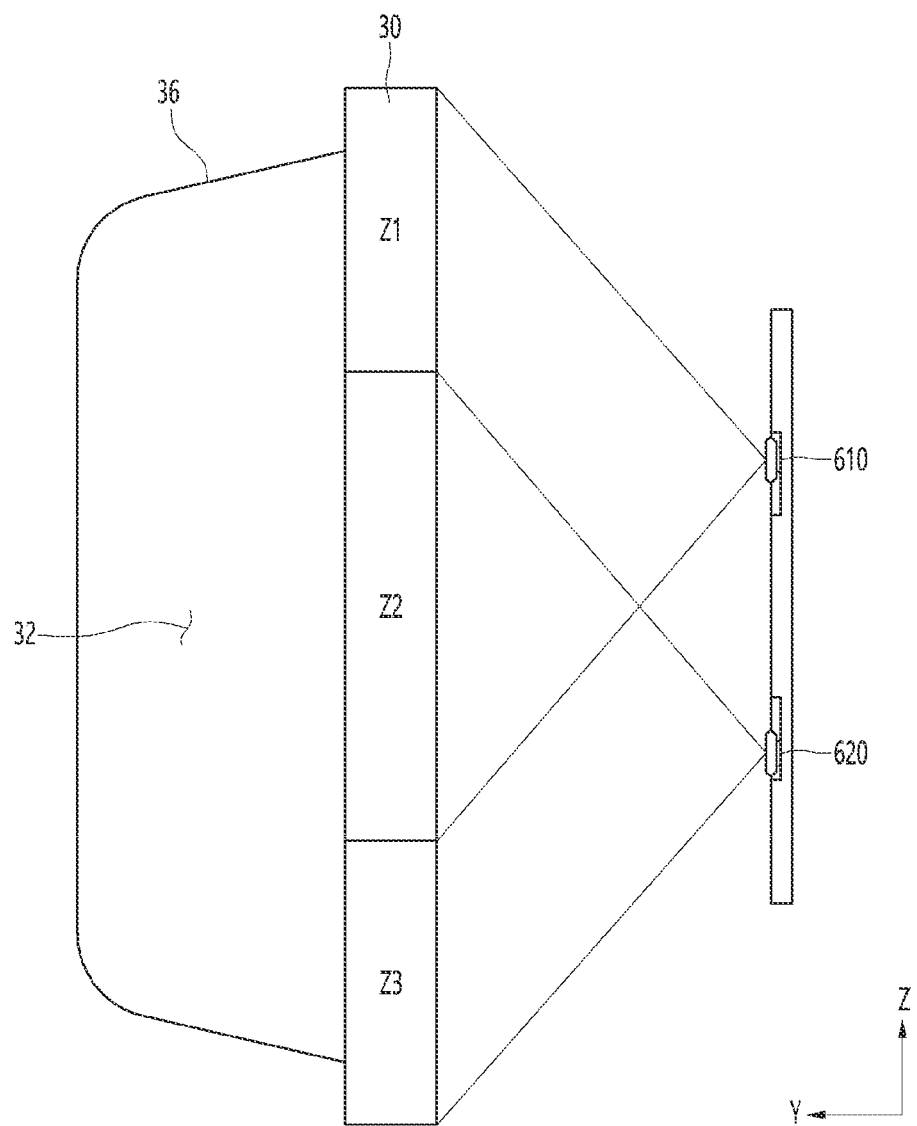
FIG. 32 is a view illustrating an area photographed by a first camera assembly and a second camera assembly according to an embodiment.

FIG. 32 is a view illustrating an area photographed by the first camera assembly and the second camera assembly according to an embodiment.

Referring to FIG. 32, in the state in which the sub door 40 is opened, the first camera assembly 610 photographs an upper portion and a central portion of the main door 30, and the second camera assembly 620 photographs the central portion and a lower portion of the main door 30. Thus, the first camera assembly 610 photographs an upper portion and a central portion of the main door 30, and the second camera assembly 620 photographs the central portion and the lower portion of the main door 30.

Therefore, the main door 30 may be divided into first to third zones Z1, Z2, and Z3 in the vertical direction.

The first zone Z1 is a zone photographed only by the first camera assembly 610. The first mark 34 may be disposed in the first zone Z1.

The second zone Z2 is a zone disposed below the first zone Z1 and is a zone commonly photographed by the camera assemblies 610 and 620.

The third zone Z3 is a zone disposed below the second zone Z2 and is a zone photographed only by the second camera assembly 620. The second mark 35 may be disposed in the third zone Z3.

The image photographed by the first camera assembly 610 includes the first zone Z1 and the second zone Z2, and the image photographed by the second camera assembly 620 includes the second zone Z2 and the third zone Z3.

One image including the first to third regions Z1 to Z3 may be obtained by overlapping the second zone Z2 in the two images acquired by the camera assemblies 610 and 620.

As another example, one first intermediate image may be generated by extracting at least a portion of the first zone Z1 and a portion of the second zone Z2 from the image acquired by the first door camera 610, and one second intermediate image may be generated by extracting the other portion of the second zone Z2 and at least a portion of the third zone Z3. Then, it is also possible to obtain one resultant image by synthesizing the first intermediate image and the second intermediate image.

Figure 33:
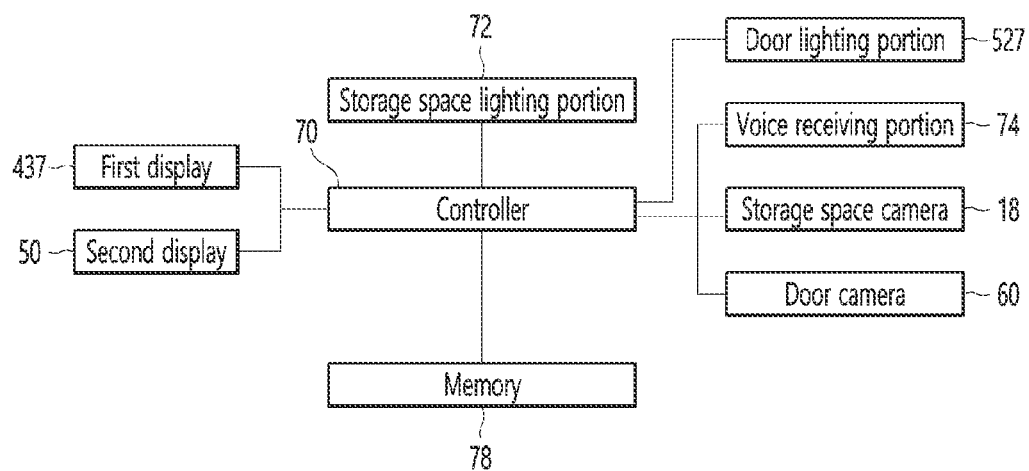
FIG. 33 is a block diagram of the refrigerator according to an embodiment.

FIG. 33 is a block diagram of the refrigerator according to an embodiment.

Figure 34A:
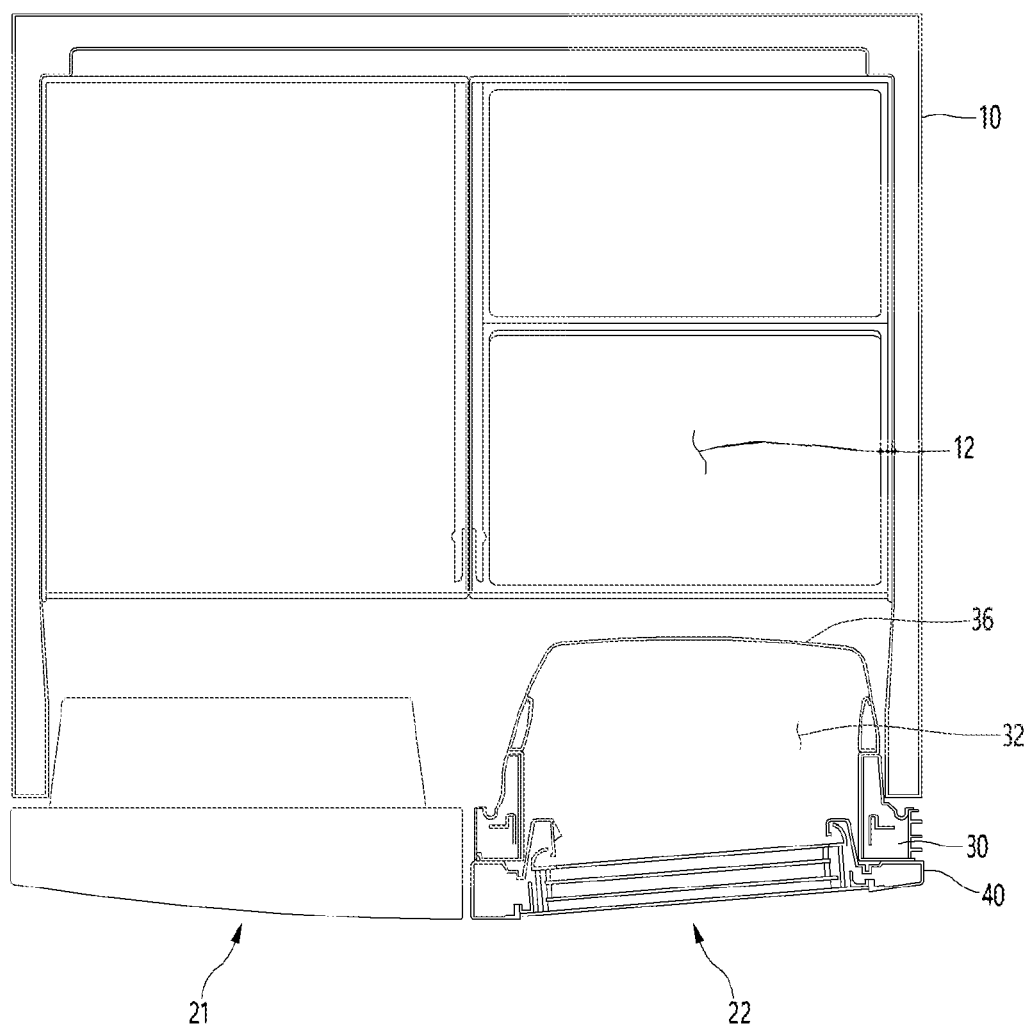
FIG. 34a is a schematic cross-sectional view taken along line 34a-34a of FIG. 1.
Figure 34B:
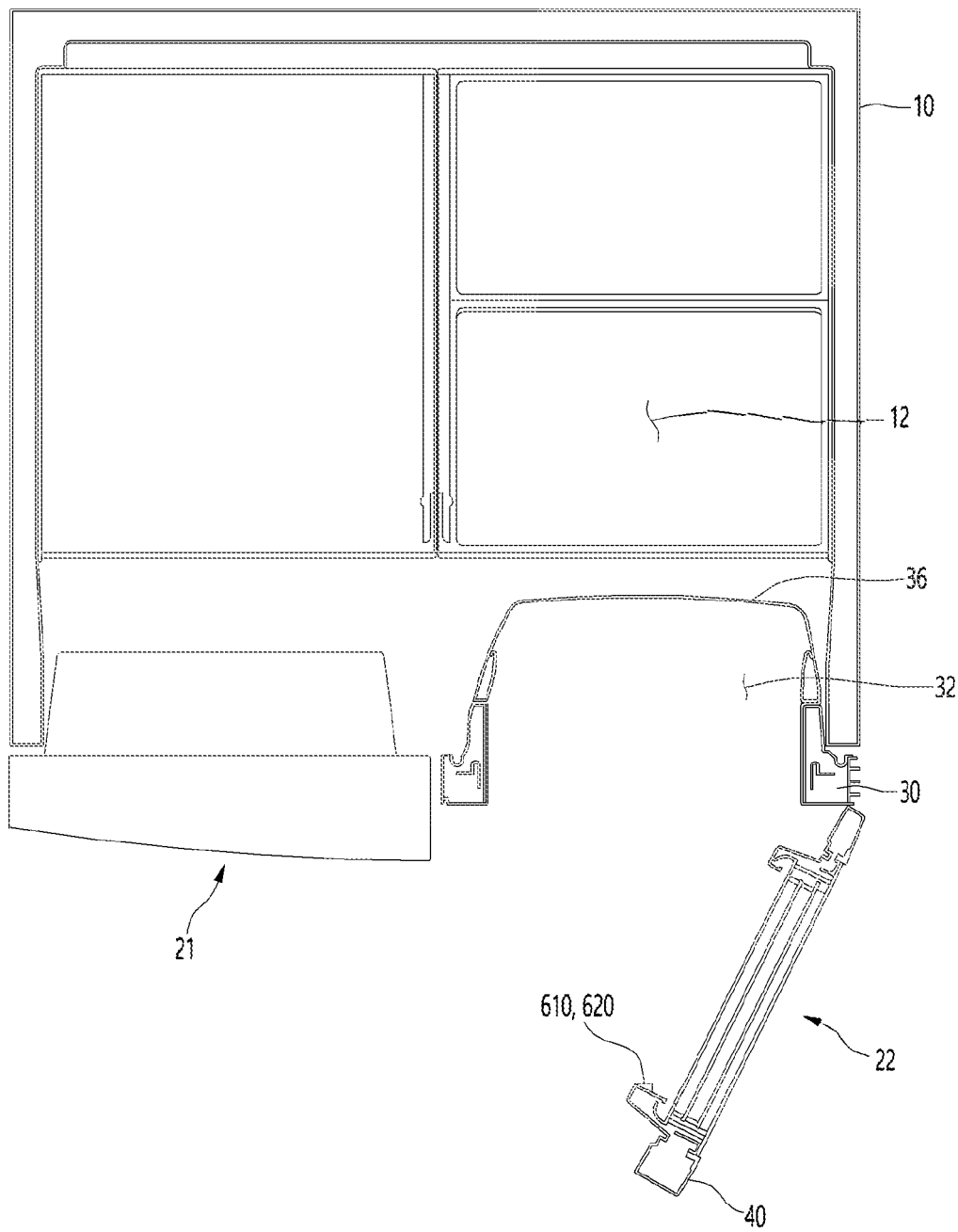
FIG. 34b is a schematic cross-sectional view taken along line 34b-34b of FIG. 3.
Figure 35A:
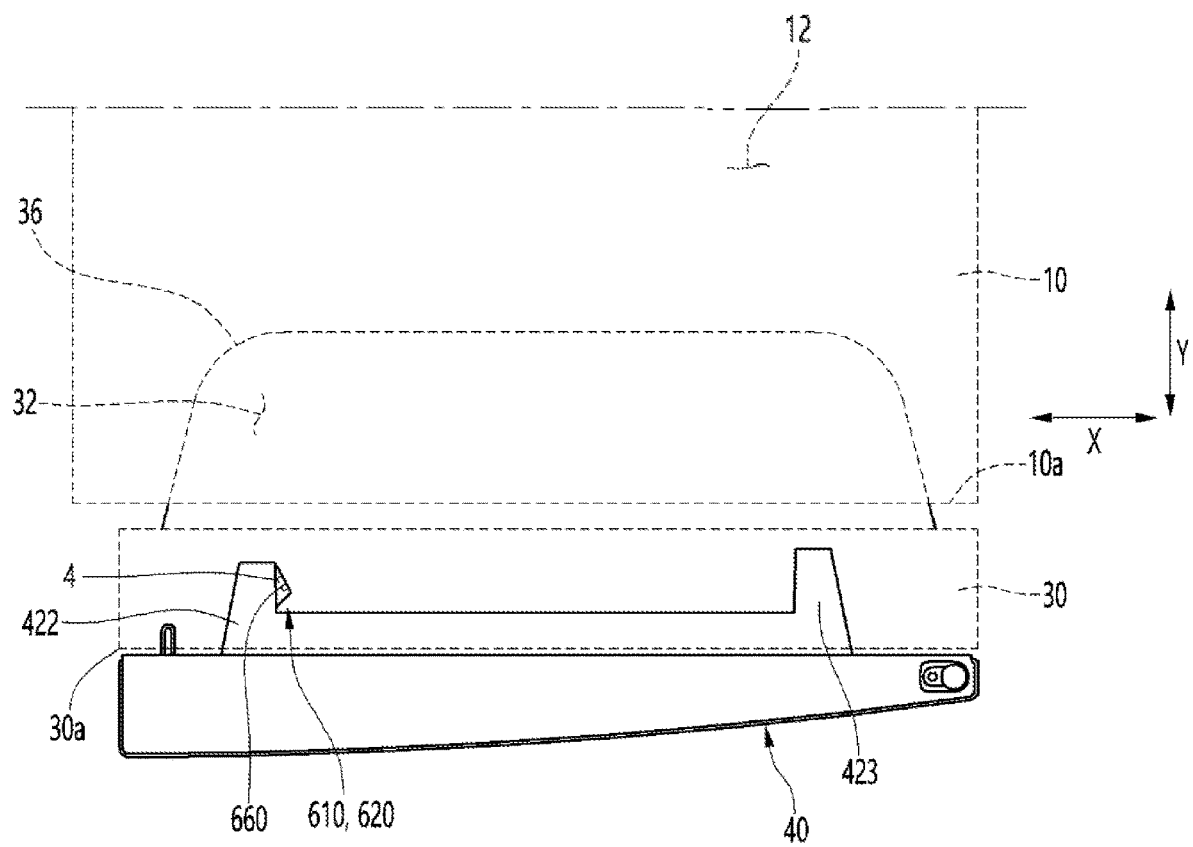
FIG. 35a is a view illustrating a state in which the main door and the sub door are closed.
Figure 35B:
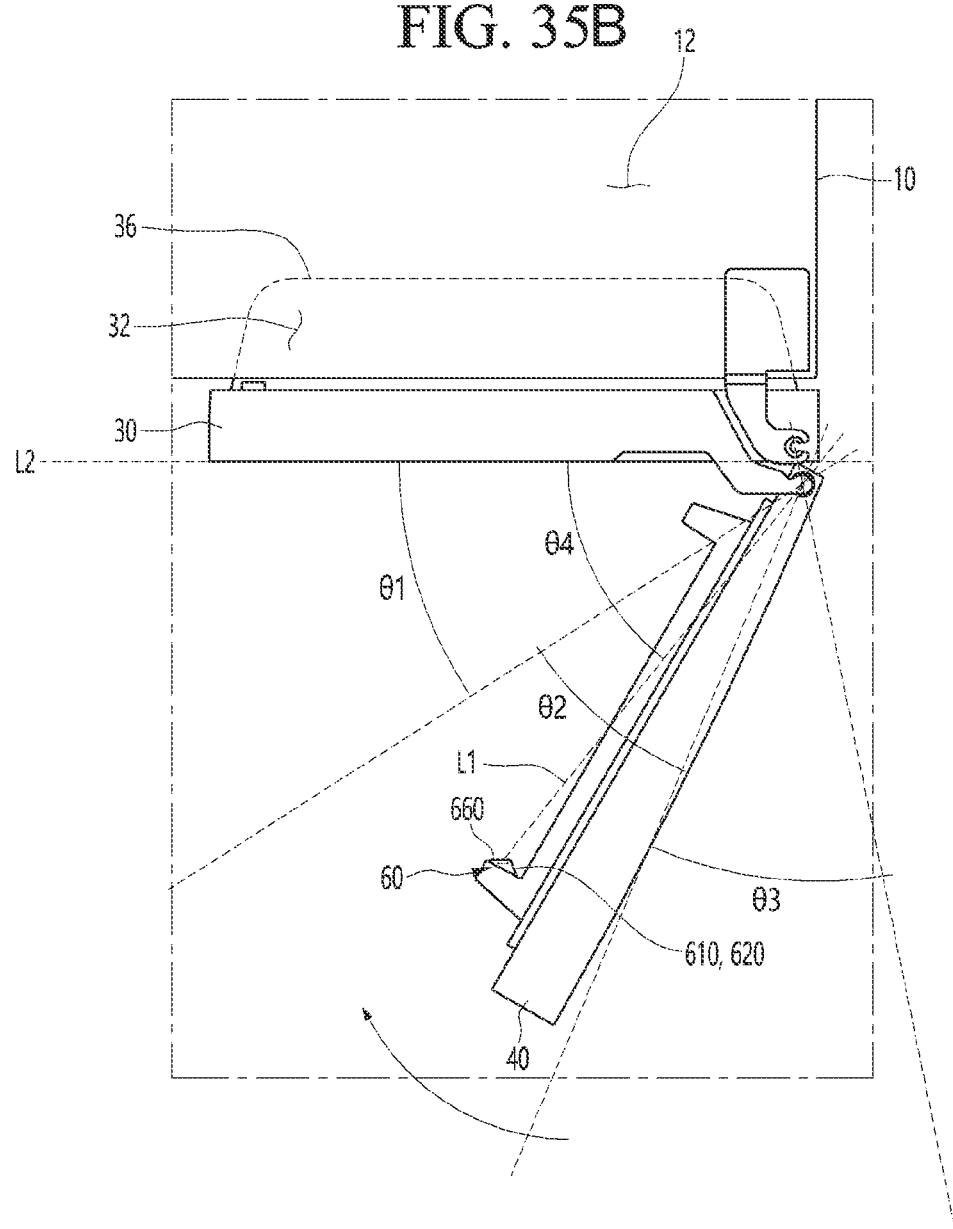
FIG. 35b is a view illustrating a state in which the sub door is being closed after being opened at a maximum opening angle in the state in which the main door is closed.

FIG. 34a is a schematic cross-sectional view taken along line 34a-34a of FIG. 1, and FIG. 34b is a schematic cross-sectional view taken along line 34b-34b of FIG. 3. FIG. 35a is a view illustrating a state in which the main door and the sub door are closed, and FIG. 35b is a view illustrating a state in which the sub door is being closed after being opened at a maximum opening angle in the state in which the main door is closed.

Referring to FIGS. 34a to 35b, the refrigerator 1 according to this embodiment may further include a controller 70. The controller 70 may control an overall operation of the refrigerator 1, control operations of some of the components constituting the refrigerator 1, or control some functions provided in the refrigerator 1.

The refrigerator 1 may further include a storage space lighting portion 72. The storage space lighting portion 72 may be turned on when the doors 20 and 23 are opened.

The refrigerator 1 may further include the storage space camera 18 described above. The storage space camera 18 may operate in a state in which the refrigerator compartment door 21 is opened, and the storage space lighting portion 72 is turned on.

The image photographed by the storage space camera 18 may be stored in the memory 78. The controller 70 may compare the images stored in the memory 78 to determine whether there is a difference between the images.

The refrigerator 1 may include the first display 437 and the second display 50, which are described above.

When the controller 70 receives a first operation command, the first display 437 may operate. The first display 437 may operate, for example, in a state in which the main door 30 and the sub door 40 are closed.

When the controller 70 receives a second operation command, the second display 437 may operate. For example, the second display 437 may receive an operation command input from a voice receiving portion 74, operate in conjunction with the operation of the first display 437, or operate to correspond to a change in state of the refrigerator 1.

When receiving a knock-on command applied to the front panel 432, the controller 70 may turn on the door lighting portion 527 in the state in which the sub door 40 is closed. In this case, the user may check the inside of the door storage space 32 in the state in which the sub door 40 is closed.

The controller 70 may turn off the door lighting portion 527 when the opening of the sub door 40 is sensed.

The window 660 of each of the camera assemblies 610 and 620 is disposed to be inclined at a predetermined angle with respect to the front surface 10a of the cabinet 10 or the front surface 30a of the main door 30 in the state in which the main door 30 and the sub door 40 are closed.

In FIG. 35a, an axis extending horizontally in the left and right direction parallel to the front surface 30a of the main door 30 may be referred to as an X-axis, and an axis perpendicular to the X-axis in the horizontal direction may be referred to as a Y-axis. An axis perpendicular to the X-axis and the Y-axis and extending in the vertical direction may be referred to as the Z-axis (see FIG. 32).

In this embodiment, in the state in which the main door 30 and the sub door 40 are closed, the window 626 is disposed to be inclined with respect to the X-axis and the Y-axis. On the other hand, the window 626 may be parallel to the Z-axis.

The controller 70 may allow the door camera 60 to operate when an operation condition of the door camera 60 is satisfied. When the operation condition is satisfied, the opening of the sub door 40 is sensed in the state in which the main door 30 is closed.

When the opening of the sub door 40 is sensed, the camera assemblies 610 and 620 photograph the main door 30 including the second storage space 32 at regular time intervals. In the state in which the main door 30 is closed, since the second storage space 32 is partitioned from the first storage space by the frame cover 36, the images photographed by the camera assemblies 610 and 620 contain foods disposed in the second storage space 32 defined by an inner surface of the frame cover 36.

The images photographed at regular time intervals are stored in the memory 78. Here, in the memory 78, the first images (first image group) photographed by the first camera assembly 610 and the second images (second image group) photographed by the second camera assembly 610 are separately stored in the memory 78.

Each of the camera assemblies 610 and 620 photographs the main door 30 at regular time intervals until the opening and closing of the sub door 40 are sensed.

When the closing of the sub door 40 is sensed, the controller 70 selects one first image from the first image group stored in the memory 78 and selects one second image from the second image group.

Referring to FIG. 35b, the sub door 40 may be opened at a maximum opening angle θ1+θ2+θ3. In the process of opening the sub door 40, an opening angle of the sub door 40 may be divided into three angular sections θ1, θ2, and θ3. The angles θ1, θ2, and θ3 have the same.

The selected first image and the second image may be images photographed when the sub door 40 is disposed in the second angular section.

More specifically, when an angle defined by a virtual line L1 connecting the hinge of the sub door 40 to the window 660 and a virtual line L2 passing through the front surface 30a of the main door 30 is a reference angle θ4, the window 660 is parallel to the front surface 30a of the main door 30.

In the state in which the main door 30 and the sub door 40 are closed, each of the front surface 30a of the main door 30 and the window 660 may be disposed to be inclined at the reference angle θ4.

The reference angle θ4 may be, for example, 50 degrees or more and less than 70 degrees.

The state of the image acquired by the door camera 60 may be related to the angle between the window 660 and the front surface of the main door 30 and external light in the state in which the sub door 40 is opened.

If the reference angle θ4 is set to less than 50 degrees, when the door camera 60 acquires an image, there is a disadvantage in that the acquired image is dark because an amount of external light is small.

On the other hand, when the reference angle θ4 is set to be greater than 70 degrees, a protruding length of each of the camera assemblies 610 and 620 from the first dike 422 increases. As a result, there are disadvantages in that a first area 433 of the front panel 432 decreases, and an amount of exposure of each of the camera assemblies 610 and 620 to the outside increases when the sub door 40 is opened.

Preferably, the reference angle θ4 may be 60 degrees. When the reference angle θ4 is 60 degrees, a distance between the window 660 and the front surface 30a of the main door 30 is secured, and thus, the main door 30 may be seen bet at a position at which the window 660 divides the main door 30 into left and right or a position that is close to the bisecting point.

The selected first image and second image may be images photographed when the angle between the window 660 and the front surface 30a of the main door 30 is the reference angle θ4 in the state in which the main door 30 and the sub door 40 are closed.

In addition, the selected first image and the second image may be images photographed while the sub door 40 is opened and then closed.

Specifically, the first image may include the first mark 34, and the second image may include the second mark 35.

The position of the first mark 34 on the plurality of first images photographed according to the position of the sub door 40 may be changed. In addition, the position of the second mark 35 on the plurality of second images photographed according to the position of the sub door 40 may be changed.

In the memory 78, a first reference image and a second reference image photographed when the angle between the window 660 and the front surface 30a of the main door 30 is the reference angle θ4 may be stored. The first reference image may also include the first mark 34, and the second reference image may also include the second mark 35.

The controller 70 may select a first image, in which a position of the first mark 34 is the same as a position of the first mark 34 of the first reference image, among the plurality of photographed first images.

Also, the controller 70 may select a second image, in which a position of the second mark 35 is the same as a position of the second mark 35 of the second reference image, among the plurality of photographed second images.

In this case, the image stored latest in the plurality of first image groups stored in the memory 78 is an image photographed just before the sub door 40 is closed. Thus, the controller 70 may sequentially compare the first reference image from the image stored latest in the first image group in order to select an image photographed while the sub door 40 is closed. Similarly, the controller 70 may sequentially compare the second reference image from the image stored latest in the second image group in order to select an image photographed while the sub door 40 is closed.

Here, in the plurality of photographed first and second images in the memory 78, only images photographed within a reference time from a time point at which the opening of the sub door 40 is sensed may be stored. Thus, the number of images stored in the memory 78 may be reduced.

The controller 70 may extract a partial area from the first image and extract another partial area from the second image to acquire one resultant image in which the two extracted areas are combined.

As another example, the controller 70 may compare the selected first image with the second image to extract a common area, thereby acquiring a new resultant image, in which the two images are synthesized, by overlapping of the common area.

As another example, it is also possible to use a single mark while installing the plurality of camera assemblies 610 and 620 on the first dike 422.

The main door 30 may include one mark, and either one of the first camera assembly 610 and the second camera assembly 620 may photograph the mark.

For example, the first image photographed by the first camera assembly 610 may include the mark, and the second image photographed by the second camera assembly 620 may not include the mark. The reference image on which the mark is disposed at a specific position may be stored in the memory.

The first image in which a position of the mark is the same as that of the mark in the reference image may be selected from the plurality of first images photographed by the first camera assembly 610. The second image having the same photographing sequence as the selected first image may be selected from the second images photographed by the second camera assembly 620. The finally selected first image and second image may be used to generate the resultant image.

Hereinafter, a screen displayed on the first display 437 will be described.

Figure 36:
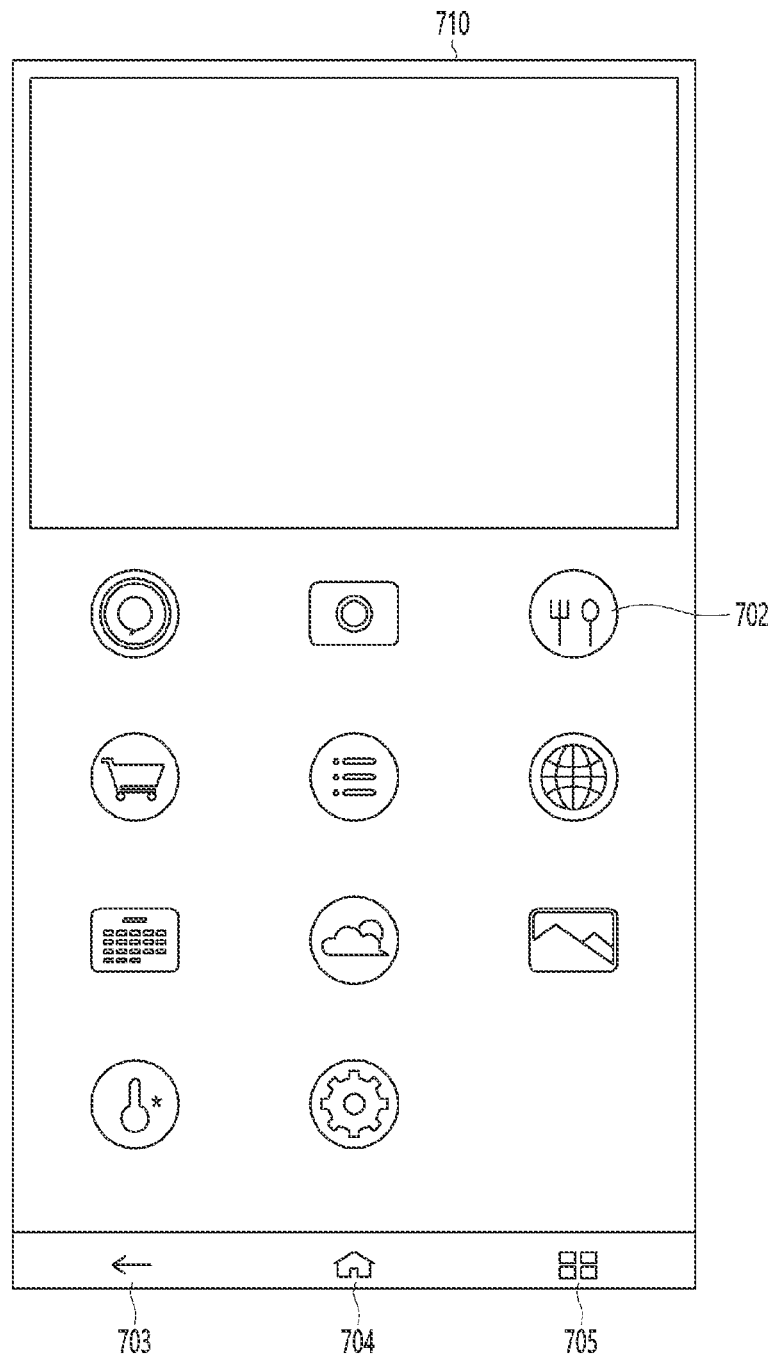
FIG. 36 is a view illustrating a main screen.
Figure 37:
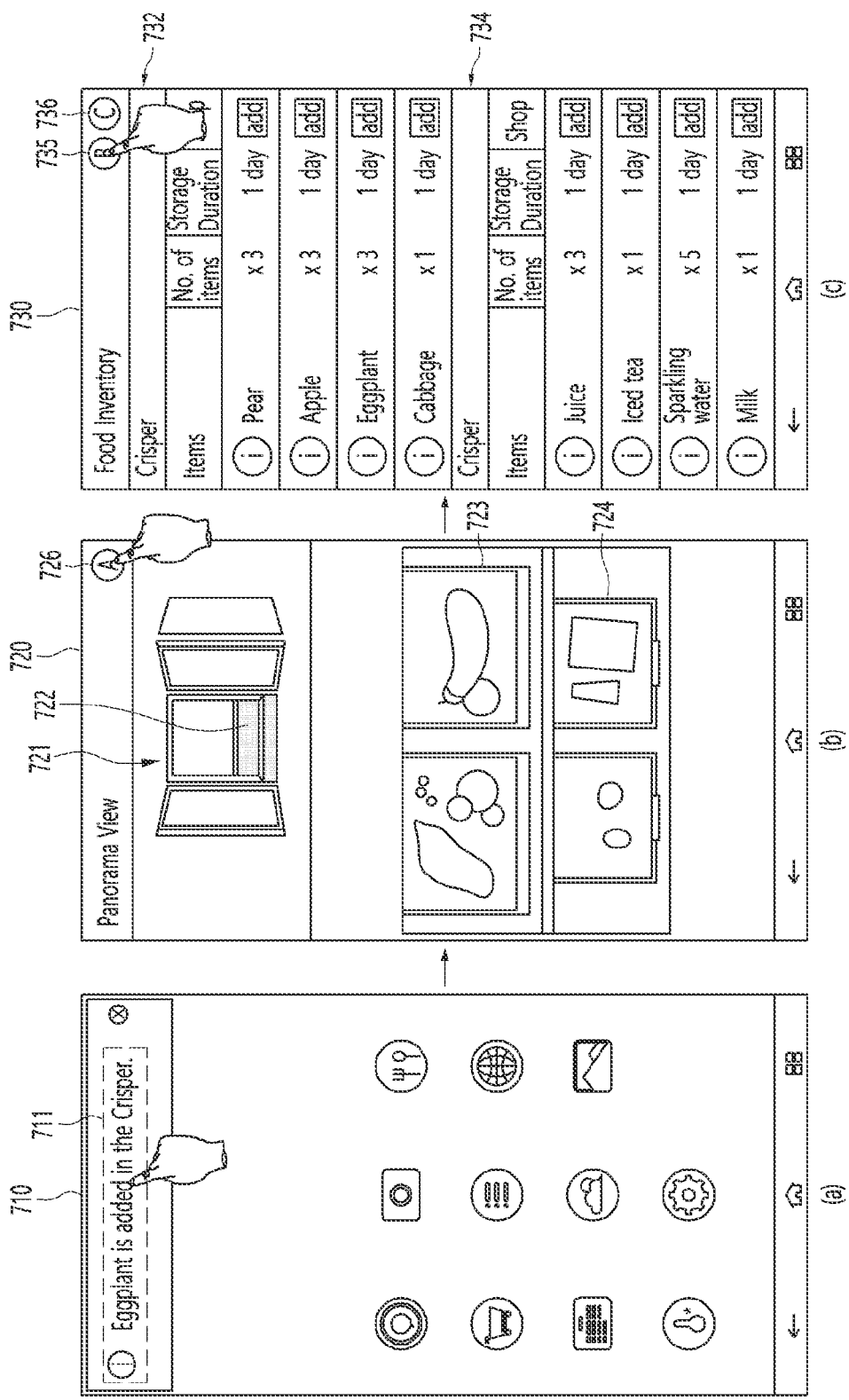
FIGS. 37 to 39 are views illustrating a series of screens displayed on a first display.
Figure 38:
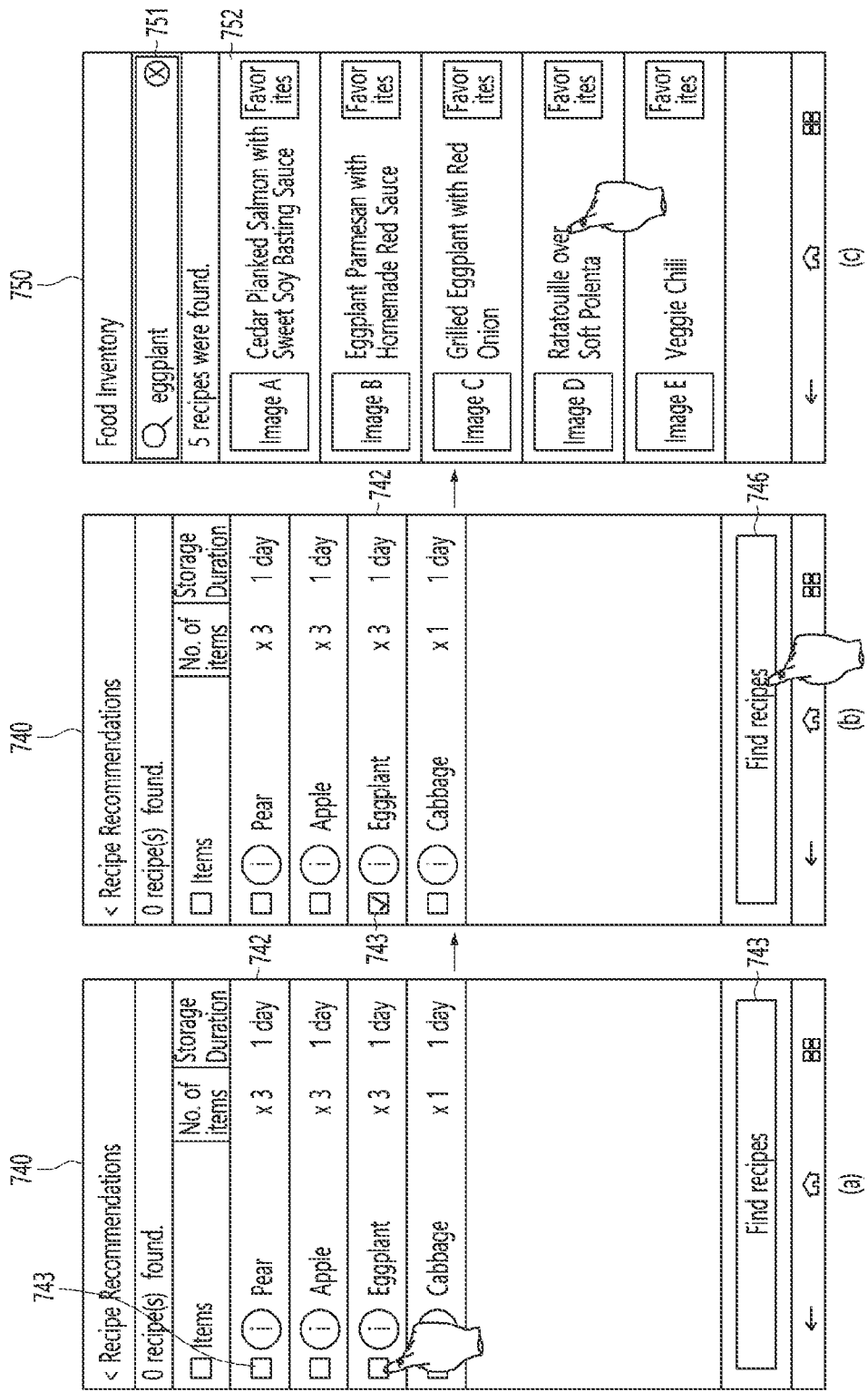
Figure 39:
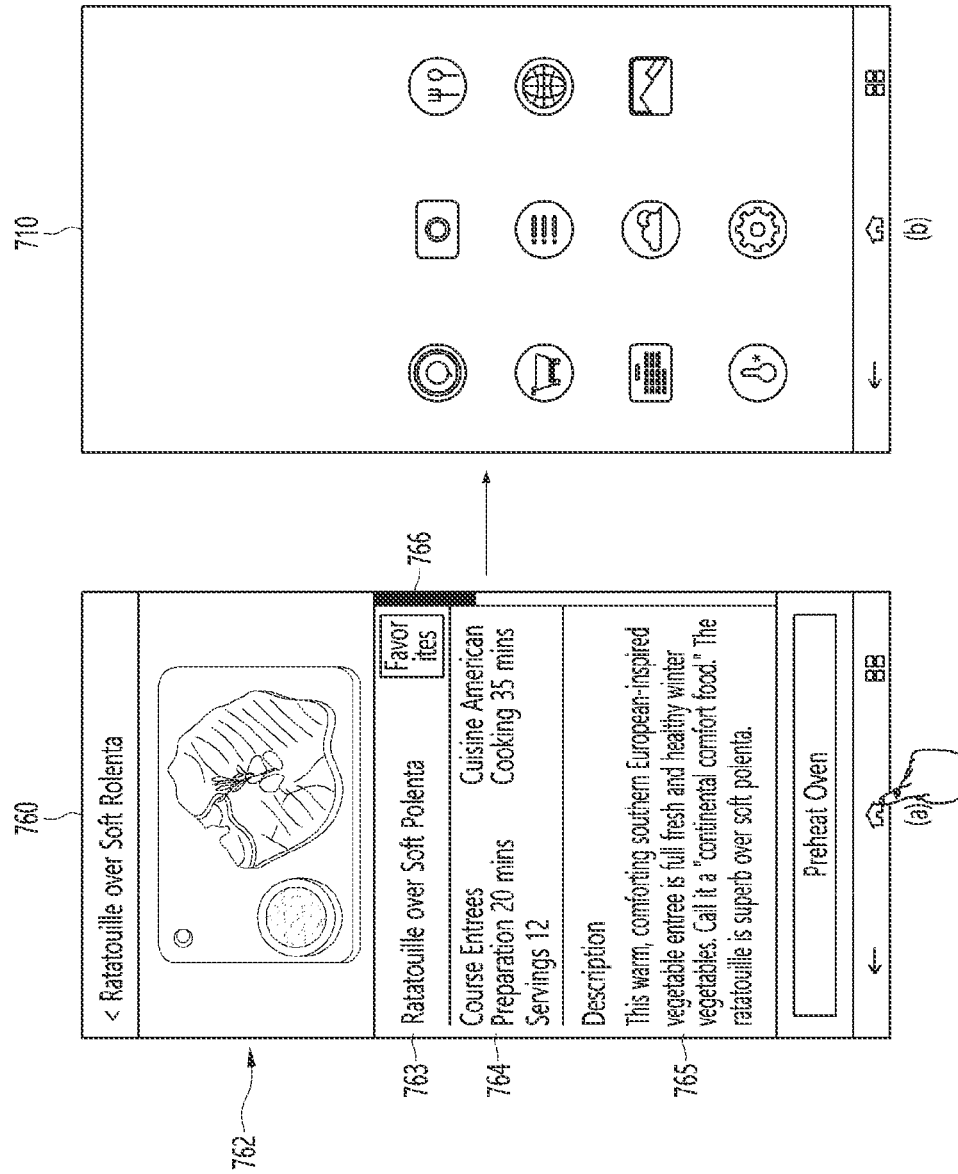
Figure 40:
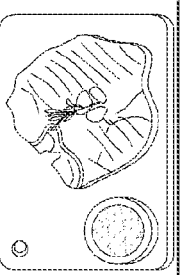
FIG. 40 is a view illustrating all contents displayed on a recipe recommendation screen.

FIG. 36 is a view illustrating a main screen, and FIGS. 37 to 39 are views illustrating a series of screens displayed on a first display. FIG. 40 is a view illustrating all contents displayed on a recipe recommendation screen.

Referring to FIGS. 36 to 40, first, a plurality of icons 702 from which the user is capable of selecting various functions may be displayed on a main screen 710 of a first display 437. The plurality of icons 702 may be arranged to be spaced apart from each other in the left and right direction and the vertical direction.

The plurality of icons 702 may be used to select recipe confirmation, shopping list confirmation, weather confirmation, calendar confirmation, refrigerator function management, interior confirmation of the refrigerator, photo management, and the like.

A plurality of selection buttons 703, 704, and 705 may be additionally displayed on the main screen 700. A plurality of selection buttons 703, 704, and 705 may be disposed on an area below the plurality of icons 702.

The selection buttons 703, 704, and 705 may include, for example, a previous button 703, a home button 704, and a management button 705.

Referring to FIG. 37, when movement of a specific position of each of the drawers 15 and 16 is sensed after the refrigerating compartment doors 21 and 22 are opened, the storage space camera 18 photographs the storage spaces 13 and 14.

The images photographed by the storage space camera 18 are stored in the memory 78. The controller 70 compares the currently acquired image with the immediately previous image stored in the memory 78 to determine whether a difference between the images exists.

If there is the difference between the images, the controller 70 extracts an area having the difference, extracts information about foods from the extracted area, and specifies the extracted foods.

For example, when one eggplant is added to the drawer, the controller 70 may determine that the added food is "eggplant" by comparing the images. Various information for specifying food from the extracted image may be previously stored in the memory 78.

As illustrated in (a) of FIG. 37, when there is food added to the drawer, information 711 (e.g., text information) for notifying the added food may be displayed on one area of the main screen 710. For example, the information 711 may be disposed on an area above the plurality of icons 702.

The user may select the information 711 on the screen 710. When the user selects the information 711, an image confirmation screen 720 may be displayed on the first display 437 as illustrated in (b) of FIG. 37.

Area information 721 showing a storage area of the refrigerator in the form of an icon and images 723 and 724 acquired by the storage space camera 40 are displayed on the image confirmation screen 720. Here, the images acquired by the storage space camera 40 may be displayed in a divided state for each drawer 15 and 16.

The area information 721 is displayed so that the area 722 corresponding to the image acquired by the storage space camera 18 is distinguished from other areas.

A food management button 726 may be additionally displayed on the image confirmation screen 720. When the user selects the food management button 726, the food management screen 730 may be displayed on the first display 437 as illustrated in (c) of FIG. 38.

Management information 732 and 734 are displayed separately for each drawer on the food management screen 730.

For example, the first management information 732 displays information on foods stored in the first drawer 15, and the second management information 732 displays information on foods stored in the second drawer 16.

The first management information 732 and the second management information 734 may be arranged horizontally or vertically.

Each of the management information 732 and 734 may display a food name, storage number, storage period information, and the like. In addition, an additional button 732 may be displayed on each of the management information 732 and 734. When the adding button 732 is selected, the selected food may be added to the shopping list.

A recipe recommendation button 735 and a shopping list button 736 may be additionally displayed on the food management screen 730.

When the user selects the recipe recommendation button 735, a food selection screen 740 is displayed on the first display 437 as illustrated in (a) of FIG. 38. A list 742 of foods stored in the refrigerator 1 may be displayed on the food selection screen 740.

A check box 743 may be displayed in the list 742 of each food, and thus, the user may select a food to be added to the recipe.

A recipe search button 746 may be displayed on the recipe confirmation screen 740.

As illustrated in (b) of FIG. 38, after the user selects the check box 743 of "eggplant", the recipe search button 746 may be selected.

When the user selects the recipe search button 746, a recipe list screen 750 related to the "eggplant" may be displayed on the first display 437 as illustrated (c) of FIG. 38.

A plurality of recipe lists 752 that is capable of being cooked using eggplants may be displayed on the recipe list screen 750, and the user may select one recipe from the lists.

When the user selects a recipe on the recipe list screen 750, a recipe recommendation screen 760 may be displayed on the first display 437 as illustrated in (a) of FIG. 39.

The recipe recommendation screen 760 may include a completed cooking image 762, a cooking name 763, cooking process information 764, and detailed recipe information 765.

The recipe recommendation screen 760 may further include a scroll 766 for searching for contents that are not currently displayed on the screen. The scroll 766 may vertically move to search necessary contents.

The cooking process information 761 may include information such as a cooking style, a cooking preparation time, and a cooking time.

The detailed recipe information 765 may include basic cooking information, food necessary for cooking information 767, and cooking order information 770.

The food information 767 may include a check box 768 and an add shopping list button 769. If the food needs to be purchased among the food information 767, the user may select the check box 768 and then select the add shopping list button 769.

When the user selects the home button 704 on the recipe recommendation screen 760, the recipe recommendation screen 760 may be switched to the main screen 710 as illustrated in (b) of FIG. 38.

Figure 41:
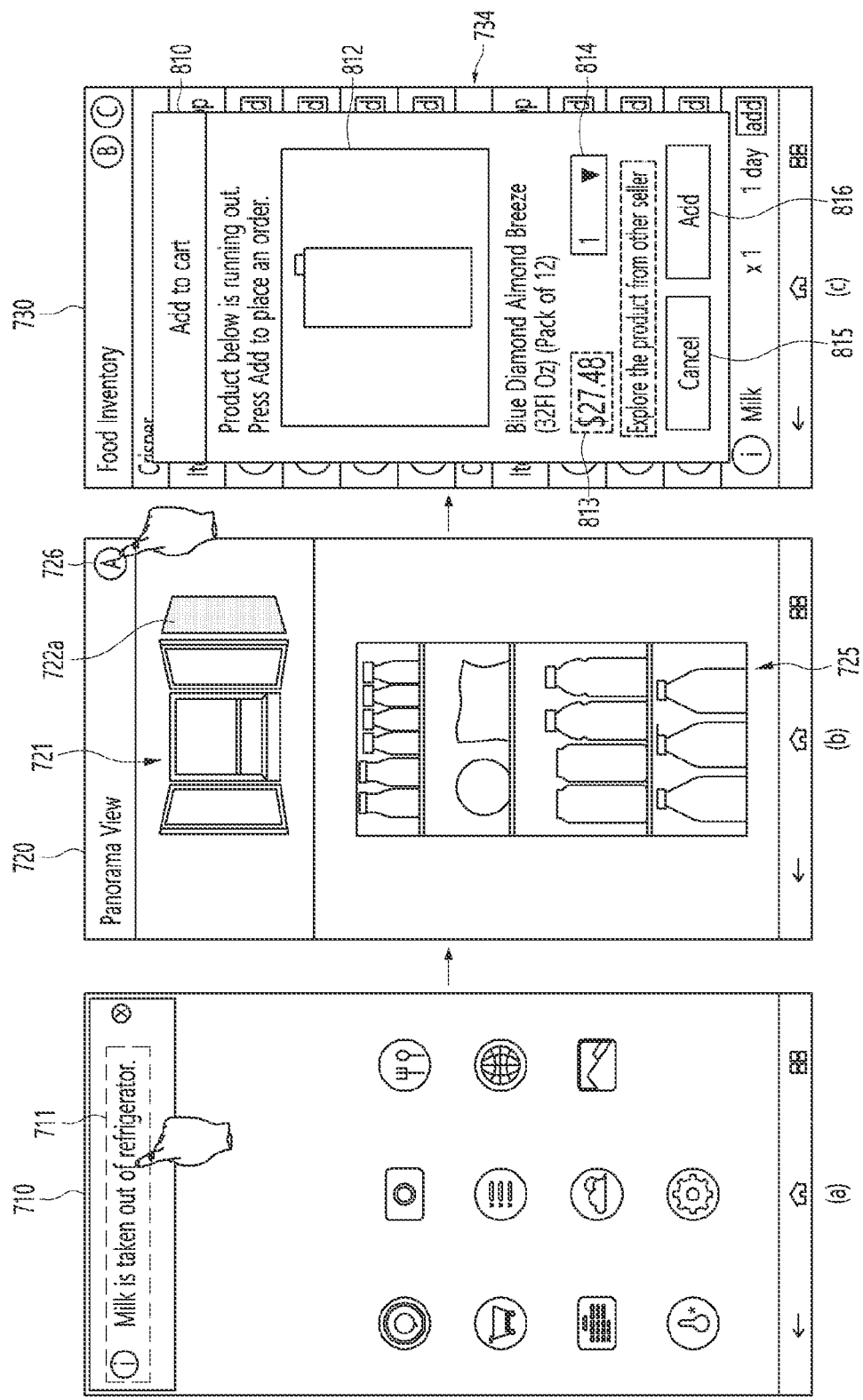
Figure 42:
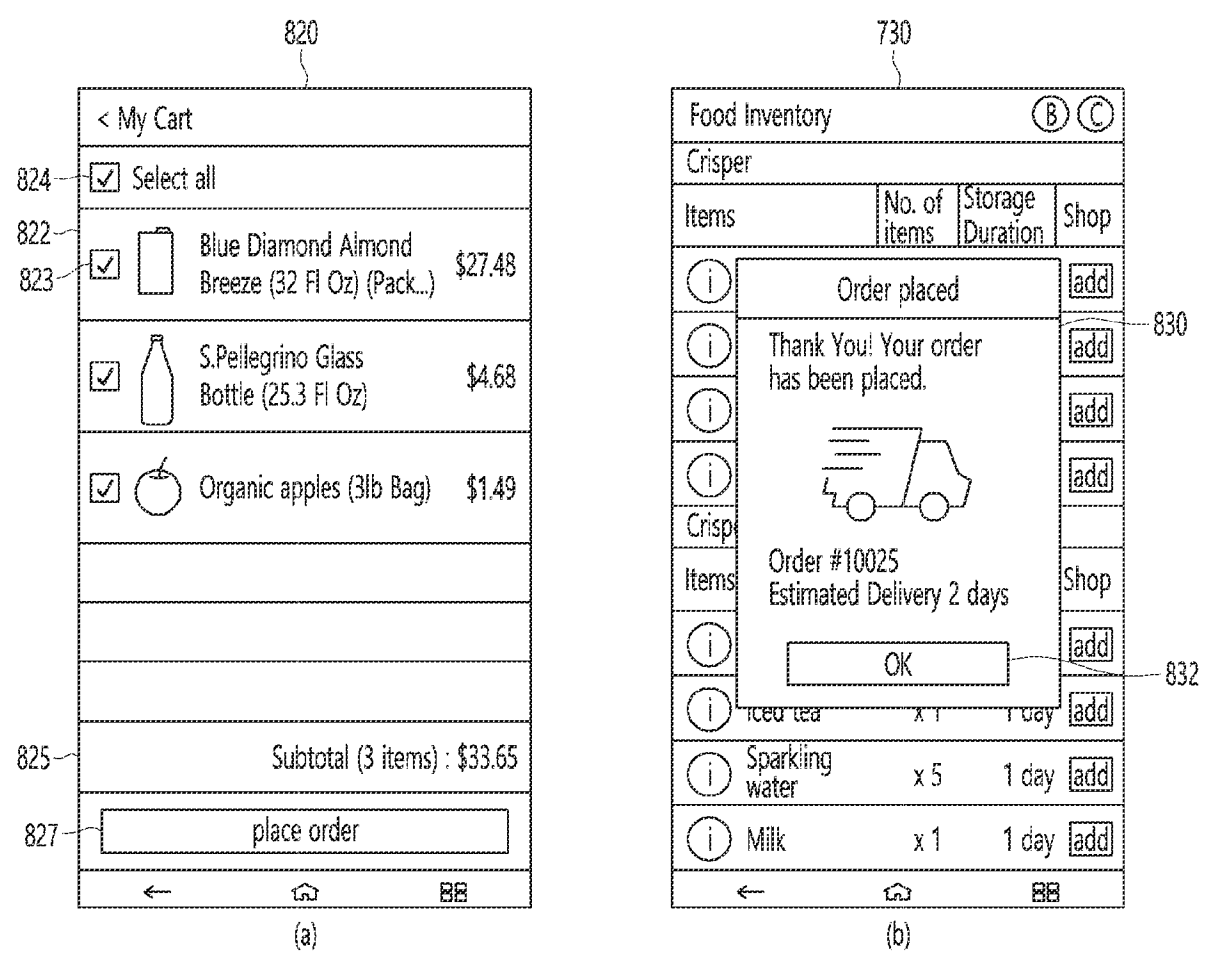

FIGS. 41 and 42 are views illustrating another example of the series of screens displayed on the first display.

Referring to FIGS. 41 and 42, the door camera 60 photographs the second storage space 32 while the sub door 40 is closed after the sub door 40 is opened.

As described above, the controller 70 may display the acquired resultant image on the first display 437. The controller 70 may check a difference between the images by comparing the current resultant image with the past resultant image.

If there is the difference between the resultant images, the controller 70 extracts an area having the difference, extracts information about foods from the extracted area, and specifies the extracted foods.

For example, when one "milk" is withdrawn from the second storage space 32, the controller 70 may determine that the extracted food is "milk" through comparison of the images. Various information for specifying food from the extracted image may be previously stored in the memory 78.

As illustrated in (a) of FIG. 41, when there is food withdrawn from the second storage space 32, information 711 (e.g., text information) for notifying the extracted food may be displayed on one area of the main screen 710.

The user may select the information 711 on the screen 710. When the user selects the information 711, an image confirmation screen 720 may be displayed on the first display 437 as illustrated in (b) of FIG. 41.

Area information 721 showing the storage area of the refrigerator in the form of an icon and the resultant image 725 may be displayed on the image confirmation screen 720.

The area information 721 is displayed so that the area 722*a* corresponding to the image acquired by the door camera 60 is distinguished from other areas. For example, an area corresponding to the sub door may be displayed to be distinguished from other areas by colors.

A food management button 726 may be additionally displayed on the image confirmation screen 720. When the user selects the food management button 726, the food management screen 730 may be displayed on the first display 437 as illustrated in (c) of FIG. 41.

Management information on foods stored in the second storage space 32 may be displayed on the food management screen 730. The management information may display a food name, the number of times of storage, storage period information, and the like.

A recipe recommendation button 735 and a shopping list button 736 may be additionally displayed on the food management screen 730.

After the image confirmation screen 720 is switched to the food management screen 730, a pop-up screen 810 related to foods to be additionally purchased may be displayed on the food management screen 730.

As described above, since "milk" is withdrawn from the second storage space 32, information for purchasing milk may be displayed on the pop-up screen 810.

An image 812 of the food to be purchased, price information 813, a number selection button 841, a cancel button 815, and an adding button 816 may be displayed on the pop-up screen 810.

When the adding button 816 is selected on the pop-up screen 810, a shopping list screen 820 may be displayed on the first display 437 as illustrated in (a) of FIG. 42.

List information 822 of foods to be purchased may be displayed on the shopping list screen 820. Each of the list information 822 may include information such as names, capacities, prices of the foods to be purchased, and the like.

A check box 823 for selecting foods and a whole select button 824 for selecting all foods may be displayed on the shopping list screen 820.

In addition, information on an amount of money required to purchase the selected food 825 may be displayed on the shopping list screen 820.

An order button 827 may be displayed on the shopping list screen 820. When the user selects the order button 827, the shopping list screen 820 may be switched to the food management screen 730, and an order completion screen 830 may pop up on the food management screen 730. Information such as an order number, a remaining period until delivery, and a confirmation button 832 may be displayed on the order completion screen 830. When the confirmation button 832 is selected, the food management screen 730 may be switched to the main screen 710.

Figure 43:
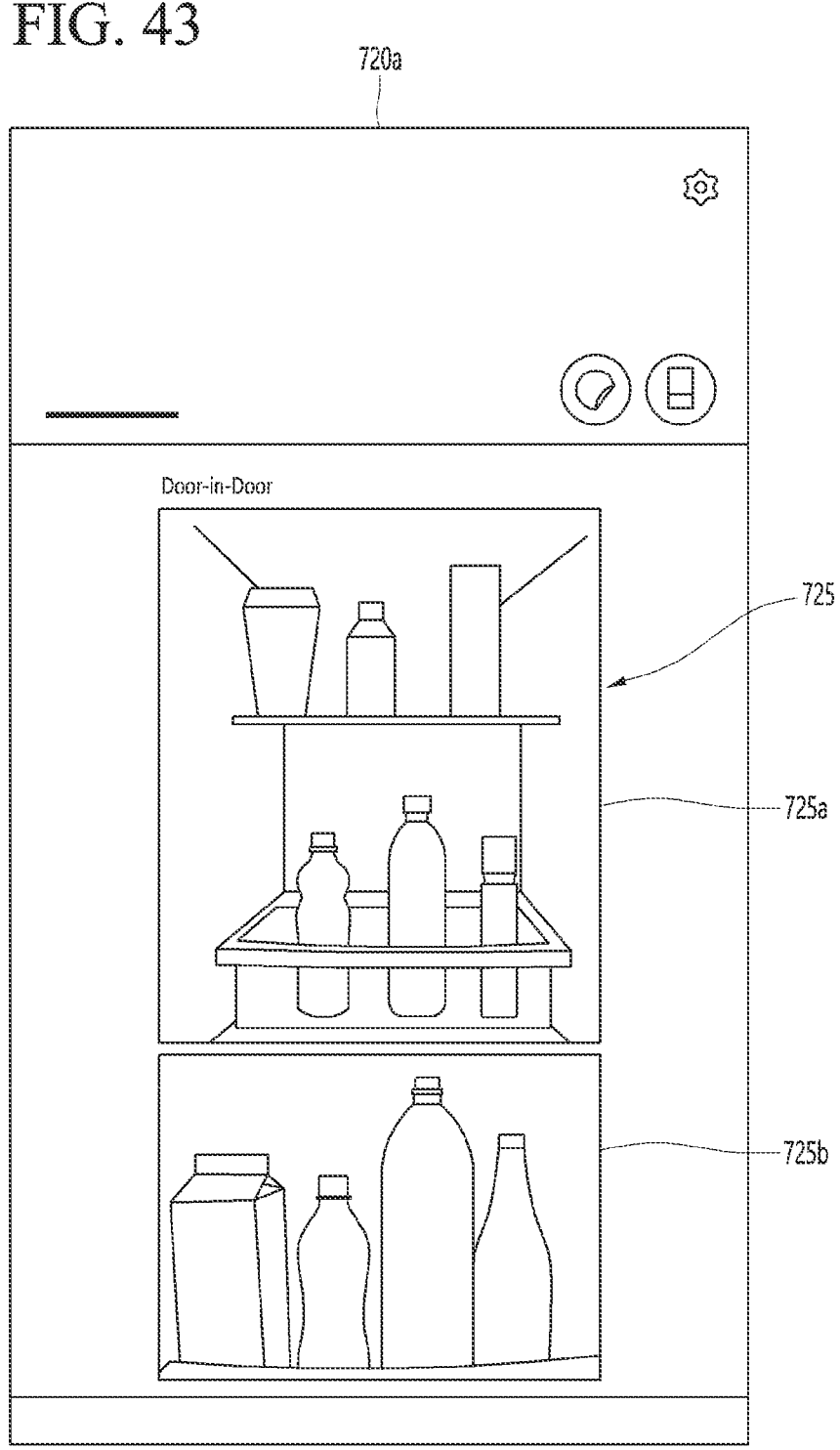
FIG. 43 is a view illustrating a screen displayed on the first display after the sub door is closed.

FIG. 43 is a view illustrating a screen displayed on the first display after the sub door is closed.

Referring to FIG. 43, after the sub door 40 is closed, an image confirmation screen 720*a* may be displayed on the first display 437.

The image confirmation screen 720*a* may display a resultant image 725*a* in which the image photographed by the door camera 60 is reflected.

The resultant image 725*a* may include a first image portion 725*a* extracted from the first image photographed by the first camera assembly 610 and a second image portion 725*b* extracted from the second image photographed from the second camera assembly 620.

Figure 44:
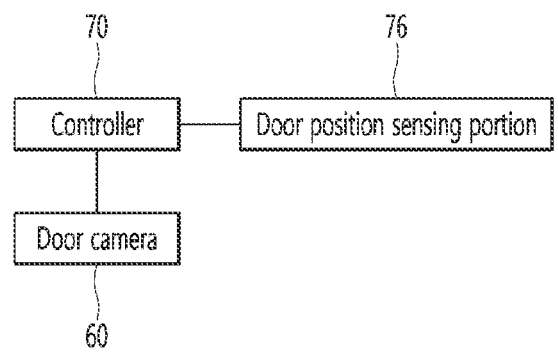
FIG. 44 is a block diagram of a refrigerator according to another embodiment of the present invention.

FIG. 44 is a block diagram of a refrigerator according to another embodiment of the present invention.

This embodiment is the same as the previous embodiment in other parts, except that a rotational position of the sub door is sensed, and the door camera photographs the second storage space when the sub door moves to a specific position. Thus, only characterized portions in this embodiment will be described below.

Referring to FIG. 44, the refrigerator according to this embodiment may further include a door position sensing portion 76 for sensing a position of the sub door 40.

The door position sensing portion 76 may include, for example, an acceleration sensor.

A rotation direction of the sub door 40 and relative position information of the sub door 40 with respect to the main door 30 may be checked by using the acceleration sensor. As described in the previous embodiment, reference information is stored in the memory when the angle between the window 660 and the front surface 30*a* of the main door 30 is the reference angle.

A controller 70 controls the door camera 60 to photograph a second storage space 32 when the information acquired by the door position sensing portion 76 matches reference information. Thus, a first image is photographed by a first camera assembly, and a second image is photographed by a second camera assembly.

The controller 70 may compare the photographed first image with the second image to extract a common area, thereby acquiring a new resultant image, in which the two images are synthesized, by overlapping of the common area.

Figure 45:
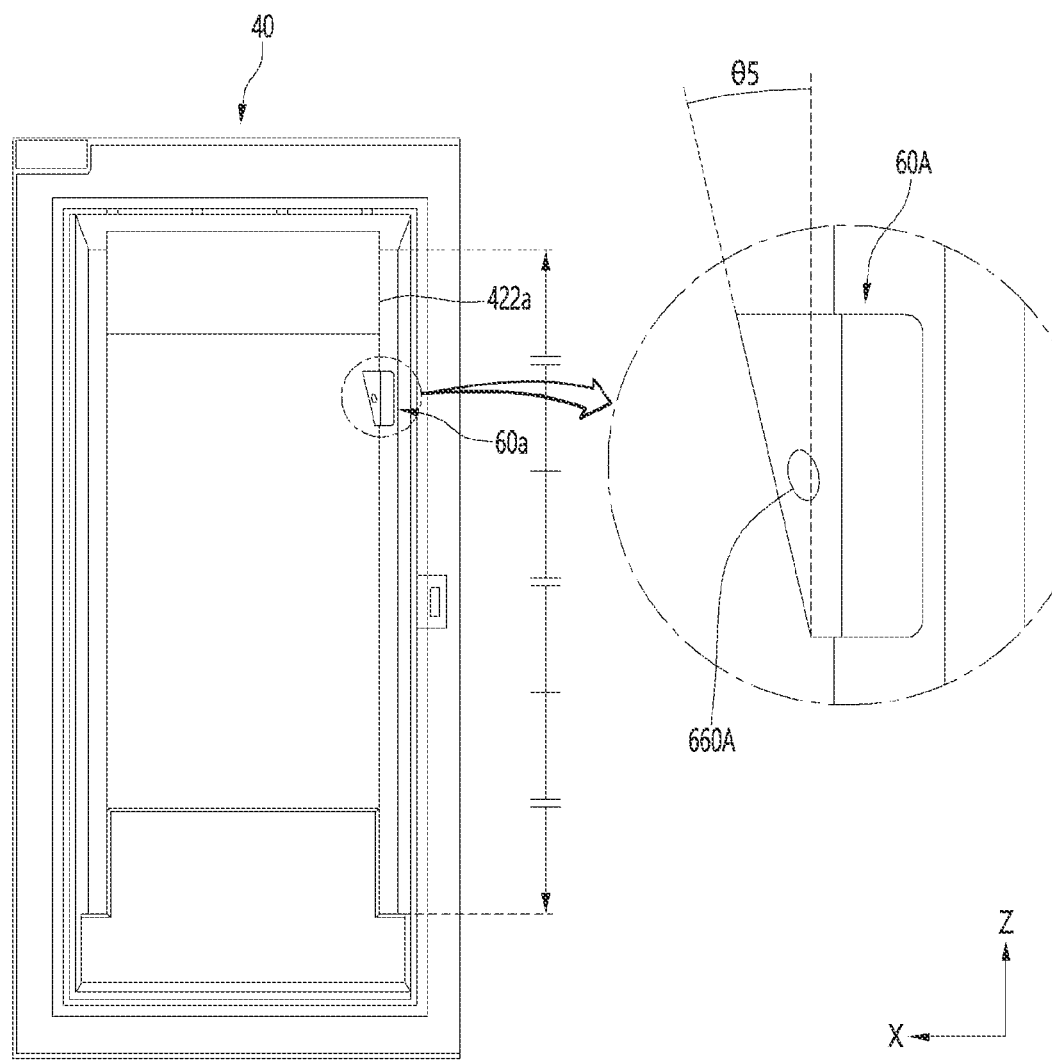
FIG. 45 is a view illustrating a state in which a door camera is provided at a sub door according to another embodiment of the present invention.

FIG. 45 is a view illustrating a state in which a door camera is provided at a sub door according to another embodiment of the present invention.

This embodiment is the same as the previous embodiments in other parts, except that one camera assembly is installed in a sub door.

Since a basic structure of the camera assembly in FIG. 45 is the same as the existing structure of the camera assembly according to the previous embodiment, only portions that are different from the previous embodiment will be described below.

Referring to FIG. 45, one camera assembly 60A may be installed on a first dike 422 of a sub door 40.

The camera assembly 60 may be disposed on an area corresponding to at the highest position when a height of the first dike 422 is divided into three so that the image photographed by the camera assembly 60*a* includes the entire second storage space 32. It can be installed in an area where When the sub door is closed, the camera assembly 60*a* may be disposed higher than a bisecting line that equally divides the height of the second storage space.

The window 660*a* of the camera assembly 60*a* according to this embodiment may be inclined with a front surface of the main door by a reference angle θ4 described with reference to FIGS. 35*a* and 35*b* when the sub door is closed. That is, the window 660*a* may be disposed to be inclined with respect to X- and Y-axes.

In addition, the window 660*a* may be disposed to be inclined at a predetermined angle θ5 with respect to a Z-axis so that the image photographed by the camera assembly 60A includes the entire second storage space 32. That is, the window 660*a* may be disposed to be inclined with respect to the first surface 422*a* of the first dike 422.

The window 660*a* may be disposed to be closer to the first surface 422*a* downward from an upper side. Due to the inclined arrangement of the window 660a, a length of an upper portion of the camera assembly 60a protruding from a first surface 422a is greater than that of a lower portion of the camera assembly 60a protruding from the first surface 422a.

When the sub door 40 is closed, an angle between the window 660a and the Z-axis is less than that between the window 660a and the X-axis.

Also, when the sub door 40 is closed, the angle between the window 660a and the Z-axis is less than that between the window 660a and the Y-axis.

The invention claimed is:

1. A refrigerator comprising:
    a cabinet that defines a first storage space;
    a main door configured to open and close at least a portion of the first storage space, the main door defining an opening and a second storage space;
    a sub door disposed at a front of the main door and configured to open and close the opening of the main door, the sub door comprising:
        a panel assembly comprising (i) a front panel that defines a front surface of the sub door and is made of a glass material or a transparent plastic material, (ii) an insulating panel spaced apart from the front panel, and (iii) a frame disposed between the front panel and the insulating panel, and
        a door liner having a liner opening that is covered by the insulating panel; and
    a camera assembly disposed at the door liner of the sub door and configured to capture one or more images of the second storage space based on the sub door being opened in a state in which the main door is closed.

2. The refrigerator of claim 1, wherein the main door comprises:
    a door frame that defines the opening; and
    a frame cover that is coupled to the door frame and partitions the second storage space from the first storage space.

3. The refrigerator of claim 1, wherein the sub door is configured to rotate with respect to the main door about a hinge axis extending in a vertical direction, and
    wherein the camera assembly comprises a first camera assembly and a second camera assembly that are spaced apart from each other in the vertical direction.

4. The refrigerator of claim 3, further comprising a display disposed at a rear side of the front panel of the sub door and configured to display a resultant image comprising at least a portion of an image captured by the first camera assembly and at least a portion of an image captured by the second camera assembly,
    wherein the sub door has a maximum opening angle with respect to the main door and is configured to rotate to a plurality of positions corresponding to a plurality of angular sections defined within the maximum opening angle, and
    wherein each of the first camera assembly and the second camera assembly is configured to capture the image based on the sub door being rotated to a middle position corresponding to a middle angular section among the plurality of angular sections.

5. The refrigerator of claim 4, wherein each of the first camera assembly and the second camera assembly is further configured to capture an image based on the sub door being closed such that the resultant image comprises at least a portion of the image captured by each of the first camera assembly and the second camera assembly in a process of closing the sub door.

6. The refrigerator of claim 4, further comprising a non-transitory memory configured to store a plurality of images of the second storage space that are captured at a predetermined time interval by each of the first and second camera assemblies in a process of opening the sub door,
    wherein the plurality of images comprise:
        a plurality of first images captured by the first camera assembly, and
        a plurality of second images captured by the second camera assembly, and
    wherein the resultant image comprises:
        at least a portion of a first image selected from the plurality of first images, and
        at least a portion of a second image selected from the plurality of second images.

7. The refrigerator of claim 6, wherein the main door comprises a first mark and a second mark that are spaced apart from each other in the vertical direction,
    wherein each of the plurality of first images includes the first mark, and each of the plurality of second images includes the second mark,
    wherein the non-transitory memory includes:
        a first reference image including the first mark disposed at a predetermined position, and
        a second reference image including the second mark disposed at a predetermined position,
    wherein a first image is selected from the plurality of first images based on the first image including the first mark at a position corresponding to the predetermined position of the first mark in the first reference image, and
    wherein a second image is selected from the plurality of second images based on the second image including the second mark at a position corresponding to the predetermined position of the second mark in the second reference image.

8. The refrigerator of claim 6, wherein the main door comprises a mark that is disposed within a field of view of the first camera assembly and outside a field of view of the second camera assembly such that each of the plurality of first images includes the mark, and each of the plurality of second images does not include the mark,
    wherein the non-transitory memory includes a reference image including the mark disposed at a predetermined position,
    wherein a first image is selected from the plurality of first images based on the first image including the mark at a position corresponding to the predetermined position of the mark in the reference image, and
    wherein a second image is selected from the plurality of second images based on an order of the second image among the plurality of second images corresponding to an order of the first image among the plurality of first images.

9. The refrigerator of claim 4, wherein each of the first and second camera assemblies comprises a camera module including a lens and a window disposed at a front of the lens, the window defining a reference angle inclined with respect to a front surface of the main door in a state in which the sub door is closed,
    wherein each of the first camera assembly and the second camera assembly is configured to capture the image of the second storage space based on an opening angle of the sub door corresponding to the reference angle, the opening angle being defined between the front surface of the main door and a virtual line extending from the window to the hinge axis of the sub door, and wherein the resultant image comprises at least a portion of the image captured by each of the first camera assembly and the second camera assembly at a time point at which the opening angle of the sub door is the reference angle.

10. The refrigerator of claim 3, wherein each of the first and second camera assemblies comprises a camera module including a lens and a window disposed at a front of the lens,
   wherein a front surface of the main door extends in a first horizontal direction along an X-axis that is orthogonal to a Y-axis extending in a second horizontal direction, the vertical direction extending along a Z-axis that is orthogonal to the X-axis and the Y-axis, and
   wherein the window extends parallel to the Z-axis and is configured to, in a state in which the sub door is closed, be inclined with respect to the X-axis and the Y-axis.

11. The refrigerator of claim 3, wherein the door liner comprises a first dike and a second dike that are spaced apart from each other in a horizontal direction and protrude in a direction away from the front surface of the sub door,
   wherein a distance between the hinge axis and the first dike in the horizontal direction is greater than a distance between the hinge axis and the second dike in the horizontal direction, and
   wherein the first and second camera assemblies are disposed at the first dike.

12. The refrigerator of claim 11, wherein the first dike defines installation openings that accommodate the first and second camera assemblies, respectively,
   wherein the sub door further comprises a mounting frame disposed at the first dike at a position corresponding to each of the installation openings, and
   wherein the each of the first and second camera assemblies comprises:
      a camera module that is disposed at the mounting frame and passes through one of the installation openings, and
      a cover member that covers the one of the installation openings.

13. The refrigerator of claim 11, wherein the first dike comprises a first surface that faces the second dike and a second surface that is bent from the first surface, and
   wherein each of the first and second camera assemblies comprises an imaging device comprising a lens and a window disposed at a front of the lens, the window being inclined with respect to the first surface and the second surface of the first dike.

14. The refrigerator of claim 11, wherein the liner opening is defined between the first dike and the second dike.

15. The refrigerator of claim 4, further comprising a controller configured to:
   control each of the first and second camera assemblies;
   compare the image captured by the first camera assembly with the image captured by the second camera assembly;
   determine a common area included in the image captured by the first camera assembly and the image captured by the second camera assembly; and
   generate the resultant image based on the common area.

16. The refrigerator of claim 15, wherein the controller is further configured to control operation of the refrigerator.

17. A refrigerator comprising:
   a cabinet that defines a first storage space; and
   a door configured to open and close at least a portion of the first storage space,
   wherein the door comprises:
      a main door that defines an opening and a second storage space, the second storage space being in communication with the opening and partitioned from the first storage space,
      a sub door configured to open and close the opening of the main door based on rotating with respect to the main door about a hinge axis that extends in a vertical direction, the sub door comprising:
         a panel assembly comprising (i) a front panel that defines a front surface of the sub door and is made of a glass material or a transparent plastic material, (ii) an insulating panel spaced apart from the front panel, and (iii) a frame disposed between the front panel and the insulating panel, and
         a door liner having a liner opening that is covered by the insulating panel, and
      a camera assembly disposed at the door liner of the sub door and configured to capture one or more images of the second storage space based on the sub door being opened in a state in which the main door is closed, the camera assembly comprising a camera module including a lens and a window disposed at a front of the lens,
   wherein a front surface of the main door extends in a first horizontal direction along an X-axis that is orthogonal to a Y-axis extending in a second horizontal direction, the vertical direction extending along a Z-axis that is orthogonal to the X-axis and the Y-axis, and
   wherein the window extends parallel to the Z-axis and is configured to, in a state in which the sub door is closed, be inclined with respect to the X-axis and the Y-axis.

18. The refrigerator of claim 17, further comprising:
   a controller configured to control the camera assembly; and
   a sensor configured to detect a position of the sub door relative to the main door,
   wherein the window defines a reference angle inclined with respect to the front surface of the main door in the state in which the sub door is closed, and
   wherein the controller is configured to control the camera assembly to capture the one or more images based on an opening angle of the sub door about the hinge axis corresponding to the reference angle.

19. The refrigerator of claim 18, wherein the sub door has a maximum opening angle with respect to the main door, the reference angle being greater than zero and less than the maximum opening angle.

20. The refrigerator of claim 17, further comprising:
   a controller configured to control the camera assembly; and
   a non-transitory memory configured to store a plurality of images of the second storage space that are captured at a predetermined time interval by the camera assembly in a process of opening the sub door,
   wherein the main door includes a reference mark, and
   wherein the controller is configured to select an image among the plurality of images based on the image including the reference mark at a predetermined position.

* * * * *